(12) United States Patent
Hu et al.

(10) Patent No.: US 12,348,137 B2
(45) Date of Patent: Jul. 1, 2025

(54) SWITCH-MODE POWER SUPPLY

(71) Applicant: HUAWEI TECHNOLOGIES CO., LTD., Guangdong (CN)

(72) Inventors: Zhangrong Hu, Shanghai (CN); Xin Liu, Shenzhen (CN); Caofei Heng, Chengdu (CN); Kun Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 17/880,012

(22) Filed: Aug. 3, 2022

(65) Prior Publication Data

US 2022/0385187 A1 Dec. 1, 2022

Related U.S. Application Data

(63) Continuation of application No. PCT/CN2020/074328, filed on Feb. 5, 2020.

(51) Int. Cl.
*H02M 3/158* (2006.01)
*H02M 1/08* (2006.01)

(52) U.S. Cl.
CPC ......... *H02M 3/158* (2013.01); *H02M 3/1584* (2013.01); *H02M 1/08* (2013.01)

(58) Field of Classification Search
CPC ............................ H02M 3/1584; H02M 3/158
See application file for complete search history.

(56) References Cited

U.S. PATENT DOCUMENTS

| 6,188,209 | B1 | 2/2001 | Poon et al. |
| 7,518,350 | B2 | 4/2009 | Leung |
| 7,606,051 | B1 | 10/2009 | Wittenbreder, Jr. |
| 2007/0139973 | A1 | 6/2007 | Leung |

(Continued)

FOREIGN PATENT DOCUMENTS

| CN | 101064473 A | 10/2007 |
| CN | 100356672 C | 12/2007 |

(Continued)

OTHER PUBLICATIONS

M. W. Beraki, J. P. F. Trov o, M. S. Perdig o and M. R. Dubois, "Variable Inductor Based Bidirectional DC-DC Converter for Electric Vehicles," in IEEE Transactions on Vehicular Technology, vol. 66, No. 10, pp. 8764-8772, doi: 10.1109/TVT.2017.2710262, Oct. 2017.

(Continued)

*Primary Examiner* — Alex Torres-Rivera

(57) ABSTRACT

A switch-mode power supply includes a first switch circuit, at least one second switch circuit, a switch control circuit, a first inductor switching circuit, a coupled inductor, a voltage input end, and a voltage output end. The coupled inductor in the switch-mode power supply may be connected to the first switch circuit, to implement signal transmission between the coupled inductor and the first switch circuit. Signal transmission between the coupled inductor and the second switch circuit may be implemented under control of the first inductor switching circuit. Alternatively, the signal transmission between the coupled inductor and the second switch circuit may be disconnected under the control of the first inductor switching circuit.

20 Claims, 22 Drawing Sheets

(56) References Cited

U.S. PATENT DOCUMENTS

| | | | |
|---|---|---|---|
| 2013/0336012 A1 | 12/2013 | Broussev et al. | |
| 2014/0197810 A1* | 7/2014 | Huang | H02M 3/1584 |
| | | | 323/272 |
| 2016/0233766 A1* | 8/2016 | Todorov | H02M 3/1584 |
| 2017/0126074 A1 | 5/2017 | Muratov | |
| 2018/0287500 A1* | 10/2018 | Tsutsui | H02M 3/1584 |
| 2019/0131789 A1* | 5/2019 | Huang | H02M 3/1584 |
| 2019/0181741 A1* | 6/2019 | Terada | H02M 3/1584 |
| 2021/0398743 A1* | 12/2021 | Yao | H02M 3/1566 |

FOREIGN PATENT DOCUMENTS

| | | | |
|---|---|---|---|
| CN | 101494415 A | | 7/2009 |
| CN | 103141021 A | | 6/2013 |
| CN | 104796004 A | | 7/2015 |
| CN | 105262335 A | | 1/2016 |
| CN | 106059297 A | | 10/2016 |
| CN | 108809079 A | | 11/2018 |
| DE | 202019000042 U1 | | 5/2019 |
| IN | 109286311 A | | 1/2019 |
| JP | 2007221981 A | | 8/2007 |
| KR | 101877015 B1 | | 7/2018 |
| TW | 201218223 A | | 5/2012 |
| WO | 2011149944 A2 | | 12/2011 |

OTHER PUBLICATIONS

Hu Jie et al, "Low Ripple Digital DC/DC Power Supply Based on Coupled-inductor", Power Electronics, vol. 43, No. 12, with an English Abstract, 3 pages, Dec. 2009.

Xie Jianghua et al, "A Three-inductor Dual-buck Inverter", Proceedings of the CSEE, Chin. Soc. for Elec. Eng, vol. 34, No. 21, 10 pages, Jul. 25, 2014.

Extended European Search Report issued in European Application No. 20917525.6 dated Nov. 18, 2022.

Chinese Notice of Allowance issued in Chinese Application No. 202080001361.1 dated May 7, 2022.

Chinese International Search Report and Written Opinion issued in PCT Application No. PCT/CN2020/074328 dated Nov. 12, 2020.

\* cited by examiner

SWITCH-MODE POWER SUPPLY

CROSS-REFERENCE TO RELATED APPLICATIONS

This application is a continuation of International Application No. PCT/CN2020/074328, filed on Feb. 5, 2020, the disclosure of which is hereby incorporated by reference in its entirety.

TECHNICAL FIELD

Embodiments of this application relate to the field of circuit technologies, and in particular, to a switch-mode power supply (SMPS).

BACKGROUND

A switch-mode power supply is widely applied to various electronic products, especially mobile devices such as mobile phones and notebook computers. These mobile devices present a high demand for miniaturization of the switch-mode power supply and improvement of power conversion efficiency within a wide range of loads. A switch-mode power supply applied to the mobile phone is used as an example. The switch-mode power supply needs to supply power to a plurality of electronic modules or components in the mobile phone within a very small space, and conversion efficiency of the switch-mode power supply affects heat dissipation performance. Therefore, good heat dissipation performance and miniaturization of the components of the switch-mode power supply become very important.

Currently, the switch-mode power supply may include: a chip integrated control circuit, a power transistor, a capacitor, and an inductor. The inductor has an input terminal and an output terminal. The input terminal of the inductor is connected to the power transistor (which is turned on and off by the chip integrated control circuit), and the output terminal of the inductor is connected to the capacitor. Under control of the chip integrated control circuit, electric energy output by the power transistor passes through the inductor to generate an output voltage. To implement high conversion efficiency of the switch-mode power supply under light load conditions, an inductor with a large inductance value needs to be used in the switch-mode power supply, while an inductor with a small inductance value needs to be used in the switch-mode power supply to implement high conversion efficiency of the switch-mode power supply under medium and heavy load conditions. Therefore, regardless of which size inductor is used in the switch-mode power supply, the switch-mode power supply can only implement high conversion efficiency within a range of a certain load, but cannot implement high conversion efficiency across a wide range of loads. In view of the foregoing description, how to implement high conversion efficiency across a wide range of loads is still an unresolved problem at present.

SUMMARY

Embodiments of this application provide a switch-mode power supply, to implement high conversion efficiency within a wide range of loads.

To resolve the foregoing technical problem, embodiments of this application provide the following technical solutions.

According to a first aspect, an embodiment of this application provides a switch-mode power supply. The switch-mode power supply includes: a first switch circuit, at least one second switch circuit, a switch control circuit, a first inductor switching circuit, a coupled inductor, a voltage input end, and a voltage output end. The first switch circuit is connected to the voltage input end, the switch control circuit, and the coupled inductor, and configured to receive a power voltage input from the voltage input end and a first switch control signal input by the switch control circuit, and inject a first current to the coupled inductor under control of the first switch control signal. Each second switch circuit in the at least one second switch circuit is connected to the voltage input end, the switch control circuit, and the coupled inductor, and configured to receive the power voltage and a second switch control signal input by the switch control circuit, and inject a second current to the coupled inductor under control of the second switch control signal. The first inductor switching circuit is connected to each second switch circuit, and configured to receive a first switching control signal, and in response to the first switching control signal, maintain signal transmission between each second switch circuit and the coupled inductor, or disconnect the signal transmission between each second switch circuit and the coupled inductor. The switch control circuit is connected to the first switch circuit, each second switch circuit, and the voltage output end, and configured to collect a feedback signal, and output, based on the feedback signal, the first switch control signal to the first switch circuit and the second switch control signal to each second switch circuit, where the feedback signal indicates an output voltage at the voltage output end. The coupled inductor is connected to the first switch circuit, each second switch circuit, and the voltage output end, and configured to inject the first current to the voltage output end, or inject the first current and the second current to the voltage output end. In the foregoing solution, the first inductor switching circuit in the switch-mode power supply is connected to each second switch circuit. The first inductor switching circuit may be configured to receive the first switching control signal, and in response to the first switching control signal, maintain the signal transmission between each second switch circuit and the coupled inductor, or disconnect the signal transmission between each second switch circuit and the coupled inductor. The coupled inductor in the switch-mode power supply may be connected to the first switch circuit. Therefore, signal transmission between the coupled inductor and the first switch circuit may be implemented. Signal transmission between the coupled inductor and the second switch circuit may be implemented under control of the first inductor switching circuit. Alternatively, the signal transmission between the coupled inductor and the second switch circuit may be disconnected under the control of the first inductor switching circuit. Therefore, under the control of the first inductor switching circuit, the coupled inductor has two signal transmission modes: One is signal transmission only with the first switch circuit, and the other is signal transmissions with the first switch circuit and the second switch circuit. Therefore, according to different control manners of the first inductor switching circuit, the coupled inductor may form different inductance parameters based on different connected switch circuits, and currents injected by the coupled inductor to the voltage output end are also different. Therefore, different inductance performance may be separately configured based on different load requirements, to implement high conversion efficiency within a wide range of loads.

In a possible implementation, the first switch circuit includes a first upper power transistor and a first lower power transistor. The first upper power transistor is separately connected to the voltage input end, the switch control circuit, and the coupled inductor. The first lower power transistor is separately connected to the coupled inductor, the switch control circuit, and a ground terminal. In the foregoing solution, the first switch circuit may include two power transistors. Each power transistor may include a gate, a source, and a drain. According to different positions of the two power transistors in the switch circuit, the two power transistors are respectively referred to as the first upper power transistor and the first lower power transistor. The first upper power transistor is separately connected to the voltage input end, the switch control circuit, and the coupled inductor. For example, a gate of the first upper power transistor is connected to the switch control circuit, a drain of the first upper power transistor is connected to the coupled inductor, and a source of the first upper power transistor is connected to the voltage input end. The first lower power transistor is separately connected to the coupled inductor, the switch control circuit, and the ground terminal. For example, a gate of the first lower power transistor is connected to the switch control circuit, a source of the first lower power transistor is connected to the ground terminal, and a drain of the first lower power transistor is connected to the coupled inductor. The first current may be injected to the coupled inductor by using the first upper power transistor and the first lower power transistor in the first switch circuit, so that the coupled inductor can store electric energy.

In a possible implementation, each second switch circuit includes a second upper power transistor and a second lower power transistor. The second upper power transistor is separately connected to the voltage input end, the switch control circuit, and the coupled inductor. The second lower power transistor is separately connected to the coupled inductor, the switch control circuit, and the ground terminal. In the foregoing solution, the second switch circuit may include two power transistors. Each power transistor may include a gate, a source, and a drain. According to the different positions of the two power transistors in the circuit, the two power transistors are respectively referred to as the second upper power transistor and the second lower power transistor. The second upper power transistor is separately connected to the voltage input end, the switch control circuit, and the coupled inductor. For example, a gate of the second upper power transistor is connected to the switch control circuit, a drain of the second upper power transistor is connected to the coupled inductor, and a source of the second upper power transistor is connected to the voltage input end. The second lower power transistor is separately connected to the coupled inductor, the switch control circuit, and the ground terminal. For example, a gate of the second lower power transistor is connected to the switch control circuit, a source of the second lower power transistor is connected to the ground terminal, and a drain of the second lower power transistor is connected to the coupled inductor. The second current may be injected to the coupled inductor by using the second upper power transistor and the second lower power transistor in the second switch circuit, so that the coupled inductor can store the electric energy.

In a possible implementation, the first inductor switching circuit includes at least one first control switch. One first control switch in the at least one first control switch corresponds to one second switch circuit in the at least one second switch circuit, is connected between the voltage input end and the second upper power transistor of the one second switch circuit in the at least one second switch circuit, and is configured to maintain, based on the first switching control signal, signal transmission between the second upper power transistor and the coupled inductor, or disconnect the signal transmission between the second upper power transistor and the coupled inductor. In the foregoing solution, the first inductor switching circuit may include a control switch, and may be turned off or on based on different first switching control signals. When the first inductor switching circuit is closed, the signal transmission between each second switch circuit and the coupled inductor is maintained. When the first inductor switching circuit is open, the signal transmission between each second switch circuit and the coupled inductor is disconnected. The one first control switch in the at least one first control switch corresponds to the one second switch circuit in the at least one second switch circuit. To be specific, each second switch circuit may be connected to the one first control switch, the first control switch may be connected between the voltage input end and the second upper power transistor of the one second switch circuit in the at least one second switch circuit. The first control switch may be configured to maintain, based on the first switching control signal, the signal transmission between the second upper power transistor and the coupled inductor, or disconnect the signal transmission between the second upper power transistor and the coupled inductor. Therefore, the signal transmission between the second upper power transistor and the coupled inductor may be implemented by using the first control switch. Therefore, according to the different control manners of the first inductor switching circuit, the coupled inductor may form the different inductance parameters based on the different connected switch circuits, and the currents injected by the coupled inductor to the voltage output end are also different. Therefore, the different inductance performance may be separately configured based on the different load requirements, to implement high conversion efficiency within the wide range of loads.

In a possible implementation, the first inductor switching circuit includes at least one second control switch. One second control switch in the at least one second control switch corresponds to the one second switch circuit in the at least one second switch circuit, is connected between the second lower power transistor of the one second switch circuit in the at least one second switch circuit and the ground terminal, and is configured to maintain, based on the first switching control signal, signal transmission between the second lower power transistor and the coupled inductor, or disconnect the signal transmission between the second lower power transistor and the coupled inductor. In the foregoing solution, the first inductor switching circuit may include the control switch, and may be turned off or on based on the different first switching control signals. When the first inductor switching circuit is closed, the signal transmission between each second switch circuit and the coupled inductor is maintained. When the first inductor switching circuit is open, the signal transmission between each second switch circuit and the coupled inductor is disconnected. The one second control switch in the at least one second control switch corresponds to the one second switch circuit in the at least one second switch circuit. To be specific, each second switch circuit may be connected to the one second control switch. The second control switch may be connected between the second lower power transistor of the one second switch circuit in the at least one second switch circuit and the ground terminal. The second control switch may be configured to maintain, based on the first switching control signal, the signal transmission between the second lower power transistor and the coupled inductor, or disconnect the signal transmission between the second lower power transistor and the coupled inductor. Therefore, the signal transmission between the second lower power transistor and the coupled inductor may be implemented by using the second control switch. Therefore, according to the different control manners of the first inductor switching circuit, the coupled inductor may form the different inductance parameters based on the different connected switch circuits, and the currents injected by the coupled inductor to the voltage output end are also different. Therefore, the different inductance performance may be separately configured based on the different load requirements, to implement high conversion efficiency within the wide range of loads.

In a possible implementation, the coupled inductor includes at least two inductors having a coupling relationship. Any two adjacent inductors of the at least two inductors are connected in series. An input terminal of a first inductor in the at least two inductors is connected between the first switch circuit and the voltage output end. A second inductor in the at least two inductors is connected between the first switch circuit and the one second switch circuit in the at least one second switch circuit, or connected between two second switch circuits in the at least one second switch circuit. In the foregoing solution, the coupled inductor includes the at least two inductors having a coupling relationship. For example, the coupled inductor may include the first inductor and at least one second inductor. The any two adjacent inductors of the at least two inductors are connected in series. Serial connection means that the input terminal of the one inductor is connected to the output terminal of the another adjacent inductor. The input terminal of the first inductor is connected between the first switch circuit and the voltage output end. When there is only one second inductor in the coupled inductors, the second inductor is connected between the first switch circuit and the one second switch circuit in the at least one second switch circuit. When there are two or more second inductors in the coupled inductors, one second inductor is connected between the first switch circuit and the one second switch circuit in the at least one second switch circuit, and other second inductors are connected between the two second switch circuits in the at least one second switch circuit. The following uses an example in which the coupled inductor includes the first inductor and the second inductor. The input terminal of the first inductor and an input terminal of the second inductor are dotted terminals. The input terminal of the second inductor is separately connected to the first switch circuit and the second upper power transistor. In this embodiment of this application, the high conversion efficiency of the switch-mode power supply within the wide range of loads may be implemented by using a plurality of serially-connected inductors. In this embodiment of this application, the at least two inductors having a coupling relationship may be used to implement the high conversion efficiency of the switch-mode power supply within the wide range of loads, and occupied board space of the at least two inductors having a coupling relationship is much less than that of two or more inductors (parallelly-connected multiphase), so that the at least two inductors having a coupling relationship may be applied to various types of switch-mode power supply topologies, to implement a miniaturized design of the switch-mode power supply.

In a possible implementation, the first inductor switching circuit includes at least one third control switch. One third control switch in the at least one third control switch corresponds to the one second switch circuit in the at least one second switch circuit, is connected between the one second switch circuit in the at least one second switch circuit and the coupled inductor, and is configured to maintain, based on the first switching control signal, signal transmission between each second switch circuit and the coupled inductor, or disconnect the signal transmission between each second switch circuit and the coupled inductor. In the foregoing solution, the first inductor switching circuit may include the at least one third control switch, and may be turned off or on based on the different first switching control signals. When the first inductor switching circuit is closed, signal transmission between each second switch circuit and the coupled inductor is maintained. When the first inductor switching circuit is open, the signal transmission between each second switch circuit and the coupled inductor is disconnected. The one third control switch in the at least one third control switch corresponds to the one second switch circuit in the at least one second switch circuit. To be specific, each second switch circuit may be connected to the one third control switch, the third control switch may be connected between the second upper power transistor of the one second switch circuit in the at least one second switch circuit and the coupled inductor, and the third control switch may be configured to maintain, based on the first switching control signal, signal transmission between the second upper power transistor and the coupled inductor, or disconnect the signal transmission between the second upper power transistor and the coupled inductor. Therefore, the signal transmission between the second upper power transistor and the coupled inductor may be implemented by using the third control switch. Therefore, according to the different control manners of the first inductor switching circuit, the coupled inductor may form different inductance parameters based on the different connected switch circuits, and the currents injected by the coupled inductor to the voltage output end are also different. Therefore, different inductance performance may be separately configured based on the different load requirements, to implement high conversion efficiency within the wide range of loads.

In a possible implementation, the coupled inductor includes at least two inductors having a coupling relationship. Any two adjacent inductors of the at least two inductors are connected in series; an input terminal of a first inductor in the at least two inductors is connected between the first switch circuit and the voltage output end. A second inductor in the at least two inductors is connected between the first switch circuit and the one third control switch in the at least one third control switch, or connected between two third control switches in the at least one third control switch. In the foregoing solution, high conversion efficiency of the switch-mode power supply within the wide range of loads may be implemented by using the plurality of serially-connected inductors. In this embodiment of this application, the at least two inductors having a coupling relationship may be used to implement the high conversion efficiency of the switch-mode power supply within the wide range of loads, and the occupied board space of the at least two inductors having a coupling relationship is much less than that of the two or more inductors (parallelly-connected multiphase), so that the at least two inductors having a coupling relationship may be applied to the various types of switch-mode power supply topologies, to implement the miniaturized design of the switch-mode power supply.

In a possible implementation, the switch control circuit includes an error amplifier, connected to the voltage output end, and configured to collect the feedback signal and generate an amplification result based on the feedback signal; a comparator, connected to the error amplifier, and configured to compare the amplification result with a reference signal, to generate a comparison result; and a pulse width modulator, connected to the comparator, the first switch circuit, and each second switch circuit, and configured to output, based on the comparison result, the first switch control signal to the first switch circuit and the second switch control signal to each second switch circuit. In the foregoing solution, the error amplifier may obtain the feedback signal from the voltage output end, and the error amplifier may generate the amplification result and output the amplification result to the comparator. The comparator may obtain the amplification result of the feedback signal from the error amplifier, the comparator may further obtain a preset reference signal, and the comparator may generate and send the comparison result to the pulse width modulator. The pulse width modulator may receive the comparison result from the comparator and generate a switch control signal based on the received comparison result. For example, the pulse width modulator is connected to the first switch circuit and each second switch circuit, and the pulse width modulator outputs, based on the comparison result, the first switch control signal to the first switch circuit and the second switch control signal to each second switch circuit. In this embodiment of this application, the output voltage at the voltage output end may be precisely controlled by using a switch control circuit using the structure.

In a possible implementation, the switch-mode power supply further includes a third switch circuit, at least one fourth switch circuit, and a second inductor switching circuit. The third switch circuit is connected to the voltage output end, the switch control circuit, and the coupled inductor, and configured to receive a third switch control signal input by the switch control circuit, and inject a third current from the coupled inductor to the voltage output end under control of the third switch control signal. Each fourth switch circuit in the at least one fourth switch circuit is connected to the voltage output end, the switch control circuit, and the coupled inductor, and configured to receive a fourth switch control signal input by the switch control circuit, and inject a fourth current from the coupled inductor to the voltage output end under control of the fourth switch control signal. The second inductor switching circuit is connected to each fourth switch circuit, and configured to receive a second switching control signal, and in response to the second switching control signal, maintain signal transmission between each fourth switch circuit and the coupled inductor, or disconnect the signal transmission between each fourth switch circuit and the coupled inductor. The switch control circuit is connected to the third switch circuit, each fourth switch circuit, and the voltage output end, and further configured to output, based on the feedback signal, the third switch control signal to the third switch circuit and the fourth switch control signal to each fourth switch circuit. The coupled inductor is further connected to the third switch circuit, each fourth switch circuit, and the voltage output end, and configured to inject the third current to the voltage output end, or inject the third current and the fourth current to the voltage output end. In the foregoing solution, under control of the second inductor switching circuit, the coupled inductor has two signal transmission modes: One is signal transmission between the coupled inductor and only the third switch circuit, and the other is signal transmissions between the coupled inductor and the third switch circuit and between the coupled inductor and the fourth switch circuit. Therefore, according to the different control manners of the second inductor switching circuit, the coupled inductor may form different inductance parameters based on the different connected switch circuits, and the currents injected by the coupled inductor to the voltage output end are also different. Therefore, the different inductance performance may be separately configured based on the different load requirements, to implement the high conversion efficiency within the wide range of loads.

In a possible implementation, the third switch circuit includes a third upper power transistor and a third lower power transistor. The third upper power transistor is separately connected to the voltage output end, the switch control circuit, and the coupled inductor. The third lower power transistor is separately connected to the coupled inductor, the switch control circuit, and the ground terminal. In the foregoing solution, the third switch circuit may include two power transistors. Each power transistor may include a gate, a source, and a drain. According to the different positions of the two power transistors in the switch circuit, the two power transistors are respectively referred to as the third upper power transistor and the third lower power transistor. The third upper power transistor is separately connected to the voltage output end, the switch control circuit, and the coupled inductor. For example, a gate of the third upper power transistor is connected to the switch control circuit, a drain of the third upper power transistor is connected to the coupled inductor, and a source of the third upper power transistor is connected to the voltage output end. The third lower power transistor is separately connected to the coupled inductor, the switch control circuit, and the ground terminal. For example, a gate of the third lower power transistor is connected to the switch control circuit, a source of the third lower power transistor is connected to the ground terminal, and a drain of the third lower power transistor is connected to the coupled inductor. The coupled inductor may inject the third current to the voltage output end by using the third upper power transistor and the third lower power transistor in the third switch circuit.

In a possible implementation, each fourth switch circuit includes a fourth upper power transistor and a fourth lower power transistor. The fourth upper power transistor is separately connected to the voltage output end, the switch control circuit, and the coupled inductor. The fourth lower power transistor is separately connected to the coupled inductor, the switch control circuit, and the ground terminal. In the foregoing solution, the fourth switch circuit may include two power transistors. Each power transistor may include a gate, a source, and a drain. According to the different positions of the two power transistors in the circuit, the two power transistors are respectively referred to as the fourth upper power transistor and the fourth lower power transistor. The fourth upper power transistor is separately connected to the voltage input end, the switch control circuit, and the coupled inductor. For example, a gate of the fourth upper power transistor is connected to the switch control circuit, a drain of the fourth upper power transistor is connected to the coupled inductor, and a source of the fourth upper power transistor is connected to the voltage output end. The fourth lower power transistor is separately connected to the coupled inductor, the switch control circuit, and the ground terminal. For example, a gate of the fourth lower power transistor is connected to the switch control circuit, a source of the fourth lower power transistor is connected to the ground terminal, and a drain of the fourth lower power transistor is connected to the coupled inductor. The coupled inductor may inject the fourth current to the voltage output end by using the fourth upper power transistor and the fourth lower power transistor in the fourth switch circuit.

In a possible implementation, the second inductor switching circuit includes at least one fourth control switch. One fourth control switch in the at least one fourth control switch corresponds to one fourth switch circuit in the at least one fourth switch circuit, is connected between the voltage output end and the fourth upper power transistor of the one fourth switch circuit in the at least one fourth switch circuit, and is configured to maintain, based on the second switching control signal, signal transmission between the fourth upper power transistor and the coupled inductor, or disconnect the signal transmission between the fourth upper power transistor and the coupled inductor. In the foregoing solution, the second inductor switching circuit may include the control switch, and may be turned off or on based on the different second switching control signals. When the second inductor switching circuit is closed, the signal transmission between each fourth switch circuit and the coupled inductor is maintained. When the second inductor switching circuit is open, the signal transmission between each fourth switch circuit and the coupled inductor is disconnected. The one fourth control switch in the at least one fourth control switch corresponds to the one fourth switch circuit in the at least one fourth switch circuit. To be specific, each fourth switch circuit may be connected to the one fourth control switch, the fourth control switch may be connected between the voltage output end and the fourth upper power transistor of the one fourth switch circuit in the at least one fourth switch circuit, and the fourth control switch may be configured to maintain, based on the second switching control signal, signal transmission between the fourth upper power transistor and the coupled inductor, or disconnect the signal transmission between the fourth upper power transistor and the coupled inductor. Therefore, the signal transmission between the fourth upper power transistor and the coupled inductor may be implemented by using the fourth control switch. Therefore, according to the different control manners of the second inductor switching circuit, the coupled inductor may form the different inductance parameters based on the different connected switch circuits, and the currents injected by the coupled inductor to the voltage output end are also different. Therefore, different inductance performance may be separately configured based on the different load requirements, to implement the high conversion efficiency within the wide range of loads.

In a possible implementation, the second inductor switching circuit includes at least one fifth control switch. One fifth control switch in the at least one fifth control switch corresponds to the one fourth switch circuit in the at least one fourth switch circuit, is connected between the fourth lower power transistor of the one fourth switch circuit in the at least one fourth switch circuit and the ground terminal, and is configured to maintain, based on the second switching control signal, signal transmission between the fourth lower power transistor and the coupled inductor, or disconnect the signal transmission between the fourth lower power transistor and the coupled inductor. In the foregoing solution, the second inductor switching circuit may include the control switch, and may be turned off or on based on the different second switching control signals. When the second inductor switching circuit is closed, the signal transmission between each fourth switch circuit and the coupled inductor is maintained. When the second inductor switching circuit is open, the signal transmission between each fourth switch circuit and the coupled inductor is disconnected. The one fifth control switch in the at least one fifth control switch corresponds to the one fourth switch circuit in the at least one fourth switch circuit. To be specific, each fourth switch circuit may be connected to the one fifth control switch, the fifth control switch may be connected between the fourth lower power transistor of the one fourth switch circuit in the at least one fourth switch circuit and the ground terminal, and the fifth control switch may be configured to maintain, based on the second switching control signal, signal transmission between the fourth lower power transistor and the coupled inductor, or disconnect the signal transmission between the fourth lower power transistor and the coupled inductor. Therefore, the signal transmission between the fourth lower power transistor and the coupled inductor may be implemented by using the fifth control switch. Therefore, according to the different control manners of the second inductor switching circuit, the coupled inductor may form the different inductance parameters based on the different connected switch circuits, and the currents injected by the coupled inductor to the voltage output end are also different. Therefore, different inductance performance may be separately configured based on the different load requirements, to implement the high conversion efficiency within the wide range of loads.

In a possible implementation, the first inductor switching circuit includes at least one sixth control switch. One sixth control switch in the at least one sixth control switch corresponds to the one fourth switch circuit in the at least one fourth switch circuit, is connected between the one fourth switch circuit in the at least one fourth switch circuit and the coupled inductor, and is configured to maintain, based on the second switching control signal, signal transmission between each fourth switch circuit and the coupled inductor, or disconnect the signal transmission between each fourth switch circuit and the coupled inductor. In the foregoing solution, the second inductor switching circuit may include the control switch, and may be turned off or on based on the different second switching control signals. When the second inductor switching circuit is closed, signal transmission between each fourth switch circuit and the coupled inductor is maintained. When the second inductor switching circuit is open, the signal transmission between each fourth switch circuit and the coupled inductor is disconnected. The one sixth control switch in the at least one sixth control switch corresponds to the one fourth switch circuit in the at least one fourth switch circuit. To be specific, each fourth switch circuit may be connected to the one sixth control switch, the sixth control switch may be connected between the fourth upper power transistor of the one fourth switch circuit in the at least one fourth switch circuit, and the sixth control switch may be configured to maintain, based on the second switching control signal, signal transmission between the fourth upper power transistor and the coupled inductor, or disconnect the signal transmission between the fourth upper power transistor and the coupled inductor. Therefore, signal transmission between the fourth upper power transistor and the coupled inductor may be implemented by using the sixth control switch. Therefore, according to the different control manners of the second inductor switching circuit, the coupled inductor may form different inductance parameters based on the different connected switch circuits, and the currents injected by the coupled inductor to the voltage output end are also different. Therefore, the different inductance performance may be separately configured based on the different load requirements, to implement high conversion efficiency within the wide range of loads.

According to a second aspect, an embodiment of this application provides a switch-mode power supply. The switch-mode power supply includes: a first switch circuit, at least one second switch circuit, a switch control circuit, a first inductor switching circuit, a coupled inductor, a voltage input end, and a voltage output end. The first switch circuit is connected to the voltage output end, the switch control circuit, and the coupled inductor, and configured to receive a first switch control signal input by the switch control circuit, and inject a first current from the coupled inductor to the voltage output end under control of the first switch control signal. Each second switch circuit in the at least one second switch circuit is connected to the voltage output end, the switch control circuit, and the coupled inductor, and configured to receive a second switch control signal input by the switch control circuit, and inject a second current from the coupled inductor to the voltage output end under control of the second switch control signal. The first inductor switching circuit is connected to each second switch circuit, and configured to receive a first switching control signal, and in response to the first switching control signal, maintain signal transmission between each second switch circuit and the coupled inductor, or disconnect the signal transmission between each second switch circuit and the coupled inductor. The switch control circuit is connected to the first switch circuit, each second switch circuit, and the voltage output end, and configured to collect a feedback signal, and output, based on the feedback signal, the first switch control signal to the first switch circuit and the second switch control signal to each second switch circuit, where the feedback signal indicates an output voltage at the voltage output end. The coupled inductor is connected to the first switch circuit, each second switch circuit, and the voltage input end, and configured to inject the first current to the voltage output end, or inject the first current and the second current to the voltage output end. In the foregoing solution, the first inductor switching circuit in the switch-mode power supply is connected to each second switch circuit. The first inductor switching circuit may be configured to receive the first switching control signal, and in response to the first switching control signal, maintain signal transmission between each second switch circuit and the coupled inductor, or disconnect the signal transmission between each second switch circuit and the coupled inductor. The coupled inductor in the switch-mode power supply may be connected to the first switch circuit. Therefore, signal transmission between the coupled inductor and the first switch circuit may be implemented. Signal transmission between the coupled inductor and the second switch circuit may be implemented under control of the first inductor switching circuit. Alternatively, the signal transmission between the coupled inductor and the second switch circuit may be disconnected under the control of the first inductor switching circuit. Therefore, under the control of the first inductor switching circuit, the coupled inductor has two signal transmission modes: One is signal transmission only with the first switch circuit, and the other is signal transmissions with the first switch circuit and the second switch circuit. Therefore, according to different control manners of the first inductor switching circuit, the coupled inductor may form different inductance parameters based on different connected switch circuits, and currents injected by the coupled inductor to the voltage output end are also different. Therefore, different inductance performance may be separately configured based on different load requirements, to implement the high conversion efficiency within the wide range of loads.

In a possible implementation, the first switch circuit includes a first upper power transistor and a first lower power transistor. The first upper power transistor is separately connected to the voltage output end, the switch control circuit, and the coupled inductor. The first lower power transistor is separately connected to the coupled inductor, the switch control circuit, and a ground terminal. In the foregoing solution, the first switch circuit may include two power transistors. Each power transistor may include a gate, a source, and a drain. According to different positions of the two power transistors in the circuit, the two power transistors are respectively referred to as the first upper power transistor and the first lower power transistor. The first upper power transistor is separately connected to the voltage output end, the switch control circuit, and the coupled inductor. For example, a gate of the first upper power transistor is connected to the switch control circuit, a drain of the first upper power transistor is connected to the coupled inductor, and a source of the first upper power transistor is connected to the voltage output end. The first lower power transistor is separately connected to the coupled inductor, the switch control circuit, and the ground terminal. For example, a gate of the first lower power transistor is connected to the switch control circuit, a source of the first lower power transistor is connected to the ground terminal, and a drain of the first lower power transistor is connected to the coupled inductor. The coupled inductor may inject the first current to the voltage output end by using the first upper power transistor and the first lower power transistor in the first switch circuit.

In a possible implementation, each second switch circuit includes a second upper power transistor and a second lower power transistor. The second upper power transistor is separately connected to the voltage output end, the switch control circuit, and the coupled inductor. The second lower power transistor is separately connected to the coupled inductor, the switch control circuit, and the ground terminal. In the foregoing solution, the second switch circuit may include two power transistors. Each power transistor may include a gate, a source, and a drain. According to the different positions of the two power transistors in the circuit, the two power transistors are respectively referred to as the second upper power transistor and the second lower power transistor. The second upper power transistor is separately connected to the voltage output end, the switch control circuit, and the coupled inductor. For example, a gate of the second upper power transistor is connected to the switch control circuit, a drain of the second upper power transistor is connected to the coupled inductor, and a source of the second upper power transistor is connected to the voltage output end. The second lower power transistor is separately connected to the coupled inductor, the switch control circuit, and the ground terminal. For example, a gate of the second lower power transistor is connected to the switch control circuit, a source of the second lower power transistor is connected to the ground terminal, and a drain of the second lower power transistor is connected to the coupled inductor. The coupled inductor may inject the second current to the voltage output end by using the second upper power transistor and the second lower power transistor in the second switch circuit.

In a possible implementation, the first inductor switching circuit includes at least one first control switch. One first control switch in the at least one first control switch corresponds to one second switch circuit in the at least one second switch circuit, is connected between the voltage output end and the second upper power transistor of the one second switch circuit in the at least one second switch circuit, and is configured to maintain, based on the first switching control signal, signal transmission between the second upper power transistor and the coupled inductor, or disconnect the signal transmission between the second upper power transistor and the coupled inductor. In the foregoing solution, the first inductor switching circuit may include a control switch, and may be turned off or on based on different first switching control signals. When the first inductor switching circuit is closed, signal transmission between each second switch circuit and the coupled inductor is maintained. When the first inductor switching circuit is open, the signal transmission between each second switch circuit and the coupled inductor is disconnected. The one first control switch in the at least one first control switch corresponds to the one second switch circuit in the at least one second switch circuit. To be specific, each second switch circuit may be connected to the one first control switch, the first control switch may be connected between the voltage output end and the second upper power transistor of the one second switch circuit in the at least one second switch circuit. The first control switch may be configured to maintain, based on the first switching control signal, signal transmission between the second upper power transistor and the coupled inductor, or disconnect the signal transmission between the second upper power transistor and the coupled inductor. Therefore, the signal transmission between the second upper power transistor and the coupled inductor may be implemented by using the first control switch. Therefore, according to the different control manners of the first inductor switching circuit, the coupled inductor may form different inductance parameters based on the different connected switch circuits, and the currents injected by the coupled inductor to the voltage output end are also different. Therefore, the different inductance performance may be separately configured based on the different load requirements, to implement high conversion efficiency within the wide range of loads.

In a possible implementation, the first inductor switching circuit includes at least one second control switch. One second control switch in the at least one second control switch corresponds to the one second switch circuit in the at least one second switch circuit, is connected between the second lower power transistor of the one second switch circuit in the at least one second switch circuit and the ground terminal, and is configured to maintain, based on a second switching control signal, signal transmission between the second lower power transistor and the coupled inductor, or disconnect the signal transmission between the second lower power transistor and the coupled inductor. In the foregoing solution, the first inductor switching circuit may include the control switch, and may be turned off or on based on the different first switching control signals. When the first inductor switching circuit is closed, signal transmission between each second switch circuit and the coupled inductor is maintained. When the first inductor switching circuit is open, the signal transmission between each second switch circuit and the coupled inductor is disconnected. The one second control switch in the at least one second control switch corresponds to the one second switch circuit in the at least one second switch circuit. To be specific, each second switch circuit may be connected to the one second control switch. The second control switch may be connected between the second lower power transistor of the one second switch circuit in the at least one second switch circuit and the ground terminal. The second control switch may be configured to maintain, based on the first switching control signal, signal transmission between the second lower power transistor and the coupled inductor, or disconnect the signal transmission between the second lower power transistor and the coupled inductor. Therefore, signal transmission between the second lower power transistor and the coupled inductor may be implemented by using the second control switch. Therefore, according to the different control manners of the first inductor switching circuit, the coupled inductor may form different inductance parameters based on the different connected switch circuits, and the currents injected by the coupled inductor to the voltage output end are also different. Therefore, different inductance performance may be separately configured based on the different load requirements, to implement the high conversion efficiency within the wide range of loads.

In a possible implementation, the coupled inductor includes at least two inductors having a coupling relationship. Any two adjacent inductors of the at least two inductors are connected in series. An input terminal of a first inductor in the at least two inductors is connected between the voltage input end and the first switch circuit. A second inductor in the at least two inductors is connected between the first switch circuit and the one second switch circuit in the at least one second switch circuit, or connected between two second switch circuits in the at least one second switch circuit. In the foregoing solution, high conversion efficiency of the switch-mode power supply within the wide range of loads may be implemented by using a plurality of serially-connected inductors. In this embodiment of this application, the at least two inductors having a coupling relationship may be used to implement the high conversion efficiency of the switch-mode power supply within the wide range of loads, and occupied board space of at least two inductors having a coupling relationship is much less than that of the two or more inductors (parallelly-connected multiphase), so that the at least two inductors having a coupling relationship may be applied to various types of switch-mode power supply topologies, to implement a miniaturized design of the switch-mode power supply.

In a possible implementation, the first inductor switching circuit includes at least one third control switch. One third control switch in the at least one third control switch corresponds to the one second switch circuit in the at least one second switch circuit, is connected between the one second switch circuit in the at least one second switch circuit and the coupled inductor, and is configured to maintain, based on the first switching control signal, the signal transmission between each second switch circuit and the coupled inductor, or disconnect the signal transmission between each second switch circuit and the coupled inductor. In the foregoing solution, the first inductor switching circuit may include the control switch, and may be turned off or on based on the different first switching control signals. When the first inductor switching circuit is closed, the signal transmission between each second switch circuit and the coupled inductor is maintained. When the first inductor switching circuit is open, the signal transmission between each second switch circuit and the coupled inductor is disconnected. The one third control switch in the at least one third control switch corresponds to the one second switch circuit in the at least one second switch circuit. To be specific, each second switch circuit may be connected to the one third control switch, the third control switch may be connected between the second upper power transistor of the one second switch circuit in the at least one second switch circuit and the coupled inductor, and the third control switch may be configured to maintain, based on the first switching control signal, signal transmission between the second upper power transistor and the coupled inductor, or disconnect the signal transmission between the second upper power transistor and the coupled inductor. Therefore, the signal transmission between the second upper power transistor and the coupled inductor may be implemented by using the third control switch. Therefore, according to the different control manners of the first inductor switching circuit, the coupled inductor may form different inductance parameters based on the different connected switch circuits, and the currents injected by the coupled inductor to the voltage output end are also different. Therefore, different inductance performance may be separately configured based on the different load requirements, to implement the high conversion efficiency across a wide range of loads.

In a possible implementation, the coupled inductor includes at least two inductors having a coupling relationship. Any two adjacent inductors of the at least two inductors are connected in series. A first inductor in the at least two inductors is connected between the voltage input end and the first switch circuit. A second inductor in the at least two inductors is connected between the first switch circuit and the one second switch circuit in the at least one second switch circuit, or connected between two second switch circuits in the at least one second switch circuit. In the foregoing solution, high conversion efficiency of the switch-mode power supply within the wide range of loads may be implemented by using the plurality of serially-connected inductors. In this embodiment of this application, the at least two inductors having a coupling relationship may be used to implement high conversion efficiency of the switch-mode power supply within the wide range of loads, and the occupied board space of the at least two inductors having a coupling relationship is much less than that of the two or more inductors (parallelly-connected multiphase), so that the at least two inductors having a coupling relationship may be applied to the various types of switch-mode power supply topologies, to implement a miniaturized design of the switch-mode power supply.

In a possible implementation, the switch control circuit includes: an error amplifier, connected to the voltage output end, and configured to collect the feedback signal and generate an amplification result based on the feedback signal; a comparator, connected to the error amplifier, and configured to compare the amplification result with a reference signal, to generate a comparison result; and a pulse width modulator, connected to the comparator, the first switch circuit, and each second switch circuit, and configured to output, based on the comparison result, the first switch control signal to the first switch circuit and the second switch control signal to each second switch circuit. In the foregoing solution, the error amplifier may obtain the feedback signal from the voltage output end, and the error amplifier may generate the amplification result and output the amplification result to the comparator. The comparator may obtain the amplification result of the feedback signal from the error amplifier, the comparator may further obtain a preset reference signal, and the comparator may generate and send the comparison result to the pulse width modulator. The pulse width modulator may receive the comparison result from the comparator and generate a switch control signal based on the received comparison result. For example, the pulse width modulator is connected to the first switch circuit and each second switch circuit, and the pulse width modulator outputs, based on the comparison result, the first switch control signal to the first switch circuit and the second switch control signal to each second switch circuit. In this embodiment of this application, the output voltage at the voltage output end may be precisely controlled by using a switch control circuit using the structure.

According to a third aspect, an embodiment of this application provides a terminal device, including the switch-mode power supply according to any one of the first aspect or the possible designs of the second aspect.

According to a fourth aspect, an embodiment of this application provides a chip, including the switch-mode power supply according to any one of the first aspect or the possible designs of the second aspect.

DESCRIPTION OF EMBODIMENTS

Embodiments of this application provide a switch-mode power supply, to implement high conversion efficiency across a wide range of loads.

The following describes embodiments of this application with reference to the accompanying drawings. In the specification, claims, and accompanying drawings of this application, the terms "first", "second", and the like are intended to distinguish between similar objects but do not necessarily indicate a specific module or an apparatus. It should be understood that the terms used in such a way are interchangeable in proper circumstances, and this is merely a discrimination manner for describing objects having a same attribute in embodiments of this application. In addition, the terms "include", "have" and any other variants mean to cover the non-exclusive inclusion, so that a system, a product, or a device that includes a series of units is not necessarily limited to those units, but may include other units not expressly listed or inherent to such a product or device.

Technical solutions in embodiments of this application may be applied to various switch-mode power supplies. For example, the switch-mode power supply may include at least one of the following: a buck conversion circuit (referred to as a BUCK circuit), a buck-boost conversion circuit (referred to as a BUCK-BOOST circuit), a boost conversion circuit (referred to as a BOOST circuit), and a single inductor multiple output (SIMO) circuit. It is not limited that the switch-mode power supply may also be another circuit requiring power conversion. In addition, the switch-mode power supply provided in embodiments of this application is applicable to various communication devices. For example, the switch-mode power supply is applicable to a terminal device and a network device. For example, the switch-mode power supply on the terminal device may use the switch-mode power supply provided in embodiments of this application, to implement high conversion efficiency of the switch-mode power supply within a wide range of loads.

Figure 1:
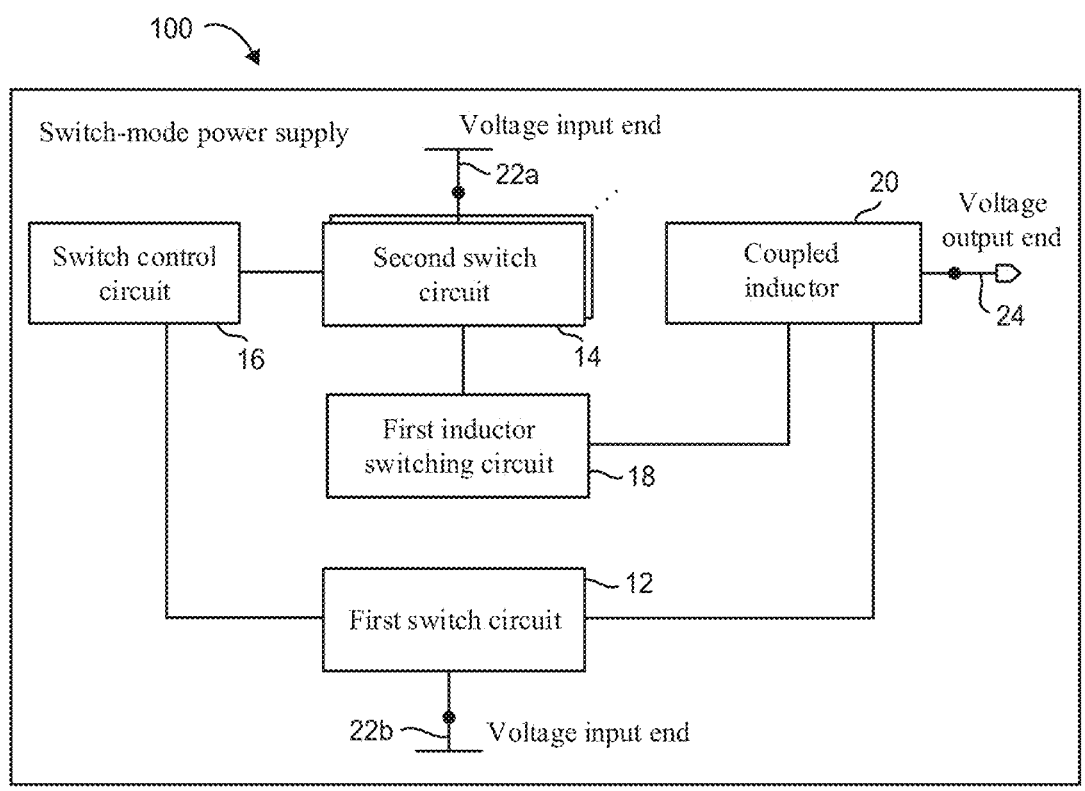
FIG. 1 is a schematic diagram of a structure of a switch-mode power supply according to an embodiment of this application.

Refer to FIG. 1. An embodiment of this application provides a switch-mode power supply 100. The switch-mode power supply 100 includes: a first switch circuit 12, at least one second switch circuit 14, a switch control circuit 16, a first inductor switching circuit 18, a coupled inductor 20, a voltage input end 22, and a voltage output end 24. The first switch circuit 12 is connected to the voltage input end 22b, the switch control circuit 16, and the coupled inductor 20, and is configured to receive a power voltage input from the voltage input end 22b and a first switch control signal input by the switch control circuit 16, and inject a first current to the coupled inductor 20 under control of the first switch control signal. Each second switch circuit 14 in the at least one second switch circuit is connected to the voltage input end 22a, the switch control circuit 16, and the coupled inductor 20, and configured to receive the power voltage and a second switch control signal input by the switch control circuit 16, and inject a second current to the coupled inductor 20 under control of the second switch control signal. The first inductor switching circuit 18 is connected to each second switch circuit 14, and configured to receive a first switching control signal, and in response to the first switching control signal, maintain signal transmission between each second switch circuit 14 and the coupled inductor 20, or disconnect the signal transmission between each second switch circuit and the coupled inductor. The switch control circuit 16 is connected to the first switch circuit 12, each second switch circuit 14, and the voltage output end 24, and configured to collect a feedback signal, and output, based on the feedback signal, the first switch control signal to the first switch circuit 12 and the second switch control signal to each second switch circuit 14. The feedback signal indicates an output voltage at the voltage output end 24. The coupled inductor 20 is connected to the first switch circuit 12, each second switch circuit 14, and the voltage output end 24, and configured to inject the first current to the voltage output end 24, or inject the first current and the second current to the voltage output end.

Figure 2:
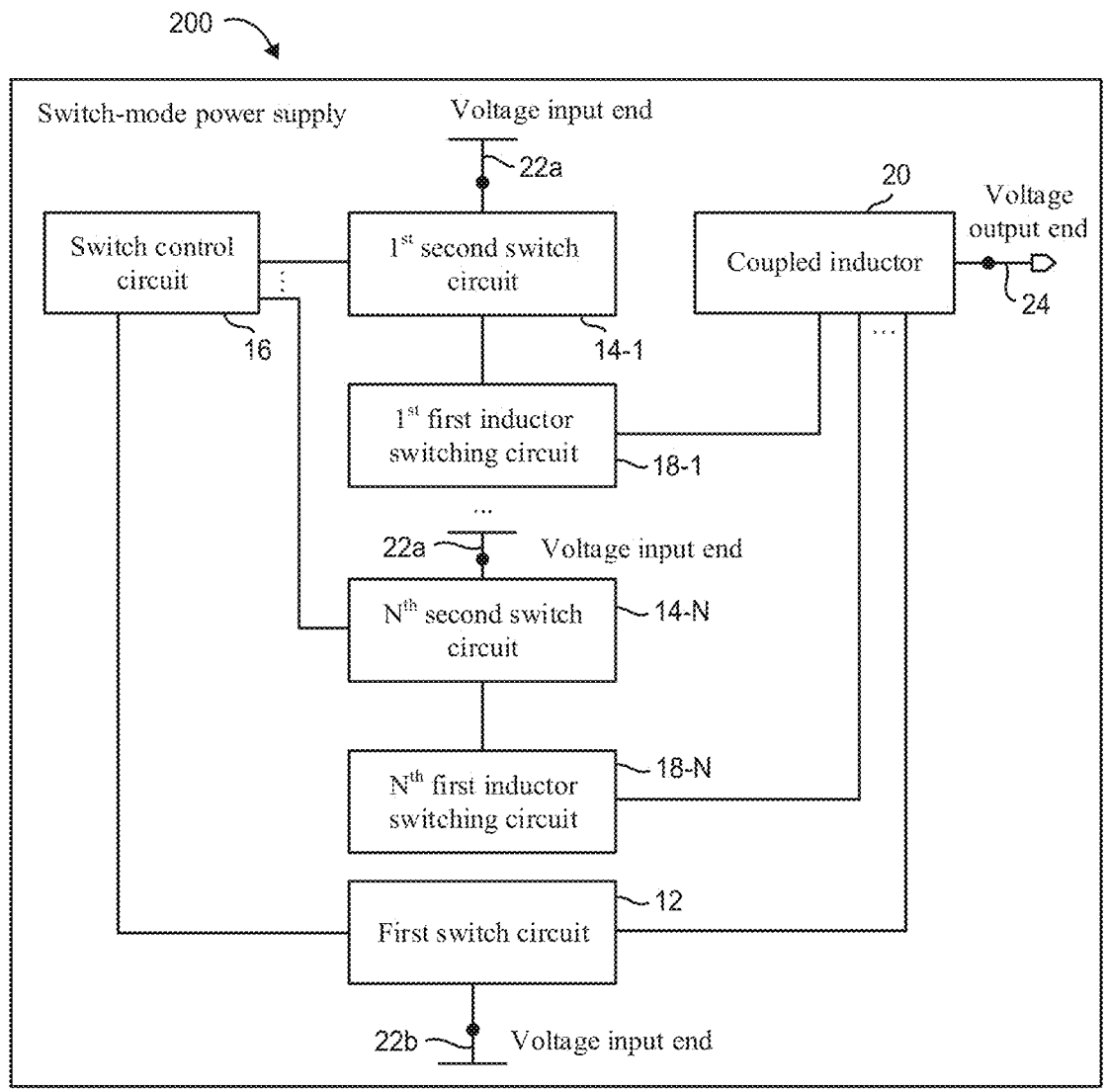
FIG. 2 is a schematic diagram of a structure of another switch-mode power supply according to an embodiment of this application.

It should be noted that FIG. 1 uses an example in which the switch-mode power supply 100 includes one second switch circuit 14. It is not limited that, in this embodiment of this application, the switch-mode power supply includes the at least one second switch circuit 14. For example, the switch-mode power supply 100 may include two second switch circuits 14, three second switch circuits, or more second switch circuits. FIG. 2 uses an example in which the switch-mode power supply 200 includes N second switch circuits 14-1, . . . , 14-N. A value of N may be a positive integer greater than or equal to 2. Each second switch circuit 14 may be connected to the switch control circuit 16, a first inductor switching circuit 18, and the coupled inductor 20. It is not limited that, in this embodiment of this application, the switch-mode power supply 200 may include at least one first inductor switching circuit 18. For example, FIG. 2 uses as an example in which the switch-mode power supply 200 includes N first inductor switching circuits. To be specific, each second switch circuit 14 may be connected to a corresponding first inductor switching circuit 18. Signal transmission between one second switch circuit 14 and the coupled inductor 20 may be implemented by using the corresponding first inductor switching circuit 18. For another example, the N second switch circuits 14-1, 14-N may also be connected to a same first inductor switching circuit 18. Signal transmission between the N second switch circuits 14-1, 14-N and the coupled inductor 20 may be implemented by using the common first inductor switching circuit 18.

In this embodiment of this application, the switch-mode power supply 200 may include different switch circuits. For example, the switch-mode power supply 200 includes the first switch circuit 12 and the at least one second switch circuit 14. Words such as "first" and "second" are used to distinguish the different switch circuits. For example, in this embodiment, a switch circuit connecting the coupled inductor 20 and the switch control circuit 16 is referred to as the "first switch circuit". A switch circuit connecting the first inductor switching circuit 18, the voltage input end 22, and the switch control circuit 16 is referred to as the "second switch circuit". The switch circuit may include power transistors. For example, in one embodiment, each switch circuit includes an upper power transistor and a lower power transistor. The upper power transistor and the lower power transistor are defined based on different positions of the power transistors in the switch circuit.

It may be understood that, in this embodiment of this application, a connection between elements in the switch-mode power supply 200 may be a direct physical connection implemented by using a transmission line, or the connection between the elements may be an indirect connection implemented by using a third-party component. For example, a first element and a second element may be connected by using a third element, or there is a connection between the first element and the second element. Therefore, a connection in this embodiment of this application indicates an electrical connection or electrical coupling in a broad sense.

In this embodiment of this application, the first switch circuit 12 is connected to the voltage input end 22b, the switch control circuit 16, and the coupled inductor 20. For example, the first switch circuit 12 has a plurality of terminals that may be separately connected to the voltage input end 22b, the switch control circuit 16, and the coupled inductor 20. The first switch circuit 12 may receive the power voltage input from the voltage input end 22b and the first switch control signal input to the first switch circuit by the switch control circuit 16. The first switch circuit 12 may further inject the first current to the coupled inductor 20 under the control of the first switch control signal. In this case, "injection" may also be referred to as "input". The first switch circuit 12 may receive the power voltage of the first switch circuit input from the voltage input end 22b, and then inject the first current to the coupled inductor 20, so that the coupled inductor may store the first current.

In the switch-mode power supply 200, a connection manner of the at least one second switch circuit 14 is different from that of the first switch circuit 16. For example, each second switch circuit 14 in the at least one second switch circuit is connected to the voltage input end 22a, the switch control circuit 16, and the coupled inductor 20, and configured to receive the power voltage and the second switch control signal input by the switch control circuit 16, and inject the second current to the coupled inductor 20 under the control of the second switch control signal.

It may be understood that the first switch control signal is different from the second switch control signal in this embodiment of this application. For example, a switch control signal input by the switch control circuit 16 to the first switch circuit 12 is referred to as the "first switch control signal", and a switch control signal input by the switch control circuit to the second switch circuit 14 is referred to as the "second switch control signal". The first current is different from the second current in this embodiment of this application. For example, a current injected to the coupled inductor 20 by the first switch circuit 12 is referred to as the "first current", and a current injected to the coupled inductor by the second switch circuit 14 is referred to as the "second current".

In this embodiment of this application, the switch-mode power supply 200 includes the switch control circuit 16. The switch control circuit 16 is separately connected to the first switch circuit 12 and the at least one second switch circuit 14. The switch control circuit 16 may be configured to precisely control the output voltage at the voltage output end 24. For example, the switch control circuit 16 may input a switch control signal to the first switch circuit 12 and the at least one second switch circuit 14, to precisely control the output voltage at the voltage output end 24. The switch control circuit 16 is connected to the first switch circuit 12, each second switch circuit 14, and the voltage output end 24. The switch control circuit 16 may receive a feedback signal from the voltage output end 24, and output, based on the feedback signal, the first switch control signal to the first switch circuit 12 and the second switch control signal to each second switch circuit 14. The feedback signal indicates the output voltage at the voltage output end 24. The feedback signal may be the output voltage itself. Alternately, the feedback signal may be another voltage signal related to the feedback signal or reflecting the feedback signal, for example, may be a partial voltage signal of the feedback signal. This is not limited in this embodiment. During actual application, the switch control circuit 16 may include: an error amplifier (EA), a comparator (CMP), and a pulse width modulator (PWM). The EA, the CMP, and the PWM may also be referred to as a drive circuit of a power transistor. For details, refer to examples of the switch control circuit 16 in the following embodiments.

In this embodiment of this application, the switch-mode power supply 200 may include the first inductor switching circuit 18. In the switch-mode power supply 200, the first inductor switching circuit 18 is connected between the second switch circuit 14 and the coupled inductor 20, and the first inductor switching circuit may receive the first switching control signal. Based on different content of the first switching control signal, the first inductor switching circuit 18 may have different functions. For example, if the first switching control signal indicates to maintain signal transmission, the first inductor switching circuit 18 maintains signal transmission between each second switch circuit 14 and the coupled inductor 20 in response to the first switching control signal. Alternatively, if the first switching control signal indicates to disconnect the signal transmission, the first inductor switching circuit 18 disconnects the signal transmission between each second switch circuit 14 and the coupled inductor 20 in response to the first switching control signal. Specifically, the first inductor switching circuit 18 may be a control switch, and may be turned off or on based on the different content of the first switching control signal. When the first inductor switching circuit 18 is closed, the signal transmission between each second switch circuit 14 and the coupled inductor 20 is maintained. When the first inductor switching circuit 18 is open, the signal transmission between each second switch circuit 14 and the coupled inductor 20 is disconnected. For another example, the first inductor switching circuit 18 may include a power transistor, and each second switch circuit 14 may be disconnected or connected to the coupled inductor 20 based on the different content of the first switching control signal, to control signal transmission between each second switch circuit and the coupled inductor. Specifically, in this embodiment, signal transmission between the second switch circuit 14 and the coupled inductor 20 refers to a transmission of a current signal or a control signal between the second switch circuit and the coupled inductor.

In this embodiment of this application, the switch-mode power supply 200 is connected with the voltage input end 22 and the voltage output end 24. A direct current power supply (PVDD) may provide an input voltage to the voltage input end 22. For example, the voltage input end 22 may be represented as Vin, the coupled inductor 20 injects a current to the voltage output end 24, and then the voltage output end may output a voltage. For example, the voltage output end 24 may be represented as Vout. For example, when the switch-mode power supply 200 is a BUCK circuit, the switch-mode power supply may include a plurality of voltage input ends 22a, 22b, . . . , and one voltage output end 24. For another example, when the switch-mode power supply 200 is a BOOST circuit, the switch-mode power supply may include one voltage input end 22 and a plurality of voltage output ends 24a, 24b, . . . . For another example, when the switch-mode power supply 200 is a BUCK-BOOST circuit, the switch-mode power supply may include a plurality of voltage input ends 22a, 22b, . . . , and a plurality of voltage output ends 24a, 24b, . . . .

In this embodiment of this application, the coupled inductor 20 refers to a plurality of inductors having a coupling relationship. Two terminals of the plurality of inductors, that are dotted terminals, may be respectively connected to the first switch circuit 12 and the first inductor switching circuit 18. The coupled inductor 20 may be connected to the first switch circuit 12, each second switch circuit 14, and the voltage output end 24. It can be learned from the foregoing description of the first inductor switching circuit 18 that, the first inductor switching circuit may maintain signal transmission between each second switch circuit 18 and the coupled inductor 20, or disconnect the signal transmission between each second switch circuit and the coupled inductor. When the first inductor switching circuit 18 maintains signal transmission between each second switch circuit 14 and the coupled inductor 20, the coupled inductor may receive the first current and the second current. When the first inductor switching circuit 18 disconnects the signal transmission between each second switch circuit 14 and the coupled inductor 20, the coupled inductor may receive the first current. Therefore, the coupled inductor 20 may have two different current injection manners. For example, the coupled inductor 20 may inject the first current to the voltage output end 24, or the coupled inductor may inject the first current and the second current to the voltage output end.

In this embodiment of this application, under control of the first inductor switching circuit 18, the coupled inductor 20 has two signal transmission modes: One is signal transmission between the coupled inductor and only the first switch circuit 12, and the other is signal transmissions between the coupled inductor and the first switch circuit and between the coupled inductor and the second switch circuit 14. Therefore, according to different control manners of the first inductor switching circuit 18, the coupled inductor 20 may form different inductance parameters based on different connected switch circuits, and currents injected by the coupled inductor to the voltage output end 24 are also different. Therefore, different inductance performance may be separately configured based on different load requirements, to implement high conversion efficiency across a wide range of loads.

In this embodiment of this application, depending on whether the coupled inductor 20 is connected to the first switch circuit 12, or connected to the first switch circuit and the second switch circuit 14, the coupled inductor has different inductance parameters. The inductance parameter may include a plurality of types of parameters of an inductor. For example, the inductance parameter may be an inductance value. As another example, in addition to the inductance value, the inductance parameter may further include at least one of a saturation current and a temperature-rise current of the inductor. Specifically, the inductance parameter to be used may be determined based on different load requirements. The following embodiments use an example of the inductance value, and are not intended to limit this embodiment of this application.

Figure 3:
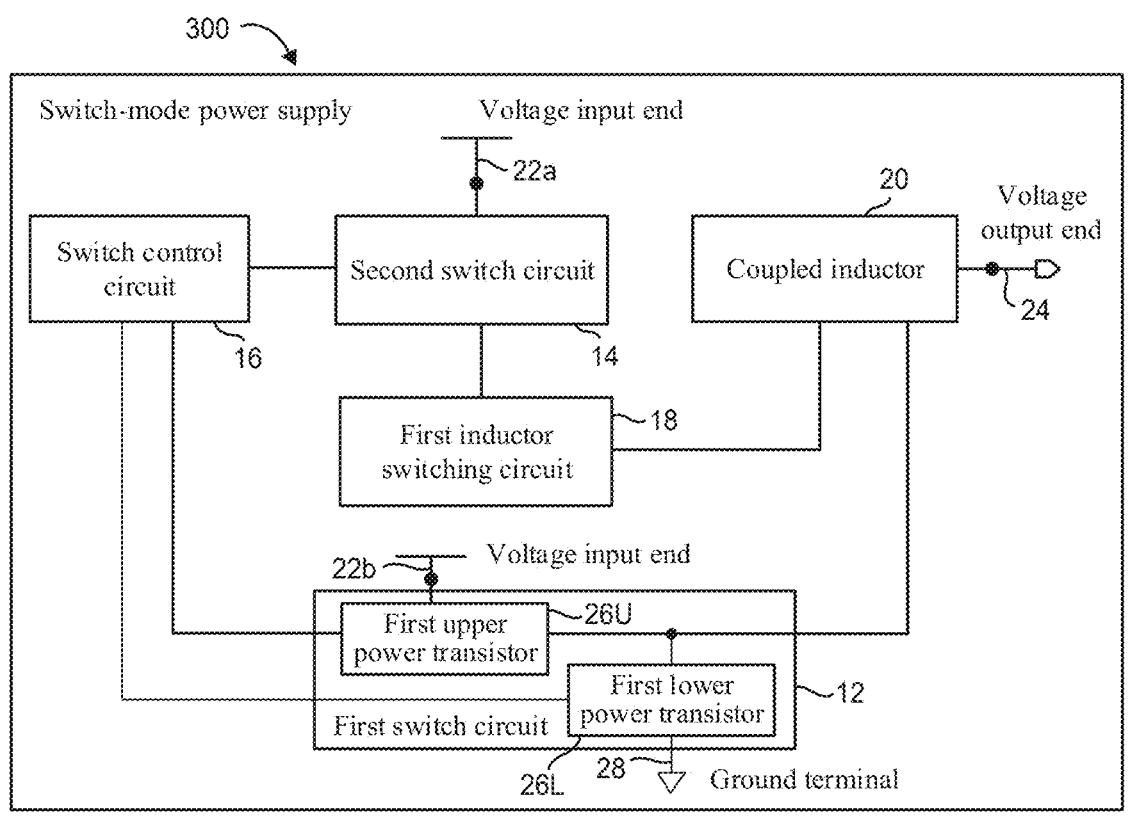
FIG. 3 is a schematic diagram of a structure of another switch-mode power supply according to an embodiment of this application.

In some embodiments of this application, as shown in FIG. 3, the first switch circuit 12 includes a first upper power transistor 26U and a first lower power transistor 26L. The first upper power transistor 26U is separately connected to the voltage input end 22b, the switch control circuit 16, and the coupled inductor 20. The first lower power transistor 26L is separately connected to the coupled inductor 20, the switch control circuit 16, and a ground terminal 28.

The first switch circuit 12 may thus include two power transistors 26. Each power transistor 26 may include a gate (G electrode), a source (S electrode), and a drain (D electrode). According to the different positions of the two power transistors in the switch circuit 12, the two power transistors 26 are respectively referred to as the first upper power transistor 26U and the first lower power transistor 26L. The first upper power transistor 26U is separately connected to the voltage input end 22b, the switch control circuit 16, and the coupled inductor 20. For example, a gate of the first upper power transistor 26U is connected to the switch control circuit 16, a drain of the first upper power transistor is connected to the coupled inductor 20, and a source of the first upper power transistor is connected to the voltage input end. The first lower power transistor 26L is separately connected to the coupled inductor 20, the switch control circuit 16, and the ground terminal 28. For example, a gate of the first lower power transistor 26L is connected to the switch control circuit 16, a source of the first lower power transistor is connected to the ground terminal 28, and a drain of the first lower power transistor is connected to the coupled inductor 20. The first current may be injected to the coupled inductor 20 by using the first upper power transistor 26U and the first lower power transistor 26L in the first switch circuit 12, so that the coupled inductor can store electric energy.

Figure 4:
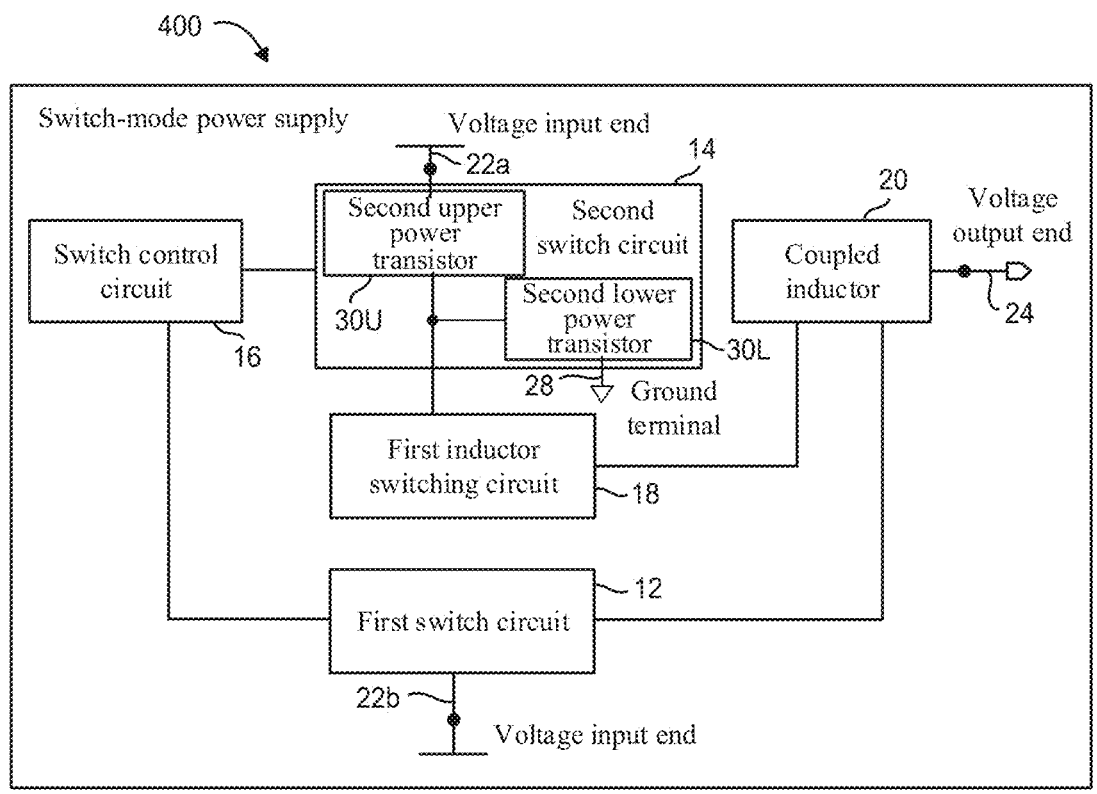
FIG. 4 is a schematic diagram of a structure of another switch-mode power supply according to an embodiment of this application.

In some embodiments of this application, as shown in FIG. 4, each second switch circuit 14 includes a second upper power transistor 30U and a second lower power transistor 30L. The second upper power transistor 30U is separately connected to the voltage input end 22a, the switch control circuit 16, and the coupled inductor 20. The second lower power transistor 30L is separately connected to the coupled inductor 20, the switch control circuit 16, and the ground terminal 28.

The second switch circuit 14 may thus include two power transistors 30U, 30L. Each power transistor 30 may include a gate, a source, and a drain. According to the different positions of the two power transistors 30 in the circuit 14, the two power transistors are respectively referred to as the second upper power transistor 30U and the second lower power transistor 30L. The second upper power transistor 30U is separately connected to the voltage input end 22a, the switch control circuit 16, and the coupled inductor 20. For example, a gate of the second upper power transistor 30U is connected to the switch control circuit 16, a drain of the second upper power transistor 30U is connected to the coupled inductor 20, and a source of the second upper power transistor 30U is connected to the voltage input end 22a. The second lower power transistor 30L is separately connected to the coupled inductor 20, the switch control circuit 16, and the ground terminal 28. For example, a gate of the second lower power transistor 30L is connected to the switch control circuit 16, a source of the second lower power transistor is connected to the ground terminal 28, and a drain of the second lower power transistor is connected to the coupled inductor 20. The second current may be injected to the coupled inductor 20 by using the second upper power transistor 30U and the second lower power transistor 30L in the second switch circuit 14, so that the coupled inductor can store the electric energy.

For example, the switch-mode power supply 400 may specifically include the BUCK circuit. The first upper power transistor 26U shown in FIG. 3 and the second upper power transistor 30U shown in FIG. 4 may specifically be the upper power transistors in the BUCK circuit. In the BUCK circuit, the coupled inductor 20 may be charged by using the upper power transistors26U, 30U. To be specific, a current may be injected to the coupled inductor 20 by using the first upper power transistor 26U and the second upper power transistor 30U, to implement a charging function of the coupled inductor. In the BUCK circuit, a current may be obtained from the coupled inductor 20 by using the lower power transistor 26L, 30L. To be specific, the current may be obtained from the coupled inductor 20 by using the first lower power transistor 26L and the second lower power transistor 30L, to implement a discharging function of the coupled inductor.

Figure 5:
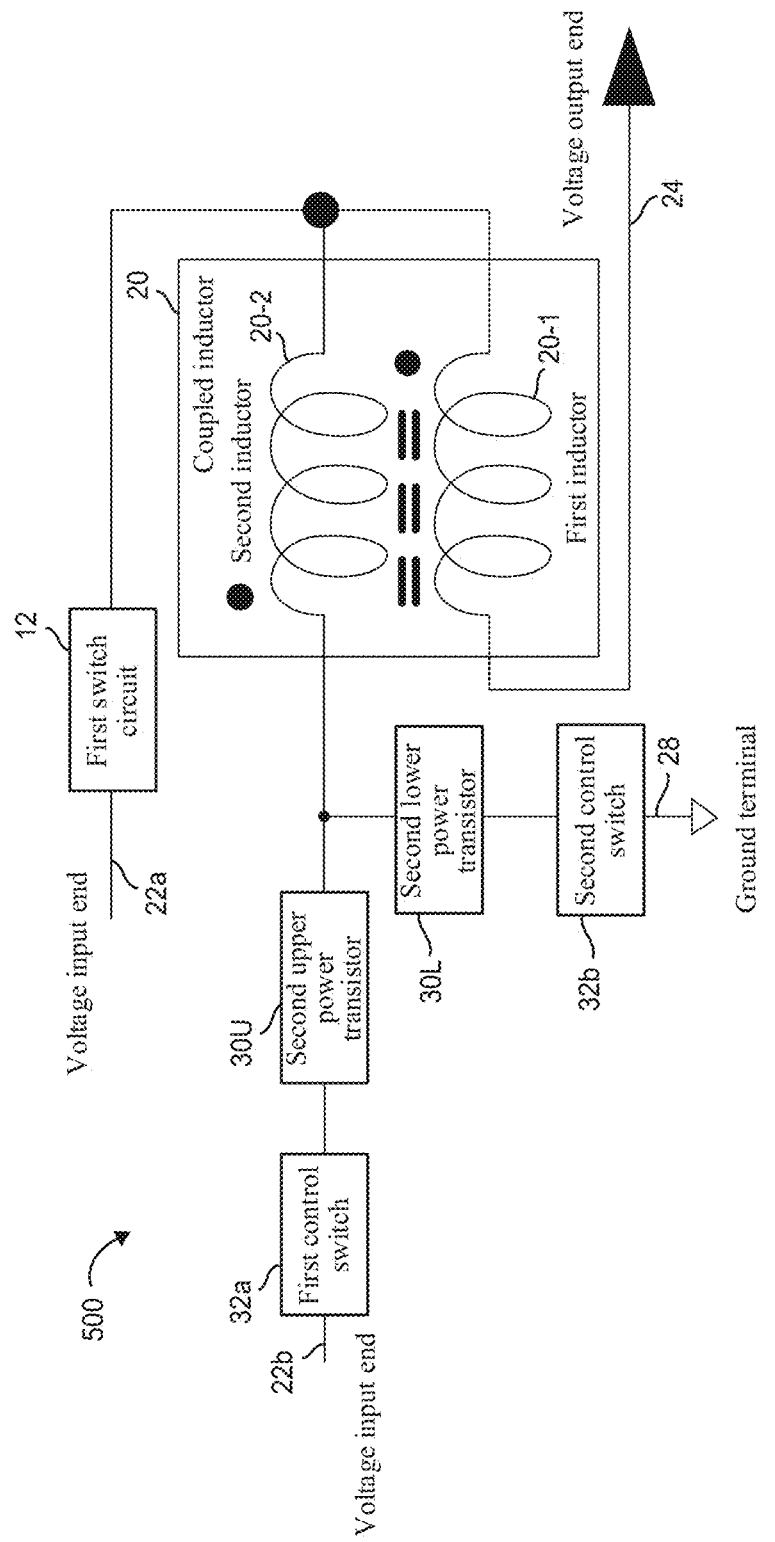
FIG. 5 is a schematic diagram of a structure of another switch-mode power supply according to an embodiment of this application.

In some embodiments of this application, as shown in FIG. 5, the first inductor switching circuit 18 includes at least one first control switch 32. One first control switch 32a in the at least one first control switch corresponds to one second switch circuit in the at least one second switch circuit, is connected between the voltage input end 22b and the second upper power transistor 30U of the one second switch circuit 14 in the at least one second switch circuit, and is configured to maintain, based on the first switching control signal, signal transmission between the second upper power transistor 30U and the coupled inductor 20, or disconnect the signal transmission between the second upper power transistor and the coupled inductor.

The first inductor switching circuit 18 may include the control switch 32, and may be turned off or on based on the different first switching control signals. When the first inductor switching circuit 18 is closed, signal transmission between each second switch circuit 14 and the coupled inductor 20 is maintained. When the first inductor switching circuit 18 is open, the signal transmission between each second switch circuit 14 and the coupled inductor 20 is disconnected. The one first control switch 32a in the at least one first control switch corresponds to the one second switch circuit 14 in the at least one second switch circuit. To be specific, each second switch circuit 14 may be connected to the one first control switch 32a, the first control switch may be connected between the voltage input end 22b and the second upper power transistor 30U of the one second switch circuit 14v in the at least one second switch circuit, and the first control switch 32a may be configured to maintain, based on the first switching control signal, signal transmission between the second upper power transistor 30U and the coupled inductor 20, or disconnect the signal transmission between the second upper power transistor and the coupled inductor. Therefore, selective signal transmission between the second upper power transistor 30U and the coupled inductor 20 may be implemented by using the first control switch 32a. Therefore, according to the different control manners of the first inductor switching circuit 18, the coupled inductor 20 may form different inductance parameters based on the different connected switch circuits 32, and the currents injected by the coupled inductor 20 to the voltage output end 24 are also different. Therefore, different inductance performance may be separately configured based on the different load requirements, to implement high conversion efficiency across a wide range of loads.

In some embodiments of this application, as shown in FIG. 5, the first inductor switching circuit 18 includes at least one second control switch 32b. One second control switch 32b in the at least one second control switch corresponds to one second switch circuit 14 in the at least one second switch circuit, is connected between the second lower power transistor 30L of the one second switch circuit in the at least one second switch circuit and the ground terminal 28, and is configured to maintain, based on the first switching control signal, signal transmission between the second lower power transistor and the coupled inductor 20, or disconnect the signal transmission between the second lower power transistor and the coupled inductor.

The first inductor switching circuit 18 may include the control switch 32b, and may be turned off or on based on the different first switching control signals. When the first inductor switching circuit 18 is closed, the signal transmission between each second switch circuit 14 and the coupled inductor 20 is maintained. When the first inductor switching circuit 18 is open, the signal transmission between each second switch circuit 14 and the coupled inductor 20 is disconnected. The one second control switch 32b in the at least one second control switch corresponds to the one second switch circuit 14 in the at least one second switch circuit. To be specific, each second switch circuit 14 may be connected to the one second control switch 32b, the second control switch may be connected between the second lower power transistor 30L of the one second switch circuit in the at least one second switch circuit and the ground terminal 28, and the second control switch may be configured to maintain, based on the first switching control signal, signal transmission between the second lower power transistor 30L and the coupled inductor 20, or disconnect the signal transmission between the second lower power transistor and the coupled inductor. Therefore, the signal transmission between the second lower power transistor 30L and the coupled inductor 20 may be implemented by using the second control switch 32b. Therefore, according to the different control manners of the first inductor switching circuit 18, the coupled inductor 20 may form the different inductance parameters based on the different connected switch circuits, and the currents injected by the coupled inductor to the voltage output end 24 are also different. Therefore, different inductance performance may be separately configured based on different load requirements, to implement the high conversion efficiency within the wide range of loads.

In some embodiments of this application, the coupled inductor 20 includes at least two inductors 20-1, 20-2 having a coupling relationship. Any two adjacent inductors 20 of the at least two inductors are connected in series. An input terminal of a first inductor 20-1 in the at least two inductors is connected between the first switch circuit 12 and the voltage output end 24. A second inductor 20-2 in the at least two inductors is connected between the first switch circuit 12 and the one second switch circuit 14 in the at least one second switch circuit, or connected between two second switch circuits in the at least one second switch circuit. FIG. 5 shows an embodiment in which the coupled inductor 20 includes the two inductors 20-1, 20-2. The coupled inductor 20 may include the first inductor 20-1 and the second inductor 20-2. The input terminal of the first inductor 20-1 and an input terminal of the second inductor 20-2 are dotted terminals, i.e., indicated by dots. The input terminal of the second inductor 20-2 is connected to the second switch circuit 14. The second switch circuit 14 may include the second upper power transistor 30U and the second lower power transistor 30L. An output terminal of the second inductor 20-2 is connected to the input terminal of the first inductor 20-1, to implement a serial connection between the first inductor 20-1 and the second inductor.

The coupled inductor 20 includes the at least two inductors 20-1, 20-2 having a coupling relationship. For example, the coupled inductor 20 may include the first inductor 20-1 and at least one second inductor 20-2. The any two adjacent inductors of the at least two inductors are connected in series. Serial connection means that an input terminal of one inductor is connected to an output terminal of another adjacent inductor. The input terminal of the first inductor 20-1 is connected between the first switch circuit 12 and the voltage output end 24. When there is only one second inductor 20-2 in the coupled inductors 20, the second inductor is connected between the first switch circuit 12 and the one second switch circuit 14 in the at least one second switch circuit. When there are two or more second inductors 20-2 in the coupled inductors 20, one second inductor 20-2A is connected between the first switch circuit 12 and the one second switch circuit 14 in the at least one second switch circuit, and other second inductor(s) 20-2B are connected between the two second switch circuits 14-1, 14-2 in the at least one second switch circuit. The following uses an example in which the coupled inductor 20 includes the first inductor 20-1 and the second inductor 20-2. The input terminal of the first inductor 20-1 and the input terminal of the second inductor 20-2 are the dotted terminals. The input terminal of the second inductor 20-2 is separately connected to the first switch circuit 12 and the second upper power transistor 30U. In this embodiment of this application, high conversion efficiency of the switch-mode power supply 500 over a wide range of loads may be implemented by using a plurality of serially-connected inductors. In this embodiment of this application, the at least two inductors 20-1, 20-2 having a coupling relationship may be used to implement high conversion efficiency of the switch-mode power supply over the wide range of loads, and occupied board space of the at least two inductors having a coupling relationship is much less than that of two or more inductors (parallelly-connected multiphase), so that the at least two inductors having a coupling relationship may be applied to various types of switch-mode power supply topologies, to implement a miniaturized design of the switch-mode power supply.

For example, the second switch circuit 14 includes the two power transistors 30: the second upper power transistor 30U and the second lower power transistor 30L. As shown in the FIG. 6 schematic circuit diagram, the first inductor switching circuit 18 also includes two power transistors: an upper power transistor S1 and a lower power transistor S2. The upper power transistor S1 is disposed between the second upper power transistor 30U and the voltage input end 22a, and the lower power transistor S2 is disposed between the second lower power transistor 30L and the ground terminal 28 (ground terminal for short). In addition, only the coupled inductor 20, the first switch circuit 12, the second upper power transistor 30U and the second lower power transistor 30L in the second switch circuit 14, and the first control switch 32a and the second control switch 32b in the first inductor switching circuit 18 in the switch-mode power supply 500 shown are used in FIG. 5, and the switch control circuit 16 in the switch-mode power supply is not needed and/or used. In addition, the upper power transistor S1 and the lower power transistor S2 may be coupled to the second upper power transistor 30U and the second lower power transistor 30L to form an independent switch circuit. In this embodiment of this application, the first current generated at the voltage input end 22a may enter the first inductor 20-1 through the first switch circuit 12, and then the first current may reach the voltage output end 24. A second current generated at the voltage input end 22b may also enter the second inductor 20-2 through the first control switch 32a and the second upper power transistor 30U, and then the second current may reach the voltage output end 24. In addition, the second current generated at the voltage input end 22b may be disconnected by the first control switch 32a. In this case, the second current cannot enter the second inductor 20-2, and no current passes through the second inductor. In this embodiment of this application, the first inductor switching circuit 18 may enable, through the first control switch 32a and the second control switch 32b, a function of controlling signal transmission between the second upper power transistor 30U and the second inductor 20-2. For example, the switch-mode power supply 500 may specifically be the BUCK circuit. The BUCK circuit may inject the current in the coupled inductor 20 by using the first upper power transistor 30U and the second upper power transistor 30L, to implement the charging function of the coupled inductor. In the BUCK circuit, the current may be obtained from the coupled inductor 20 by using the first lower power transistor 26L and the second lower power transistor 30L. To be specific, the current may be obtained from the coupled inductor 20 by using the first lower power transistor 26L and the second lower power transistor 30L, to implement the discharging function of the coupled inductor.

Figure 6:
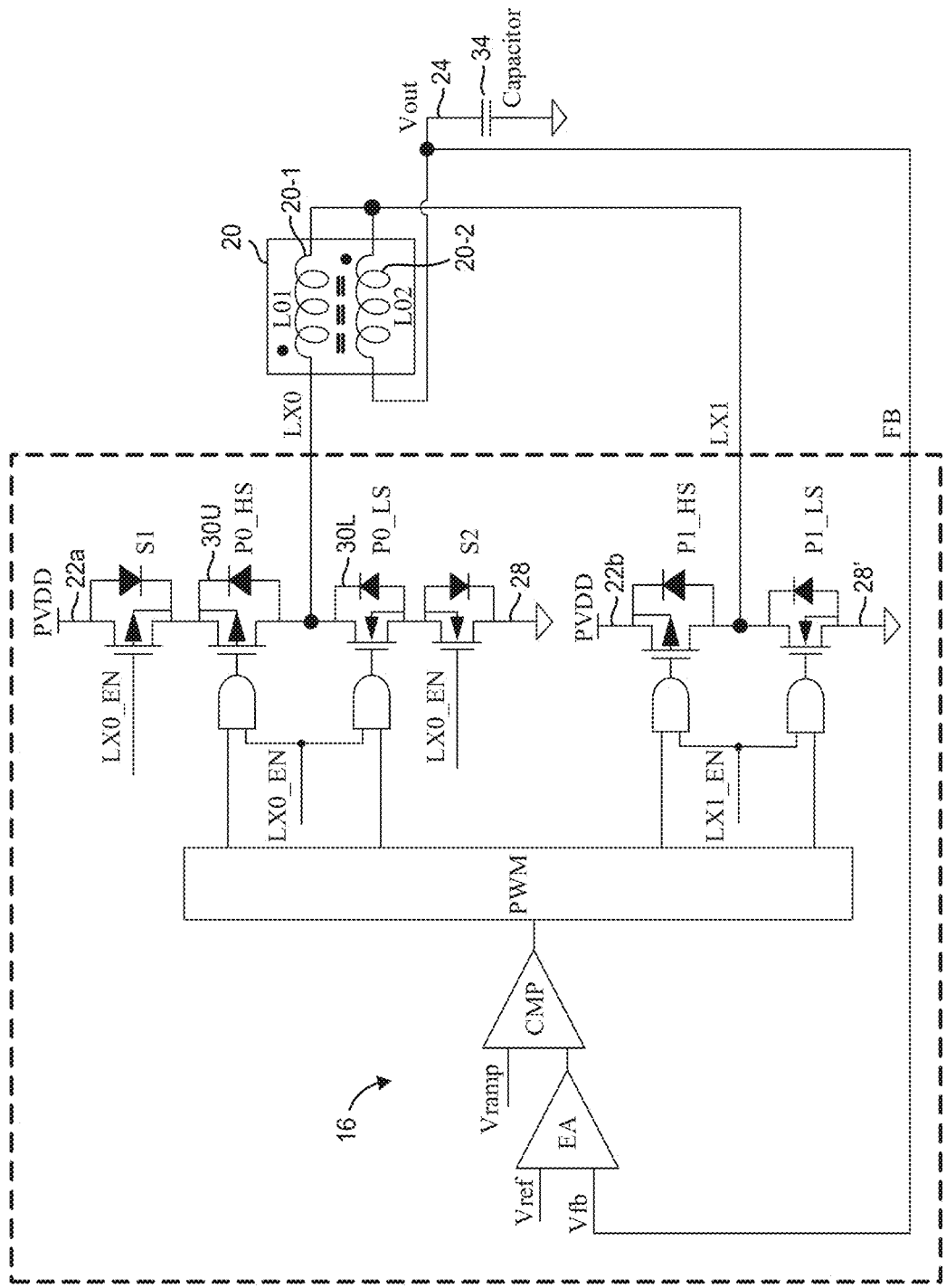
FIG. 6 is a schematic diagram of a structure of a BUCK circuit according to an embodiment of this application.

FIG. 6 uses a structure of the switch-mode power supply applied to the BUCK circuit according to an embodiment of this application. The following describes a connection relationship between the coupled inductor 20 and other components in the BUCK circuit. The BUCK circuit may include the switch control circuit 16, the first switch circuit 12, the second switch circuit 14, the first inductor switching circuit 18, the coupled inductor 20, and a capacitor 34. The PVDD indicates the direct current power supply 22, Vout indicates the voltage output end 24, LX0_EN indicates a switching control signal of an LX0 branch, and LX1_EN indicates a switching control signal of an LX1 branch.

The switch control circuit 16 may include the EA, the CMP, and the PWM. Inputs to the EA are the Vref and the Vfb. A feedback (FB) circuit is formed from Vout to Vfb. An input terminal of the CMP is Vramp. The PWM is connected to an upper power transistor P0_HS, a lower power transistor P0_LS, an upper power transistor P1_HS, and a lower power transistor P1_LS. A control signal of the upper power transistor P0_HS and the lower power transistor P0_LS is LX0_EN, and a control signal of the upper power transistor P1_HS and the lower power transistor P1_LS is LX1_EN. The first switch circuit includes the upper power transistor (may also be referred to as an upper power transistor connected to a power source) P1_HS and the lower power transistor (may also be referred to as a lower power transistor connected to ground) P1_LS. The second switch circuit includes the upper power transistor P0_HS and the lower power transistor P0_LS. The coupled inductor 20 includes an inductor L01 and an inductor L02. The first inductor switching circuit 18 includes the upper power transistor S1 and the lower power transistor S2. The LX0 branch is connected to the voltage input end 22a, the direct current power supply provides the input voltage to the voltage input end, and the LX1 branch is connected to another voltage input end 22b. The inductor L01 and the inductor L02 are connected in series, an input terminal of the inductor L01 is connected to the LX0 branch, and an input terminal of the inductor L02 is connected to the LX1 branch. An output terminal of the inductor L02 is connected to the voltage output end Vout 24.

The upper power transistor P0_HS and the upper power transistor P1_HS are connected to the direct current power supply PVDD. The inductor L01 and the inductor L02 are connected in series. The P0_HS is connected to the upper power transistor S1, the lower power transistor P0_LS is connected to the lower power transistor S2, and the lower power transistor P1_LS is connected to the ground terminal 28. When the upper power transistor S1 conducts, the inductor L01 and the inductor L02 are connected in series between the voltage input end 22 and the voltage output end 24. When the upper power transistor S1 blocks the upper power transistor P0_HS, only the inductor L02 is connected between the voltage input end 22 and the voltage output end 24. Therefore, signal transmission of the inductor L01 and the inductor L02 that are connected in series in the coupled inductor 20, or signal transmission of the inductor L02 in the coupled inductor may be implemented by enabling a switching control function of a first inductor control circuit 18.

For example, in this embodiment of this application, a plurality of inductors 20-1, 20-2 in the coupled inductor 20 may be connected in series. It is assumed that two-phase inductors in the coupled inductor are respectively L01 and L02, and a coupling coefficient is −k. When the LX0 branch is floating, an equivalent inductance value of a path from the LX1 branch to Vout is L02, and an equivalent inductance value of a path from the LX0 branch to Vout is L01+Z02+2k*√$\overline{L01*L02}$, to implement an effect of a large inductor (that is, the inductor L01 and the inductor L02 are connected in series) when LX0 conducts, and effect of a small inductor (only the inductor L02) when LX1 conducts and LX0 is cut off.

For example, as shown in FIG. 6, the first inductor switching circuit 18 includes the upper power transistor S1 and the lower power transistor S2. When LX1 normally works, based on a voltage output relationship of a transformer, a voltage drop of each of the two internal inductors 20-1, 20-2 is closely related to the coupling coefficient when a magnetic core is coupled. Therefore, an induced voltage may be generated in LX0. As a result, an actual voltage range of a pin of LX1 is greater than that of LX0. If P0_HS is directly connected to P0_LS, when a voltage range of LX0 is beyond 0-Vin, backfeed may occur because of a body diode. To prevent coupling from affecting a working parameter of LX1, a pair of power transistors S1, S2 is added to implement complete cutoff. For example, when the upper power transistor S1 and the lower power transistor S2 are added, LX0 may be disconnected from the voltage input end by using S1 and P0_HS, LX0 may be disconnected from the ground terminal (GND) by using S2 and P0_LS. LX0 needs to be floating, to be specific, the LX0 branch needs to be cut off. Therefore, the LX0 branch may be cut off when the branch is enabled to work, and may conduct when the branch is disabled to work. The BUCK circuit shown in FIG. 6 is used as an example. The first inductor switching circuit 18 is added to the LX0 branch, where the first inductor switching circuit includes the upper power transistor S1 and the lower power transistor S2, to disconnect a switch. Other implementations are possible: for example, an implementation in which the first inductor switching circuit 18 includes the upper power transistor S1 and the lower power transistor S2 may also be applicable to other power conversion topologies, such as the BOOST circuit and the BUCK-BOOST circuit. For details, refer to examples in the following embodiments.

Figure 7:
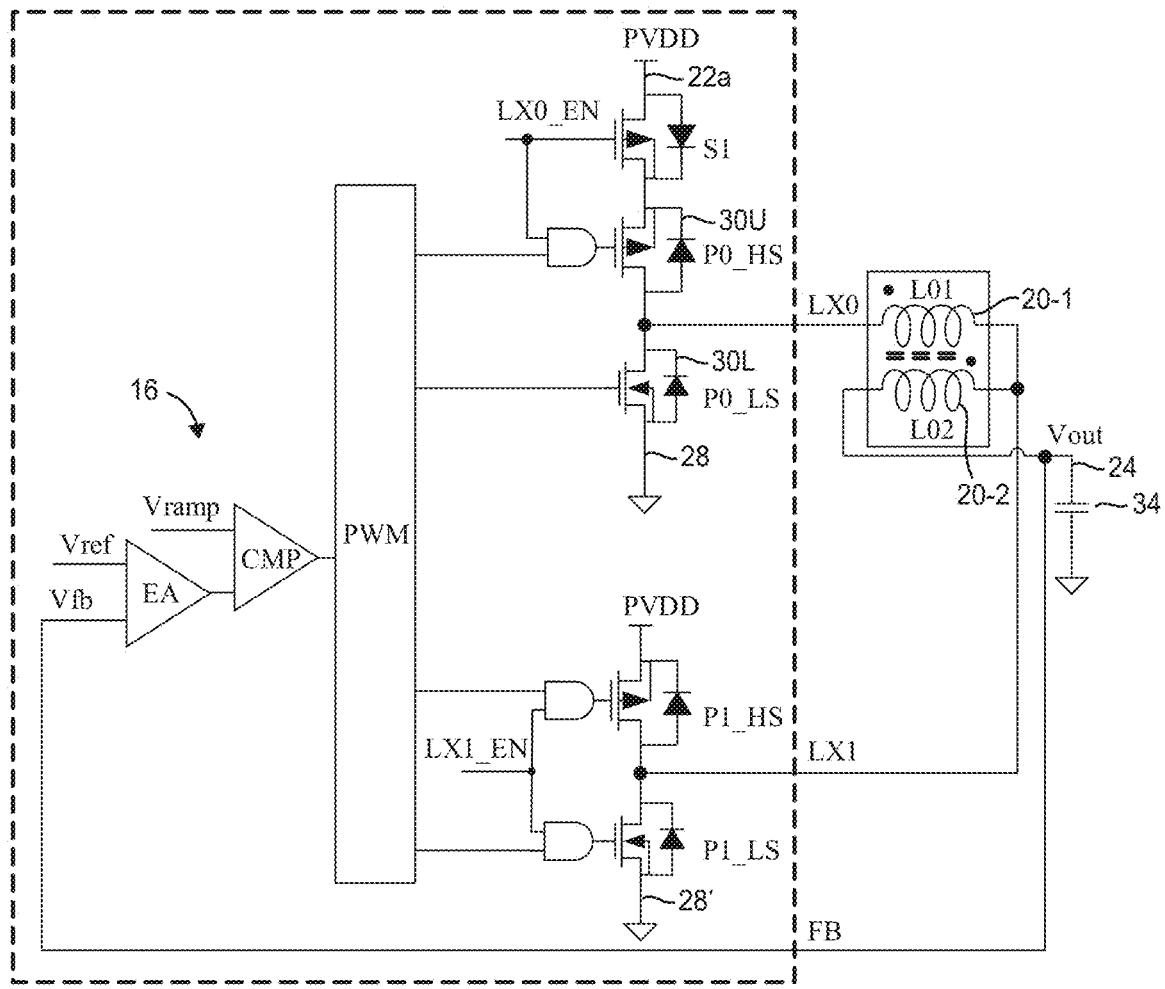
FIG. 7 is a schematic diagram of a structure of another BUCK circuit according to an embodiment of this application.

A difference between the switch-mode power supply shown in FIG. 7 and that shown in FIG. 6 lies in that the first inductor switching circuit 18 in FIG. 7 includes the upper power transistor S1, while the first inductor switching circuit in FIG. 6 includes the upper power transistor S1 and the lower power transistor S2. In FIG. 7, the lower power transistor S2 does not need to be connected, and only the upper power transistor S1 is reserved. To be specific, drive of the lower power transistor of the BUCK circuit remains unchanged, drive of the upper power transistor of the BUCK circuit is implemented by adding the power transistor S1 to form a pair of power transistors. To be specific, the two power transistors are connected in series, and directions of the two body diodes (a PN junction between substrate B and drain D in one transistor—see FIG. 7) are kept opposite, so that P0_LS remains as a soft switch. The soft switch refers to a zero-current switch, and only one upper power transistor S1 is used as a switch, to prevent charging and discharging losses of a parasitic capacitor of the lower power transistor.

It can be seen from FIG. 7 that, the LX1 branch includes the inductor L02 (that is, the small inductor) that is used to convert a voltage under heavy load conditions, and the LX0 branch includes the inductor L01 and the inductor L02 (that is, the large inductor formed by L01 and L02) that is used to convert a voltage under light load conditions. The LX1 branch and the LX0 branch may be flexibly switched by using LX0_EN and LX1_EN. When the LX0 branch works, a coupling voltage range of the pin of LX1 is between 0 and PVDD. Therefore, no special processing is required. When the LX1 branch works, the working voltage range of the pin of LX1 is between 0 and PVDD, and a coupling voltage range of a pin of LX0 is $$\left(-k*\sqrt{\frac{L01}{L02}}*VOUT\right) \sim \left(k*\sqrt{\frac{L01}{L02}}*(PVDD-VOUT)+PVDD\right).$$

The coupling voltage range of LX0 is greater than that of LX1. To prevent an extra power loss caused by a positive coupling voltage and a negative coupling voltage of LX0, a current loop of LX0 may be disconnected by reversely connecting twopower transistors in series. Therefore, the upper power transistor S1 is used in the LX0 branch to disconnect the switch.

In this embodiment of this application, because the LX0 branch is mainly applied to a light load scenario, an area of a power transistor in a chip is small. Finally, when the two inductors 20-1, 20-2 in the switch-mode power supply are connected in series, the high conversion efficiency within the wide range of loads may be implemented by using power transistors with small area, to achieve high conversion efficiency that can be implemented by two-phase and double inductors. Because S1 and S2 integrated into the chip have a small area, both an area of a board-level component and an area of the chip are minimized.

Specifically, there are two working modes of the LX0 branch and the LX1 branch:

Working mode 1: When the LX0 branch works, the two power transistors (that is, P1_HS and P1_LS) of the LX1 branch are cut off and do not work. In this case, the upper power transistor S1 remains in a conducted state, and the P1_HS and P1_LS are in an off state. P0_HS and P0_LS are controlled by the PWM. The inductor L01 and the inductor L02 are connected in series. The inductor L02 is connected to the voltage output end. When the coupling voltage range of the pin of the LX1 branch is less than the voltage range of LX0, the LX0 branch may properly work.

Figure 8A:
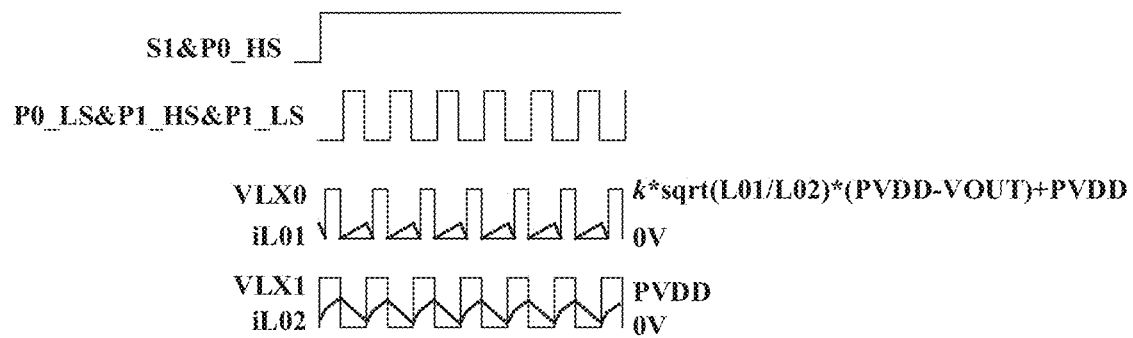
FIG. 8a is a schematic diagram of a change in a current and a voltage of a power transistor in a BUCK circuit in a working mode according to an embodiment of this application.

Working mode 2: When the LX1 branch works, the working voltage range of the LX1 branch is between 0 and PVDD, and the upper power transistor S1 of the LX0 branch remains in the off state, to block a forward voltage higher than the PVDD. In this case, the P0_LS may be controlled in following two manners:

Control manner 1: P0_LS and P1_LS use a common drive signal. Because P0_LS and P1_LS are respectively a PMOS transistor and an NMOS transistor, drive signals of P0_LS and P1_LS are the same. A time sequence diagram in FIG. 8a shows an example time sequence of S1 and P0_HS, a time sequence of P0_LS, P1_HS, and P1_LS, a current of L01 (that is, iL01), a voltage of the LX0 branch (that is, VLX0), a current of L02 (that is, iL02), a voltage of the LX1 branch (that is, VLX1). Dotted lines indicate currents flowing through L01 and L02. When P0_LS and P1_LS conduct, to cancel a voltage generated by coupling effect of L02, the current of L01 is linearly increased, and the inductor L01 stores energy. When P1_HS conducts, the current of L01 is linearly decreased due to the voltage generated by the coupling effect of L02. In this case, a freewheeling current of the inductor L01 supplies energy to a load until the current is decreased to 0, and then the diode S1 is reversely blocked. It can be learned from FIG. 8b that a current slope of the L02 is increased in this process.

A maximum value of VLX0 is $$k * \sqrt{\frac{L01}{L02}} * (PVDD - VOUT) + PVDD,$$

$$\sqrt{\frac{L01}{L02}} * (PVDD - VOUT) + PVDD \text{ and}$$

$$sqrt\left(\frac{L01}{L02}\right) * (PVDD - VOUT) + PVDD$$

shown in FIG. 8a have a same meaning.

Figure 8B:
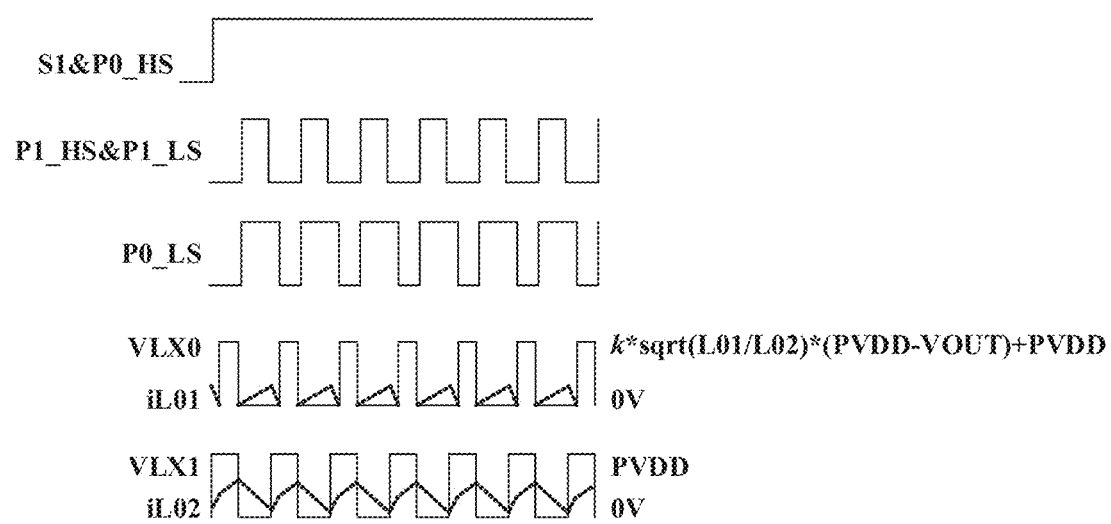
FIG. 8b is a schematic diagram of a change in a current and a voltage of a power transistor in a BUCK circuit in another working mode according to an embodiment of this application.

Control manner 2: As shown in FIG. 8b, P0_LS and P1_LS are conducted at the same time, and P0_LS is cut off before a current of LX0 is decreased to 0, to reduce a voltage drop loss of the diode. Other processes are similar to the process in the control manner 1. If the current of LX0 is not decreased to 0, P0_LS is normally conducted.

Figure 9:
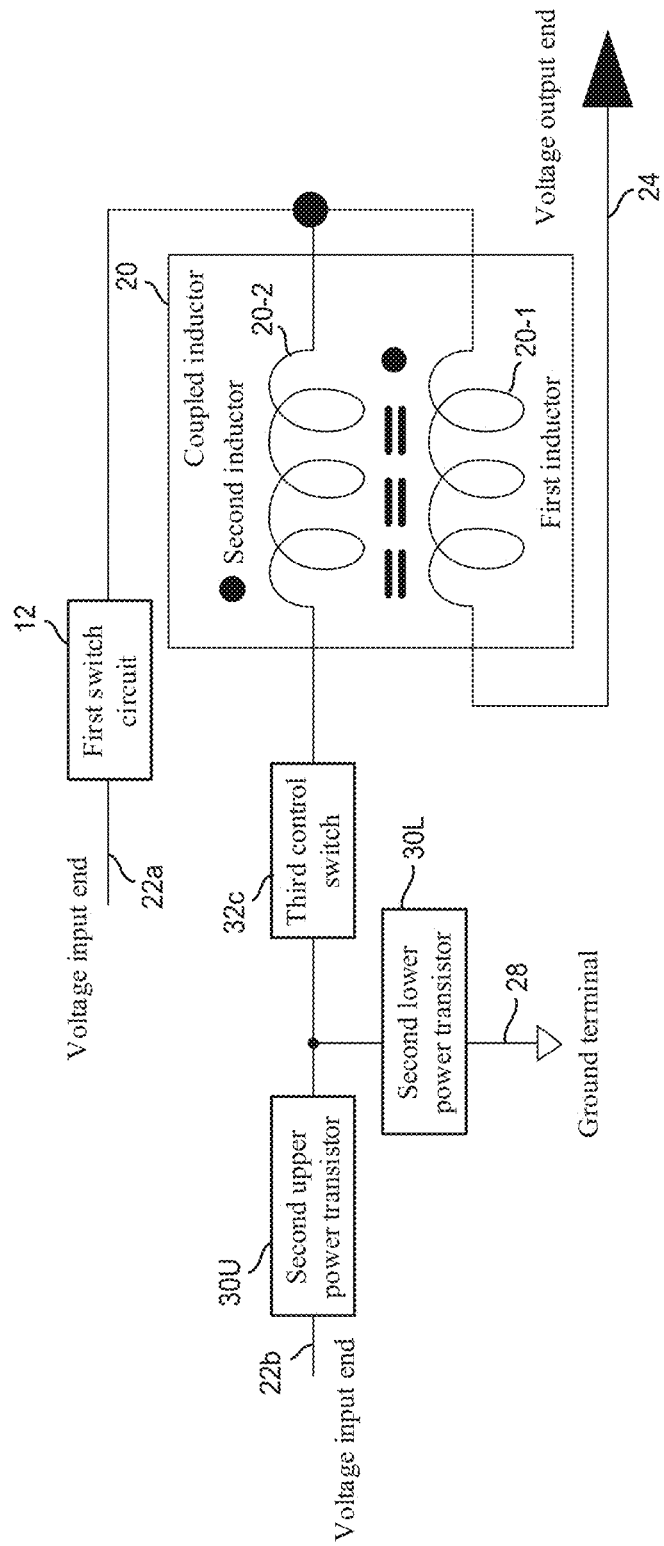
FIG. 9 is a schematic diagram of a structure of another switch-mode power supply according to an embodiment of this application.

In some embodiments of this application, as shown in FIG. 9, the first inductor switching circuit 18 includes at least one third control switch 32c. One third control switch 32c in the at least one third control switch corresponds to the one second switch circuit 14 in the at least one second switch circuit, is connected between the one second switch circuit in the at least one second switch circuit and the coupled inductor 20, and is configured to maintain, based on the first switching control signal, signal transmission between the second lower power transistor 30L and the coupled inductor, or disconnect the signal transmission between the second lower power transistor and the coupled inductor.

The first inductor switching circuit 18 may include the at least one third control switch 32c, and may be turned off or on based on the different first switching control signals. When the first inductor switching circuit 18 is closed, the signal transmission between each second switch circuit 14 and the coupled inductor 20 is maintained. When the first inductor switching circuit 18 is open, signal transmission between each second switch circuit 14 and the coupled inductor 20 is disconnected. The one third control switch 32c in the at least one third control switch corresponds to the one second switch circuit 14 in the at least one second switch circuit. To be specific, each second switch circuit 14 may be connected to the one third control switch 32c, the third control switch may be connected between the second upper power transistor 30U of the one second switch circuit in the at least one second switch circuit and the coupled inductor 20, and the third control switch may be configured to maintain, based on the first switching control signal, signal transmission between the second upper power transistor and the coupled inductor, or disconnect the signal transmission between the second upper power transistor and the coupled inductor. Therefore, the signal transmission between the second upper power transistor 30U and the coupled inductor 20 may be implemented by using the third control switch 32c. Therefore, according to the different control manners of the first inductor switching circuit 18, the coupled inductor 20 may form the different inductance parameters based on the different connected switch circuits, and the currents injected by the coupled inductor to the voltage output end 24 are also different. Therefore, different inductance performance may be separately configured based on the different load requirements, to implement the high conversion efficiency within the wide range of loads.

In some embodiments of this application, the coupled inductor 20 includes the at least two inductors 20-1, 20-2 having a coupling relationship. The any two adjacent inductors of the at least two inductors are connected in series. The input terminal of the first inductor 20-1 in the at least two inductors is connected between the first switch circuit 12 and the voltage output end 24. The second inductor 20-2 in the at least two inductors is connected between the first switch circuit 12 and one third control switch 32c in an at least one third switch circuit, or connected between two third switch circuits in the at least one third switch circuit. FIG. 9 uses an example in which the coupled inductor 20 includes the first inductor 20-1 and the second inductor 20-2. The input terminal of the first inductor 20-1 and the input terminal of the second inductor 20-2 are the dotted terminals. The input terminal of the second inductor 20-2 is connected to the third control switch 32c, and the third control switch is connected to the second switch circuit 14. The second switch circuit 14 may include the second upper power transistor 30U and the second lower power transistor 30L. The output terminal of the second inductor 20-2 is connected to the input terminal of the first inductor 20-1, to implement a serial connection between the first inductor and the second inductor.

The coupled inductor 20 includes the at least two inductors 20-1, 20-2 having a coupling relationship. For example, the coupled inductor 20 may include the first inductor 20-1 and the at least one second inductor 20-2. The any two adjacent inductors of the at least two inductors are connected in series. Serial connection means that the input terminal of the one inductor 20-1 is connected to the output terminal of the another adjacent inductor 20-2. The input terminal of the first inductor 20-1 is connected between the first switch circuit 12 and the voltage output end 24. When there is only one second inductor 20-2 in the coupled inductors 20, the second inductor is connected between the first switch circuit 12 and the one second switch circuit 14 in the at least one second switch circuit. When there are two or more second inductors 20-2a, 20-2b, etc. in the coupled inductors, one second inductor 20-2a is connected between the first switch circuit 12 and the one third switch circuit in the at least one third switch circuit, i.e, a third control switch 32c, and other second inductors 20-2*b*, 20-2*c*, etc. are connected between two third switch circuits in the at least one third switch circuit. The following uses an example in which the coupled inductor 20 includes the first inductor 20-1 and the second inductor 20-2. The dotted terminals of the first inductor 20-1 and the second inductor 20-2 are respectively connected to the first switch circuit 12 and the third control switch 32*c*.

In this embodiment of this application, high conversion efficiency of the switch-mode power supply over a wide range of loads may be implemented by using the plurality of serially-connected inductors 20-1, 20-2, etc. In this embodiment of this application, the at least two inductors 20-1, 20-2 having a coupling relationship may be used to implement high conversion efficiency of the switch-mode power supply across a wide range of loads, and the occupied board space of the at least two inductors having a coupling relationship is much less than that of two or more inductors (parallelly-connected multiphase), so that the at least two inductors having a coupling relationship may be applied to the various types of switch-mode power supply topologies, to implement the miniaturization design of the switch-mode power supply.

Figure 10:
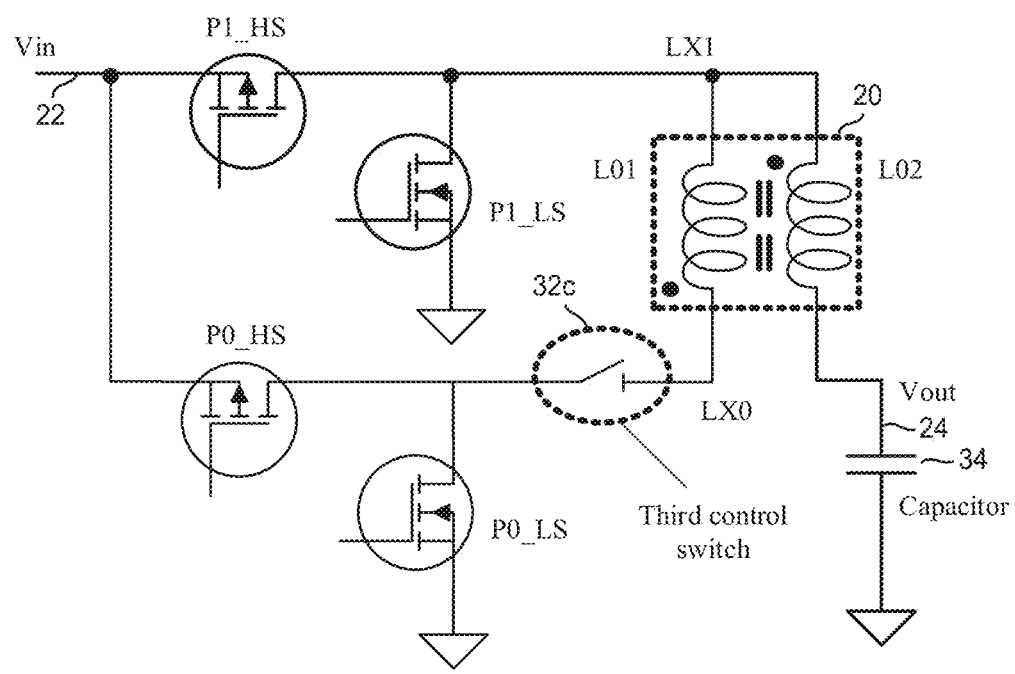
FIG. 10 is a schematic diagram of a structure of another BUCK circuit according to an embodiment of this application.

For example, refer to FIG. 10. The BUCK circuit may include the first switch circuit 12, the second switch circuit 14, the first inductor switching circuit 18, the coupled inductor 20, and the capacitor 34. Vin indicates the voltage input end 22, Vout indicates the voltage output end 24, LX0_EN indicates a switching control signal of the LX0 branch, and LX1_EN indicates a switching control signal of the LX1 branch.

The first switch circuit 12 includes the upper power transistor (may also be referred to as an upper power transistor) P1_HS and the lower power transistor (may also be referred to as a lower power transistor) P1_LS. The second switch circuit 14 includes the upper power transistor P0_HS and the lower power transistor P0_LS. The first inductor switching circuit 18 is specifically the third control switch 32*c*. The third control switch 32*c* is connected to the upper power transistor P0_HS and the coupled inductor 20. The coupled inductor 20 includes the inductor L01 and the inductor L02.

A terminal of the LX0 branch is configured to connect the voltage input end 22, the direct current power supply (PVDD) provides the input voltage to the voltage input end, and a terminal of the LX1 branch is connected to the voltage input end. When the third control switch 32*c* is turned on, the inductor L01 and the inductor L02 are connected in series, the input terminal of the inductor L01 is connected to LX0, the input terminal of the inductor L02 is connected to LX1. The input terminal of the inductor L01 and the input terminal of the inductor L02 are the dotted terminals. An output terminal of the inductor L01 is connected to the input terminal of the inductor L02. The output terminal of the inductor L02 is connected to Vout 24. Both the inductor L01 and the inductor L02 in the coupled inductor 20 receive a current from the voltage input end 22, and output the current to the voltage output end 24 When the third control switch 32*c* is turned off, only the inductor L02 in the coupled inductor 20 receives the current from the voltage input end, and outputs the current to the voltage output end 24.

In this embodiment of this application, the first inductor switching circuit 18 includes the third control switch 32*c*. The third control switch 32*c* is disposed between the inductor L01 and the voltage input end 22. When the third control switch 32*c* is turned off, the inductor L01 is disconnected from the voltage input end 22. When the third control switch 32*c* is turned on, the inductor L01 is connected to the voltage input end 22. Other implementations in this embodiment of this application are possible; for example, the first inductor switching circuit 18 may be connected and disconnected by using a switch, and a conduction control function may be further implemented by using another electronic component. For example, the conduction control function of the first inductor switching circuit 18 may be further implemented by using a power transistor. For details, refer to the description in the foregoing embodiment.

Figure 11:
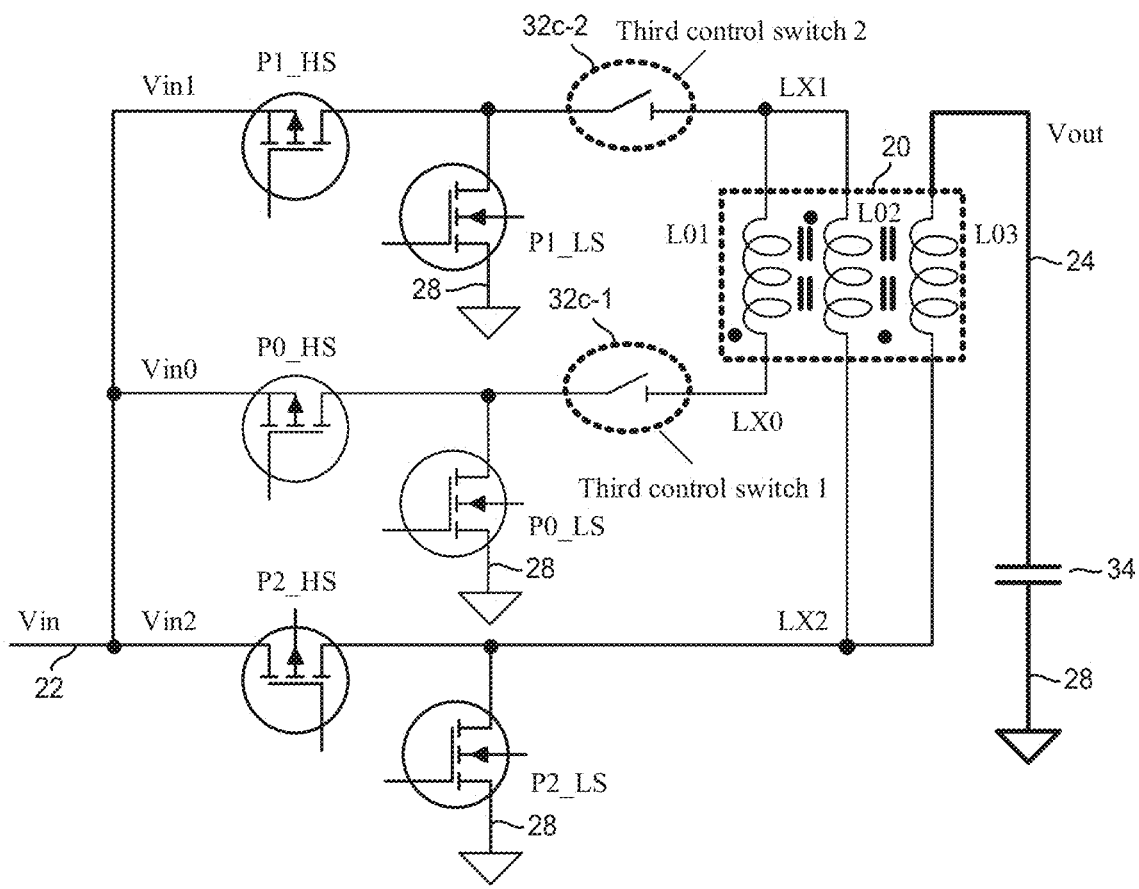
FIG. 11 is a schematic diagram of a structure of another BUCK circuit according to an embodiment of this application.

Refer to FIG. 11. The BUCK circuit may include the first switch circuit 12, the two second switch circuits 14, the first inductor switching circuit 18, the coupled inductor 20, and the capacitor 34. Vin indicates the voltage input end 22, Vout indicates the voltage output end 24, LX0_EN indicates the switching control signal of the LX0 branch, and LX1_EN indicates the switching control signal of the LX1 branch.

The first switch circuit 12 includes an upper power transistor P2_HS and a lower power transistor P2_LS. The two second switch circuits 14 include the upper power transistor P0_HS, the lower power transistor P0_LS, the upper power transistor P1_HS, and the lower power transistor P1_LS. The coupled inductor 20 includes the inductor L01, the inductor L02, and an inductor L03. The first inductor switching circuit 18 specifically includes a third control switch 1 32*c*-1 and a third control switch 2 32-*c*2. The third control switch 1 32*c*-1 is separately connected to the upper power transistor P0_HS and the coupled inductor. The third control switch 2 32*c*-2 is separately connected to the upper power transistor P1_HS and the coupled inductor 20.

The terminal of the LX0 branch is configured to connect the voltage input end 22, the direct current power supply (PVDD) provides the input voltage to the voltage input end, and a terminal of the LX2 branch is connected to the voltage input end. When the third control switch 1 32*c*-1 and the third control switch 2 32*c*-2 are turned on, the inductor L01, the inductor L02, and the inductor L03 are connected in series. The inductor L01, the inductor L02, and the inductor L03 in the coupled inductor 20 all receive the current from the voltage input end 22, and output the current to the voltage output end 24. When the third control switch 1 32*c*-1 is turned off and the third control switch 2 32*c*-2 is turned on, the inductor L02 and the inductor L03 are connected in series. The inductor L02 and the inductor L03 in the coupled inductor 20 receive current from the voltage input end 22, and output the current to the voltage output end 24. When the third control switch 1 32*c*-1 and the third control switch 2 32*c*-2 are turned off, the inductor L03 is connected to the voltage output end and P2_HS. Only L03 in the coupled inductor 20 receives current from the voltage input end 22, and outputs the current to the voltage output end 24. The input terminal of the inductor L01 is connected to LX0, the input terminal of the inductor L02 is connected to LX1, and an input terminal of the inductor L03 is connected to LX2. An output terminal of the inductor L03 is connected to the voltage output end Vout.

A difference between FIG. 11 and FIG. 10 lies in that there are the two second switch circuits 14 in FIG. 11, and the coupled inductor in FIG. 11 includes three inductors. To be specific, a series circuit formed by three coupled inductors may be used in the switch-mode power supply shown in FIG. 11. Vin2 provides a heavy-load channel, and equivalent inductance is smallest. Vin1 and Vin0 respectively provide a medium-load channel and a light-load channel, and the equivalent inductance is increased in sequence. Due to impact of a coupling voltage, the third control switches 32*c*-1, 32*c*-2 are respectively added to Vin1 and Vin0 as shown by dotted boxes in FIG. 11. It should be noted that the third control switches 32c-1, 32c-2 in FIG. 11 is merely an example. For a specific implementation, refer to the description of the inductor switching circuit in the foregoing embodiment. In the branch including the third control switch 32c-1, 32c-2, when the branch works, the third control switch is turned off; when the branch does not work, the third control switch is turned on, so that a portion of the coupled inductor is floating. By analogy, the BUCK circuit may also use four or five coupled inductors to optimize a corresponding power level and a design of the inductor, to optimize efficiency across a wide range of loads and loading capability of the inductor.

In this embodiment of this application, the coupled inductor 20 may be used to increase efficiency under full load conditions by changing a connection relationship and improving a circuit structure. To be specific, in this embodiment of this application, high conversion efficiency under full load conditions that may be implemented by using two or more inductors (parallelly-connected multiphase), may be implemented through occupied board space of a single dual-phase coupled inductor, and may be extended and applied to the various types of switch-mode power supply topologies.

Figure 12:
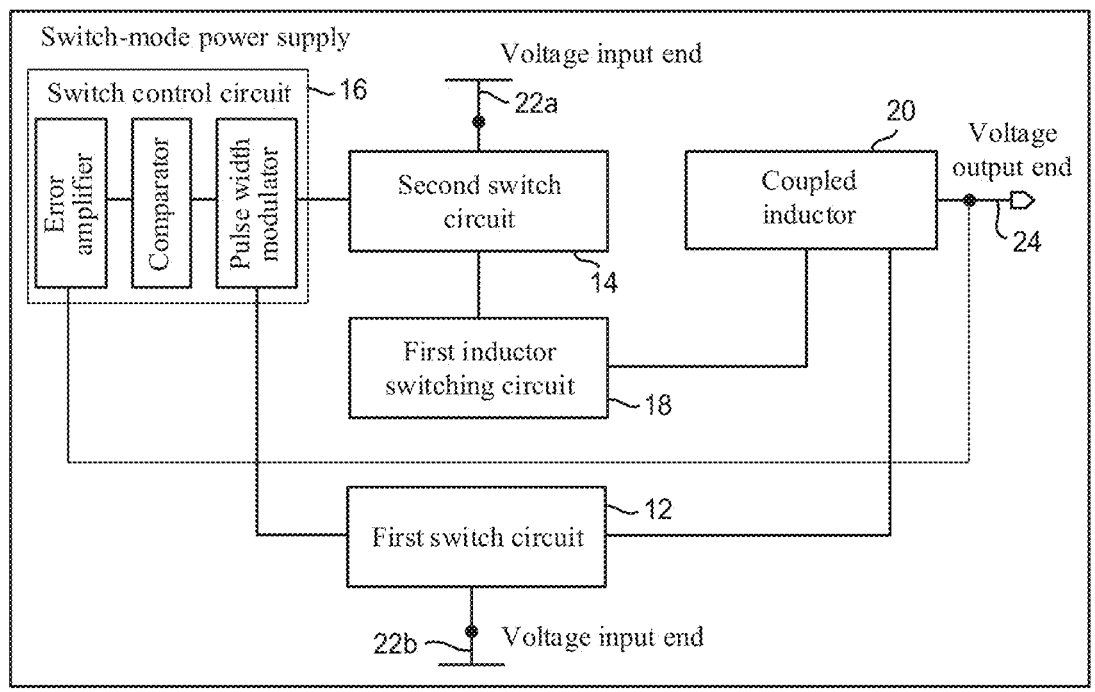
FIG. 12 is a schematic diagram of a structure of another switch-mode power supply according to an embodiment of this application.

Refer to FIG. 12. The switch control circuit includes the error amplifier, the comparator, and the pulse width modulator. The error amplifier in FIG. 12 corresponds to the EA in FIG. 7, the comparator in FIG. 12 corresponds to the CMP in FIG. 7, and the pulse width modulator in FIG. 12 corresponds to the PWM in FIG. 7. The error amplifier is connected to the voltage output end and configured to collected the feedback signal and generate an amplification result based on the feedback signal. The comparator is connected to the error amplifier, and configured to compare the amplification result with a reference signal, to generate a comparison result. The pulse width modulator is connected to the comparator, the first switch circuit, and each second switch circuit, and configured to output, based on the comparison result, the first switch control signal to the first switch circuit and the second switch control signal to each second switch circuit.

The error amplifier may obtain the feedback signal from the voltage output end, and the error amplifier may generate the amplification result and output the amplification result to the comparator. The comparator may obtain the amplification result of the feedback signal from the error amplifier, the comparator may further obtain a preset reference signal, and the comparator may generate and send the comparison result to the pulse width modulator. The pulse width modulator may receive the comparison result from the comparator and generate the switch control signal based on the received comparison result. For example, the pulse width modulator is connected to the first switch circuit and each second switch circuit, and the pulse width modulator outputs, based on the comparison result, the first switch control signal to the first switch circuit and the second switch control signal to each second switch circuit. In this embodiment of this application, the output voltage at the voltage output end may be precisely controlled by using a switch control circuit using the structure.

Figure 13:
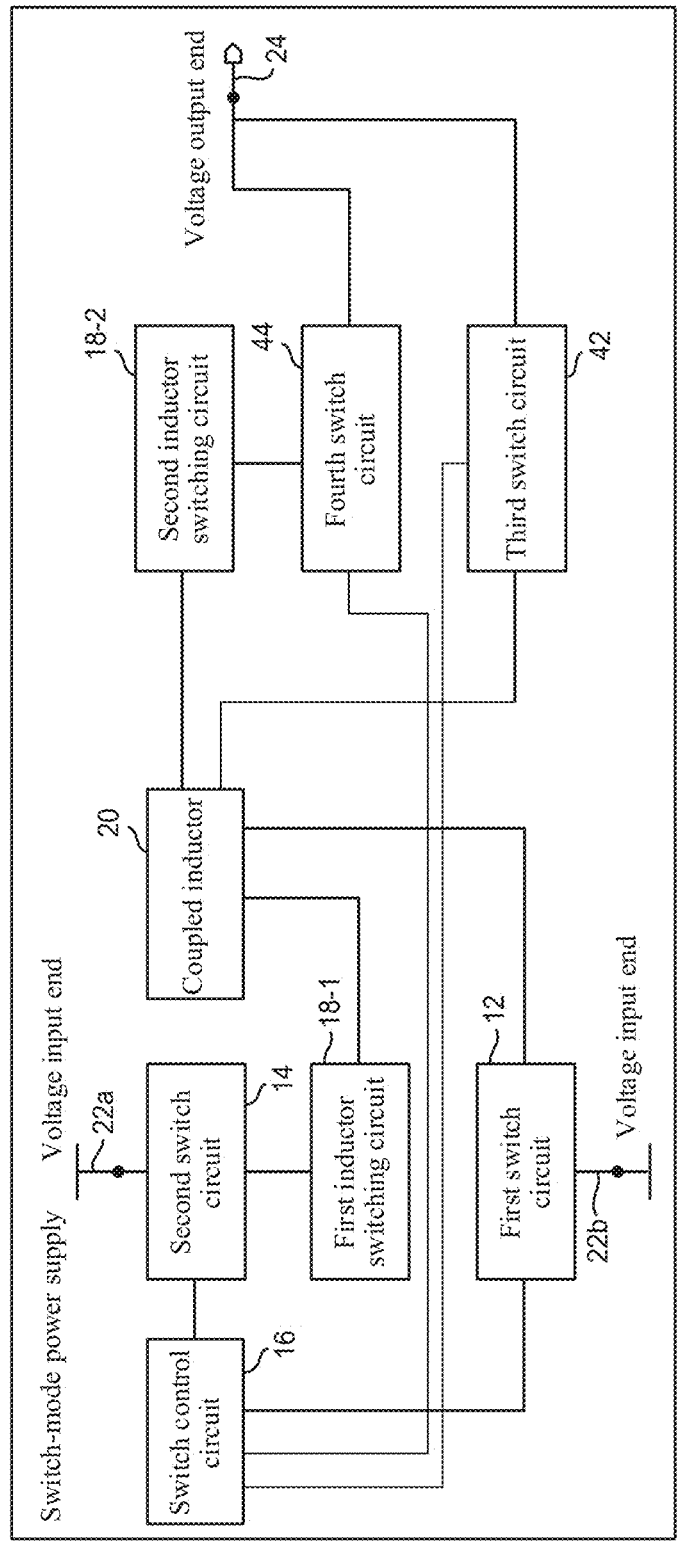
FIG. 13 is a schematic diagram of a structure of another switch-mode power supply according to an embodiment of this application.

In some embodiments of this application, the switch-mode power supply shown in FIG. 1 may implement a switch-mode power supply based on the BUCK circuit. It is not limited that, the switch-mode power supply provided in this embodiment of this application may include the BOOST circuit in addition to the BUCK circuit. In other words, the switch-mode power supply provided in this embodiment of this application may be a switch-mode power supply based on the BUCK-BOOST circuit. Specifically, as shown in FIG. 13, the switch-mode power supply further includes a third switch circuit, at least one fourth switch circuit, and a second inductor switching circuit. The third switch circuit is connected to a voltage output end, a switch control circuit, and a coupled inductor, and configured to receive a third switch control signal input by the switch control circuit, and inject a third current from the coupled inductor to the voltage output end under control of the third switch control signal. Each fourth switch circuit in the at least one fourth switch circuit is connected to the voltage output end, the switch control circuit, and the coupled inductor, and configured to receive a fourth switch control signal input by the switch control circuit, and inject a fourth current from the coupled inductor to the voltage output end under control of the fourth switch control signal. The second inductor switching circuit is connected to each fourth switch circuit, and configured to receive a second switching control signal, and in response to the second switching control signal, maintain signal transmission between each fourth switch circuit and the coupled inductor, or disconnect the signal transmission between each fourth switch circuit and the coupled inductor. The switch control circuit is connected to the third switch circuit, each fourth switch circuit, and the voltage output end, and further configured to output, based on a feedback signal, the third switch control signal to the third switch circuit and the fourth switch control signal to each fourth switch circuit. The coupled inductor is further connected to the third switch circuit, each fourth switch circuit, and the voltage output end, and configured to inject the third current to the voltage output end, or inject the third current and the fourth current to the voltage output end.

It should be noted that FIG. 13 uses an example in which the switch-mode power supply includes one fourth switch circuit. It is not limited in this embodiment of this application that, the switch-mode power supply includes the at least one fourth switch circuit. For example, the switch-mode power supply may include two fourth switch circuits, three fourth switch circuits, or more fourth switch circuits.

In this embodiment of this application, the switch-mode power supply may include different switch circuits. For example, the switch-mode power supply includes the third switch circuit and the at least one fourth switch circuit. Words such as "third" and "fourth" are used to distinguish the different switch circuits. For example, a switch circuit connecting the coupled inductor and the voltage output end is referred to as the "third switch circuit". A switch circuit connecting the second inductor switching circuit, the voltage output end, and the switch control circuit is referred to as the "fourth switch circuit". The switch circuit may include power transistors. For example, each switch circuit includes an upper power transistor and a lower power transistor. The upper power transistor and the lower power transistor are defined based on different positions of the power transistors in the circuit.

In this embodiment of this application, the third switch circuit is connected to the voltage output end, the switch control circuit, and the coupled inductor. For example, the third switch circuit has a plurality of terminals that may be separately connected to the voltage output end, the switch control circuit, and the coupled inductor. The third switch circuit may receive the third switch control signal input by the switch control circuit, and inject the third current from the coupled inductor to the voltage output end under the control of the third switch control signal;

In the switch-mode power supply, a connection manner of the at least one fourth switch circuit is different from that of the third switch circuit. For example, each fourth switch circuit in at least one second switch circuit is connected to the voltage output end, the switch control circuit, and the coupled inductor. The fourth switch circuit receives the fourth switch control signal input by the switch control circuit, and injects the fourth current to the coupled inductor under the control of the fourth switch control signal.

It may be understood that the third switch control signal is different from the fourth switch control signal in the following embodiments. For example, a switch control signal input by the switch control circuit to the third switch circuit is referred to as the "third switch control signal", and a switch control signal input by the switch control circuit to the fourth switch circuit is referred to as the "fourth switch control signal". The third current is different from the fourth current in the following embodiments. For example, a current output to the third switch circuit from the coupled inductor is referred to as the "third current", and a current output to the fourth switch circuit from the coupled inductor is referred to as the "fourth current".

In this embodiment of this application, the switch-mode power supply includes the switch control circuit. The switch control circuit is separately connected to the third switch circuit and the at least one fourth switch circuit. The switch control circuit may be configured to precisely control a voltage at the voltage output end. For example, the switch control circuit may input a switch control signal to the third switch circuit and the at least one fourth switch circuit, to precisely control the voltage at the voltage output end. The switch control circuit is connected to the third switch circuit, each fourth switch circuit and the voltage output end. The switch control circuit may receive the feedback signal from the voltage output end, and output, based on the feedback signal, the third switch control signal to the third switch circuit and the fourth switch control signal to each fourth switch circuit. The feedback signal indicates an output voltage at the voltage output end.

In this embodiment of this application, the switch-mode power supply may include the second inductor switching circuit. In the switch-mode power supply, the second inductor switching circuit between the fourth switch circuit and the coupled inductor. The second inductor switching circuit may receive a first switching control signal. Based on different content of the first switching control signal, the second inductor switching circuit has different functions, for example, the second inductor switching circuit receives the second switching control signal, and in response to the second switching control signal, maintains the signal transmission between each fourth switch circuit and the coupled inductor, or disconnects the signal transmission between each fourth switch circuit and the coupled inductor. The second inductor switching circuit may include a control switch, and may be turned off or on based on the different second switching control signals. When the second inductor switching circuit is closed, the signal transmission between each fourth switch circuit and the coupled inductor is maintained. When the second inductor switching circuit is open, the signal transmission between each fourth switch circuit and the coupled inductor is disconnected. For another example, the second inductor switching circuit may include the power transistor, and each fourth switch circuit may be disconnected or connected to the coupled inductor based on the different content of the second switching control signal, to control the signal transmission between each fourth switch circuit and the coupled inductor. Specifically, signal transmission between the fourth switch circuit and the coupled inductor refers to a transmission of a current signal or a control signal between the fourth switch circuit and the coupled inductor.

In this embodiment of this application, the coupled inductor refers to a plurality of inductors having a coupling relationship. Two terminals of the plurality of inductors, that are dotted terminals, may be respectively connected to a voltage input end and the fourth switch circuit. The coupled inductor may be connected to the third switch circuit, each fourth switch circuit, and the voltage input end. It can be learned from the foregoing description of the second inductor switching circuit that, the second inductor switching circuit may maintain the signal transmission between each fourth switch circuit and the coupled inductor, or disconnect the signal transmission between each fourth switch circuit and the coupled inductor. When the second inductor switching circuit maintains the signal transmission between each fourth switch circuit and the coupled inductor, the coupled inductor may output the third current and the fourth current to the voltage output end. When the second inductor switching circuit disconnects the signal transmission between each fourth switch circuit and the coupled inductor, the coupled inductor may output the third current to the voltage output end. Therefore, the coupled inductor may have two different current output manners. For example, the coupled inductor may inject the third current to the voltage output end, or the coupled inductor may inject the third current and the fourth current to the voltage output end.

In this embodiment of this application, under control of the second inductor switching circuit, the coupled inductor has two signal transmission modes: One is signal transmission between the coupled inductor and only the third switch circuit, and the other is signal transmissions between the coupled inductor and the third switch circuit and between the coupled inductor and the fourth switch circuit. Therefore, according to different control manners of the second inductor switching circuit, the coupled inductor may form different inductance parameters based on different connected switch circuits, and currents injected by the coupled inductor to the voltage output end are also different. Therefore, different inductance performance may be separately configured based on different load requirements, to implement high conversion efficiency within a wide range of loads.

Figure 14:
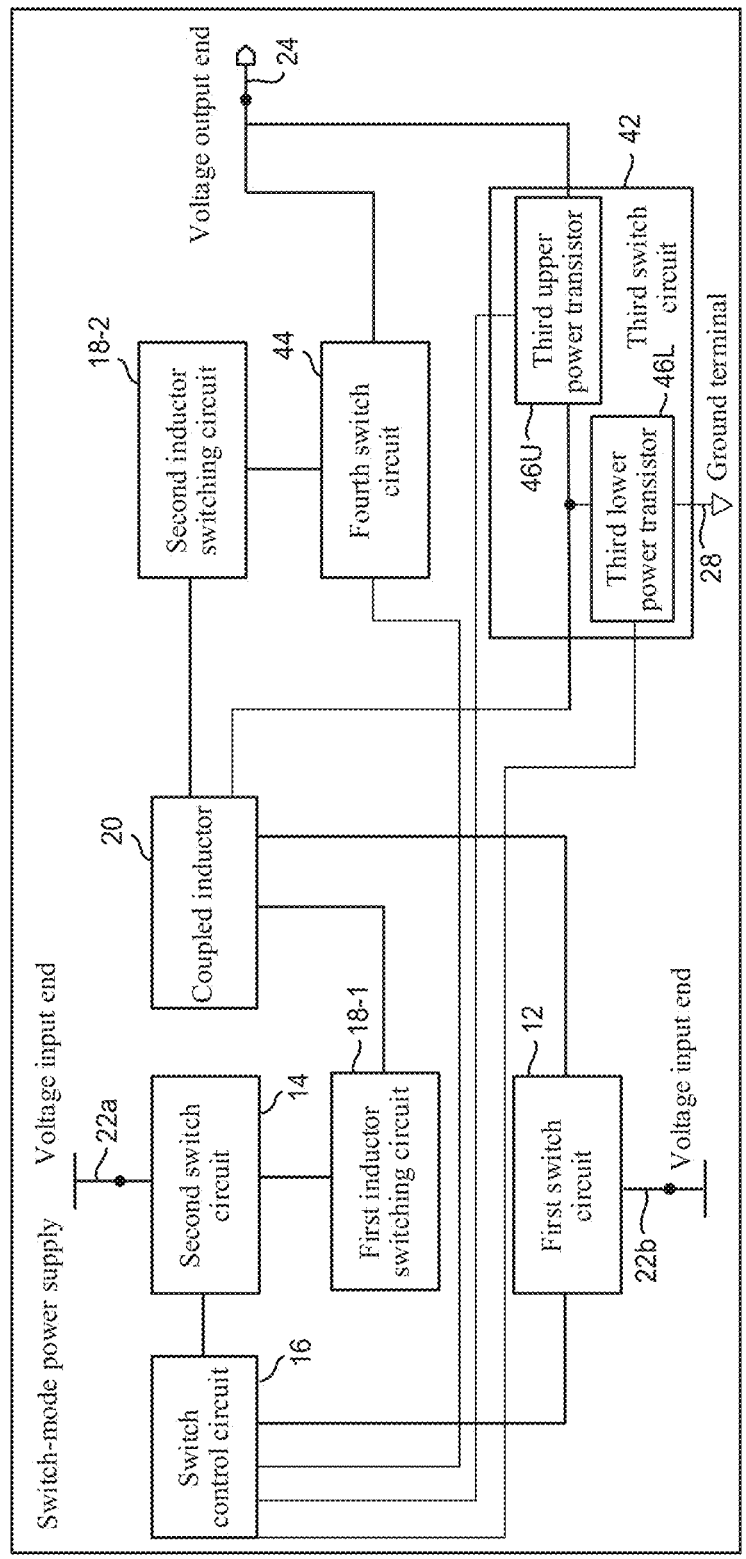
FIG. 14 is a schematic diagram of a structure of another switch-mode power supply according to an embodiment of this application.

In some embodiments of this application, as shown in FIG. 14, the third switch circuit includes a third upper power transistor and a third lower power transistor. The third upper power transistor is separately connected to the voltage output end, the switch control circuit, and the coupled inductor. The third lower power transistor is separately connected to the coupled inductor, the switch control circuit, and a ground terminal.

The third switch circuit may include two power transistors. Each power transistor may include a gate (G electrode), a source (S electrode), and a drain (D electrode). According to the different positions of the two power transistors in the switch circuit, the two power transistors are respectively referred to as the third upper power transistor and the third lower power transistor. The third upper power transistor is separately connected to the voltage output end, the switch control circuit, and the coupled inductor. For example, a gate of the third upper power transistor is connected to the switch control circuit, a drain of the third upper power transistor is connected to the coupled inductor, and a source of the third upper power transistor is connected to the voltage output end. The third lower power transistor is separately connected to the coupled inductor, the switch control circuit, and the ground terminal. For example, a gate of the third lower power transistor is connected to the switch control circuit, a source of the third lower power transistor is connected to the ground terminal, and a drain of the third lower power transistor is connected to the coupled inductor. The coupled inductor may inject the third current to the voltage output end by using the third upper power transistor and the third lower power transistor in the third switch circuit.

Figure 15:
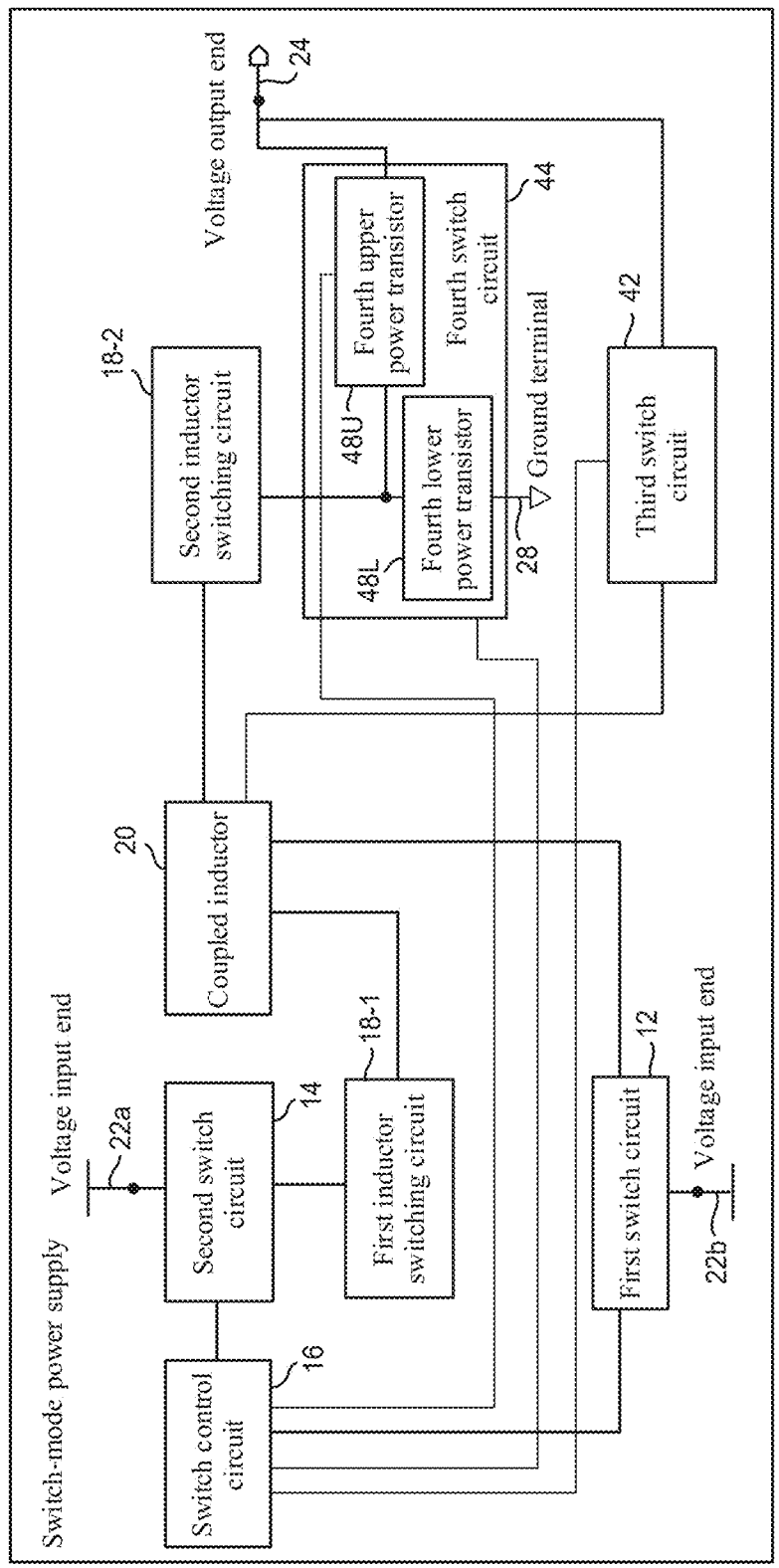
FIG. 15 is a schematic diagram of a structure of another switch-mode power supply according to an embodiment of this application.

In some embodiments of this application, as shown in FIG. 15, each fourth switch circuit includes a fourth upper power transistor and a fourth lower power transistor. The fourth upper power transistor is separately connected to the voltage output end, the switch control circuit, and the coupled inductor. The fourth lower power transistor is separately connected to the coupled inductor, the switch control circuit, and the ground terminal.

The fourth switch circuit may include two power transistors. Each power transistor may include a gate, a source, and a drain. According to the different positions of the two power transistors in the circuit, the two power transistors are respectively referred to as the fourth upper power transistor and the fourth lower power transistor. The fourth upper power transistor is separately connected to the voltage input end, the switch control circuit, and the coupled inductor. For example, a gate of the fourth upper power transistor is connected to the switch control circuit, a drain of the fourth upper power transistor is connected to the coupled inductor, and a source of the fourth upper power transistor is connected to the voltage output end. The fourth lower power transistor is separately connected to the coupled inductor, the switch control circuit, and the ground terminal. For example, a gate of the fourth lower power transistor is connected to the switch control circuit, a source of the fourth lower power transistor is connected to the ground terminal, and a drain of the fourth lower power transistor is connected to the coupled inductor. The coupled inductor may inject the fourth current to the voltage output end by using the fourth upper power transistor and the fourth lower power transistor in the fourth switch circuit.

For example, the switch-mode power supply may include a BOOST circuit in addition to a BUCK circuit. The third upper power transistor shown in FIG. 14 and the fourth upper power transistor shown in FIG. 15 may specifically be the upper power transistors in the BOOST circuit. In the BOOST circuit, the coupled inductor may be charged by using the upper power transistors. To be specific, a current may be injected to the coupled inductor by using the third upper power transistor and the fourth upper power transistor, to implement a charging function of the coupled inductor. In the BOOST circuit, a function of cutting off a charging path may be disabled by using the lower power transistors. To be specific, the current flowing to the coupled inductor may be cut off by using the third lower power transistor and the fourth lower power transistor, to enable a function of preventing the current from flowing to the coupled inductor. It may be understood that functions of the lower power transistor in the BOOST circuit are different from that of the lower power transistor in the BUCK circuit. In the BUCK circuit, the lower power transistor obtains the current from the coupled inductor. In the BOOST circuit, the lower power transistor enables the function of cutting off the charging path. The lower power transistor in the BOOST circuit cannot implement a discharging function. Compared with the lower power transistor in the BUCK circuit, the lower power transistor in the BOOST circuit is closer to the voltage input end, and the lower power transistor of the BOOST circuit cannot directly discharge the current to the coupled inductor.

Figure 16:
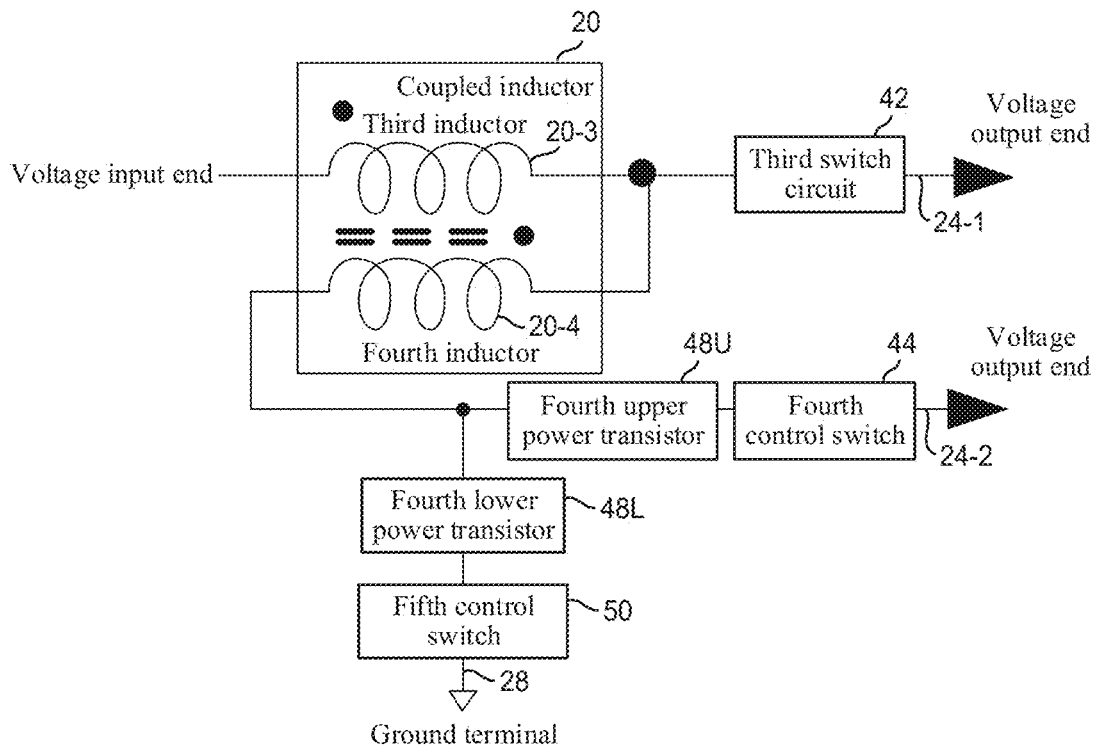
FIG. 16 is a schematic diagram of a structure of another switch-mode power supply according to an embodiment of this application.

In some embodiments of this application, as shown in FIG. 16, the second inductor switching circuit includes at least one fourth control switch. One fourth control switch in the at least one fourth control switch corresponds to the one fourth switch circuit in the at least one fourth switch circuit, is connected between the voltage output end and the fourth upper power transistor of the one fourth switch circuit in the at least one fourth switch circuit, and is configured to maintain, based on the second switching control signal, signal transmission between the fourth upper power transistor and the coupled inductor, or disconnect the signal transmission between the fourth upper power transistor and the coupled inductor.

The second inductor switching circuit may include the control switch, and may be turned off or on based on the different second switching control signals. When the second inductor switching circuit is closed, the signal transmission between each fourth switch circuit and the coupled inductor is maintained. When the second inductor switching circuit is open, the signal transmission between each fourth switch circuit and the coupled inductor is disconnected. The one fourth control switch in the at least one fourth control switch corresponds to the one fourth switch circuit in the at least one fourth switch circuit. To be specific, each fourth switch circuit may be connected to the one fourth control switch, the fourth control switch may be connected between the voltage output end and the fourth upper power transistor of the one fourth switch circuit in the at least one fourth switch circuit, and the fourth control switch may be configured to maintain, based on the second switching control signal, the signal transmission between the fourth upper power transistor and the coupled inductor, or disconnect the signal transmission between the fourth upper power transistor and the coupled inductor. Therefore, the signal transmission between the fourth upper power transistor and the coupled inductor may be implemented by using the fourth control switch. Therefore, according to the different control manners of the second inductor switching circuit, the coupled inductor may form the different inductance parameters based on the different connected switch circuits, and the currents injected by the coupled inductor to the voltage output end are also different. Therefore, the different inductance performance may be separately configured based on the different load requirements, to implement the high conversion efficiency within the wide range of loads.

In some embodiments of this application, as shown in FIG. 16, the second inductor switching circuit includes at least one fifth control switch. One fifth control switch in the at least one fifth control switch corresponds to the one fourth switch circuit in the at least one fourth switch circuit, is connected between the fourth lower power transistor of the one fourth switch circuit in the at least one fourth switch circuit and the ground terminal, and is configured to maintain, based on the second switching control signal, signal transmission between the fourth lower power transistor and the coupled inductor, or disconnect the signal transmission between the fourth lower power transistor and the coupled inductor.

The second inductor switching circuit may include the control switch, and may be turned off or on based on the different second switching control signals. When the second inductor switching circuit is closed, the signal transmission between each fourth switch circuit and the coupled inductor is maintained. When the second inductor switching circuit is open, the signal transmission between each fourth switch circuit and the coupled inductor is disconnected. The one fifth control switch in the at least one fifth control switch corresponds to the one fourth switch circuit in the at least one fourth switch circuit. To be specific, each fourth switch circuit may be connected to the one fifth control switch, the fifth control switch may be connected between the fourth lower power transistor of the one fourth switch circuit in the at least one fourth switch circuit and the ground terminal, and the fifth control switch may be configured to maintain, based on the second switching control signal, the signal transmission between the fourth lower power transistor and the coupled inductor, or disconnect the signal transmission between the fourth lower power transistor and the coupled inductor. Therefore, the signal transmission between the fourth lower power transistor and the coupled inductor may be implemented by using the fifth control switch. Therefore, according to the different control manners of the second inductor switching circuit, the coupled inductor may form the different inductance parameters based on the different connected switch circuits, and the currents injected by the coupled inductor to the voltage output end are also different. Therefore, the different inductance performance may be separately configured based on the different load requirements, to implement the high conversion efficiency within the wide range of loads.

Figure 17:
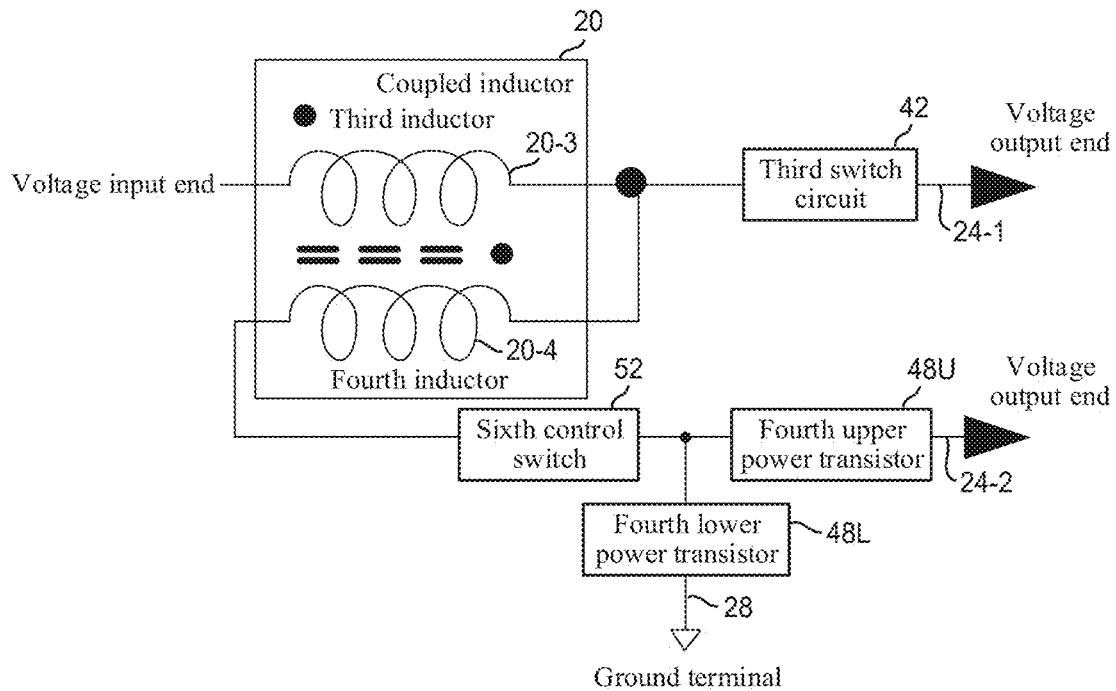
FIG. 17 is a schematic diagram of a structure of another switch-mode power supply according to an embodiment of this application.

In some embodiments of this application, as shown in FIG. 17, a first inductor switching circuit includes at least one sixth control switch. One sixth control switch in the at least one sixth control switch corresponds to the one fourth switch circuit in the at least one fourth switch circuit, is connected between the one fourth switch circuit in the at least one fourth switch circuit and the coupled inductor, and is configured to maintain, based on the second switching control signal, the signal transmission between the fourth lower power transistor and the coupled inductor, or disconnect the signal transmission between the fourth lower power transistor and the coupled inductor.

The second inductor switching circuit may include the control switch, and may be turned off or on based on the different second switching control signals. When the second inductor switching circuit is closed, the signal transmission between each fourth switch circuit and the coupled inductor is maintained. When the second inductor switching circuit is open, the signal transmission between each fourth switch circuit and the coupled inductor is disconnected. The one sixth control switch in the at least one sixth control switch corresponds to the one fourth switch circuit in the at least one fourth switch circuit. To be specific, each fourth switch circuit may be connected to the one sixth control switch, the sixth control switch may be connected between the fourth upper power transistor of the one fourth switch circuit in the at least one fourth switch circuit, and the sixth control switch may be configured to maintain, based on the second switching control signal, the signal transmission between the fourth upper power transistor and the coupled inductor, or disconnect the signal transmission between the fourth upper power transistor and the coupled inductor. Therefore, the signal transmission between the fourth upper power transistor and the coupled inductor may be implemented by using the sixth control switch. Therefore, according to the different control manners of the second inductor switching circuit, the coupled inductor may form the different inductance parameters based on the different connected switch circuits, and the currents injected by the coupled inductor to the voltage output end are also different. Therefore, the different inductance performance may be separately configured based on the different load requirements, to implement the high conversion efficiency within the wide range of loads.

Figure 18:
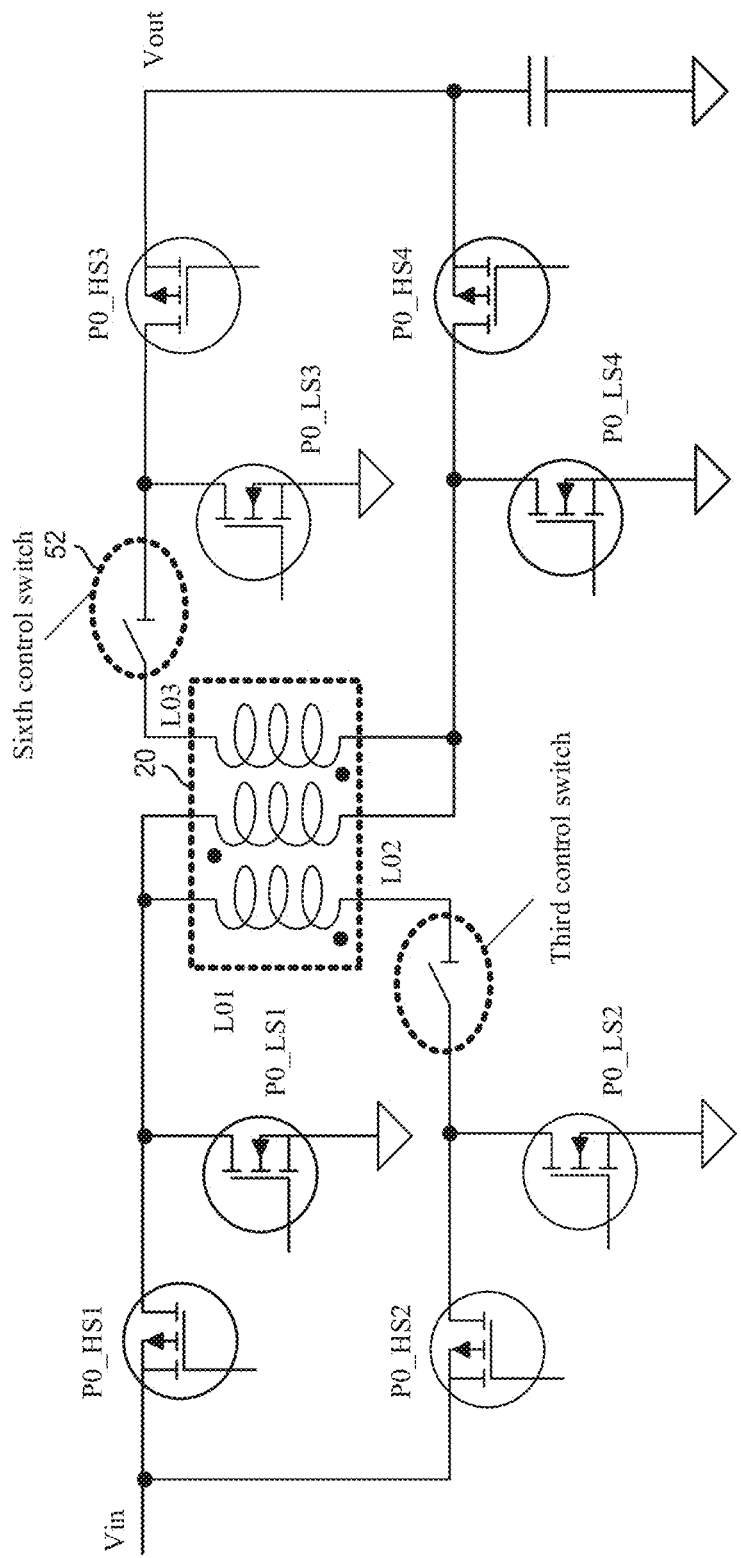
FIG. 18 is a schematic diagram of a structure of a BUCK-BOOST circuit according to an embodiment of this application.

Refer to FIG. 18. A BUCK-BOOST circuit may include a first switch circuit, a second switch circuit, the third switch circuit, the fourth switch circuit, the first inductor switching circuit, the second inductor switching circuit, the coupled inductor, and a capacitor. Vin indicates the voltage input end, and Vout indicates the voltage output end. The first switch circuit includes an upper power transistor P0_HS1 and a lower power transistor P0_LS1. The second switch circuit includes an upper power transistor P0_HS2 and a lower power transistor P0_LS2. A third inductor includes an upper power transistor P0_HS4 and a lower power transistor P0_LS4. A fourth inductor includes an upper power transistor P0_HS3 and a lower power transistor P0_LS3. The coupled inductor includes the inductor L01, the inductor L02, and the inductor L03. An input terminal of the inductor L01, an input terminal of the inductor L02, and an input terminal of the inductor L03 are dotted terminals. An output terminal of the inductor L01 is connected to the input terminal of the inductor L02, to implement a serial connection between the inductor L01 and the inductor L02. An output terminal of the inductor L02 is connected to the input terminal of the inductor L03, to implement a serial connection between the inductor L02 and the inductor L03. The first inductor switching circuit specifically includes a third control switch. The second inductor switching circuit specifically includes the sixth control switch. The third control switch is separately connected to the upper power transistor P0_HS2 and the coupled inductor. The sixth control switch is separately connected to the upper power transistor P0_HS3 and the coupled inductor.

The BUCK-BOOST circuit applied in FIG. 18 is used as an example. A difference between the BUCK circuit shown in FIG. 18 and the BUCK circuit shown in FIG. 10 lies in that the BOOST circuit is added to the BUCK circuit shown in FIG. 10 to form the BUCK-BOOST circuit including three coupled inductors shown in FIG. 18. In this embodiment of this application, there is a coupling relationship between the three inductors connected in series. The BUCK-BOOST circuit may include: the upper power transistor (may also be referred to as an upper power transistor) P0_HS1, the lower power transistor (may also be referred to as a lower power transistor) P0_LS1, the upper power transistor P0_HS2, the lower power transistor P0_LS2, the upper power transistor P0_HS3, the lower power transistor P0_LS3, the upper power transistor P0_HS4, the lower power transistor P0_LS4, the inductor L01, the inductor L02, the inductor L03, and the capacitor. The upper power transistors P0_HS0 and P0_HS1 are connected to the voltage input end Vin. The upper power transistors P0_HS3 and P0_HS4 are connected to the voltage output end Vout. The inductor L01, the inductor L02, and the inductor L03 are connected in series, L01 is connected to the third control switch, and the L03 is connected to the sixth control switch. A main power inductor is L02. When working in the BUCK mode, L01 is used as an auxiliary light-load channel inductor. When working in the BOOST mode, L03 is used as the auxiliary light-load channel inductor. The third control switch and the sixth control switch may achieve channel isolation. Specifically, in a dotted circle shown in FIG. 18, under heavy load conditions, only L02 channel is used. Under light load conditions in the BUCK circuit and the BOOST circuit, an L01+L02 channel and an L02+L03 channel are respectively used.

It can be learned from the examples in the foregoing embodiment that, in this embodiment of this application, when the plurality of inductors are connected in series, effect of a large inductor and a small inductor may be achieved. This solution can be extended and applied to all products that use the switch-mode power supply including an inductor and other functional circuits. Any structure and circuit solution that use the inductor can be implemented based on the switch-mode power supply provided in this embodiment of this application. In this embodiment of this application, the high conversion efficiency within the wide range of loads can be implemented in comparison with output of a single-phase switch-mode power supply. In addition, the coupled inductor may be further used to increase light-load efficiency, so that the effect of the large inductor and the small inductor may be achieved. Reduction of a size of the inductor is beneficial to miniaturization of a board-level power supply.

FIG. 1 to FIG. 12 show a structure of the switch-mode power supply based on the BUCK circuit. The following describes a structure of the switch-mode power supply based on the BOOST circuit. For example, in the structure of the switch-mode power supply based on the BUCK circuit, there are a plurality of voltage input ends and one voltage output end, the coupled inductor is connected to the voltage output end, and each switch circuit is connected to the voltage input end. However, in the structure of the switch-mode power supply based on the BOOST circuit, there is one voltage input end and a plurality of voltage output ends, the coupled inductor is connected to the voltage input end, and each switch circuit is connected to the voltage output end. The following describes a detailed structure of the switch-mode power supply based on the BOOST circuit. Functions of components in the switch-mode power supply based on the BOOST circuit are similar to that of components in the switch-mode power supply based on the BUCK circuit. The following describes functions of the switch-mode power supply based on the BOOST circuit that are similar to that of the BOOST circuit including the third switch circuit, the at least one fourth switch circuit, and the second inductor switching circuit shown in FIG. 13 to FIG. 18. For same parts, details are not described herein again. The following only describes a part of the BOOST circuit that distinguishes from the BUCK circuit.

Figure 19:
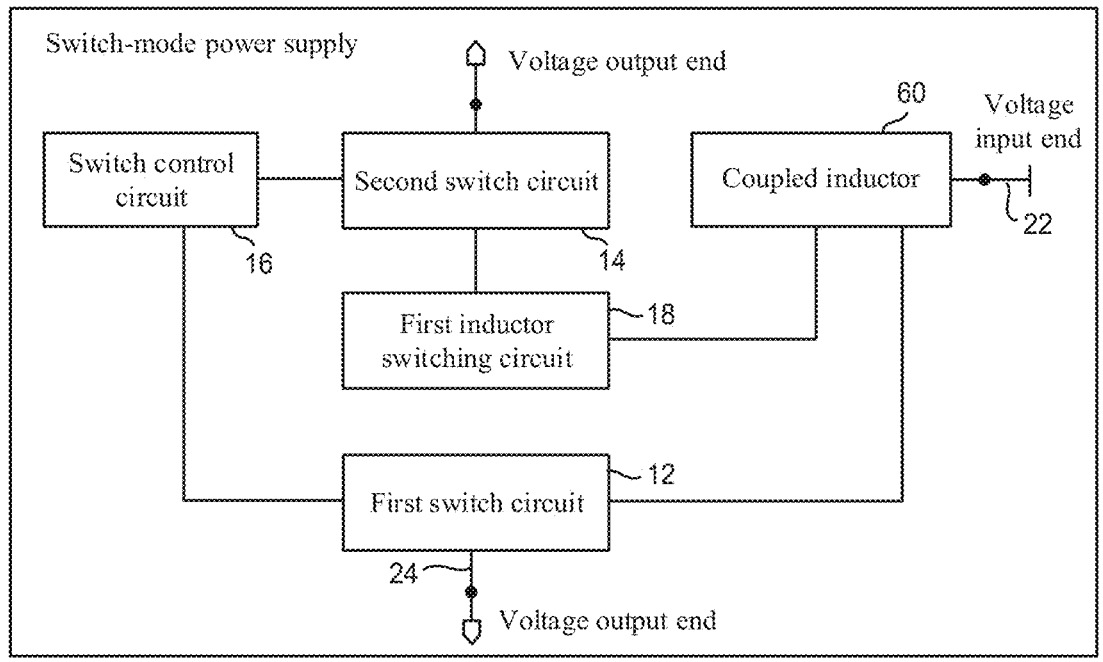
FIG. 19 is a schematic diagram of a structure of another switch-mode power supply according to an embodiment of this application.

Refer to FIG. 19. An embodiment of this application provides a switch-mode power supply. The switch-mode power supply includes: a first switch circuit, at least one second switch circuit, a switch control circuit, a first inductor switching circuit, a coupled inductor, a voltage input end, and a voltage output end. The first switch circuit is connected to the voltage output end, the switch control circuit, and the coupled inductor, and configured to receive a first switch control signal input by the switch control circuit, and inject a first current from the coupled inductor to the voltage output end under control of the first switch control signal. Each second switch circuit in the at least one second switch circuit is connected to the voltage output end, the switch control circuit, and the coupled inductor, and configured to receive a second switch control signal input by the switch control circuit, and inject a second current from the coupled inductor to the voltage output end under control of the second switch control signal. The first inductor switching circuit is connected to each second switch circuit, and configured to receive a first switching control signal, and in response to the first switching control signal, maintain signal transmission between each second switch circuit and the coupled inductor, or disconnect the signal transmission between each second switch circuit and the coupled inductor. The switch control circuit is connected to the first switch circuit, each second switch circuit, and the voltage output end, and configured to collect a feedback signal, and output, based on the feedback signal, the first switch control signal to the first switch circuit and the second switch control signal to each second switch circuit. The feedback signal indicates an output voltage at the voltage output end. The coupled inductor is connected to the first switch circuit, each second switch circuit, and the voltage input end, and configured to inject the first current to the voltage output end, or inject the first current and the second current to the voltage output end.

Functions of the first switch circuit shown in FIG. 19 are similar to that of the third switch circuit shown in FIG. 13. For details, refer to the description of the third switch circuit shown in FIG. 13. Functions of the second switch circuit shown in FIG. 19 are similar to that of the fourth switch circuit shown in FIG. 13. For details, refer to the description of the fourth switch circuit shown in FIG. 13. Functions of the first inductor switching circuit shown in FIG. 19 are similar to that of the second inductor switching circuit shown in FIG. 13. For details, refer to the description of the second inductor switching circuit shown in FIG. 13.

In this embodiment of this application, under control of the first inductor switching circuit, the coupled inductor has two signal transmission modes: One is signal transmission between the coupled inductor and only the first switch circuit, and the other is signal transmissions between the coupled inductor and the first switch circuit and between the coupled inductor and the second switch circuit. Therefore, according to different control manners of the first inductor switching circuit, the coupled inductor may form different inductance parameters based on different connected switch circuits, and currents injected by the coupled inductor to the voltage output end are also different. Therefore, different inductance performance may be separately configured based on different load requirements, to implement high conversion efficiency within a wide range of loads.

Figure 20:
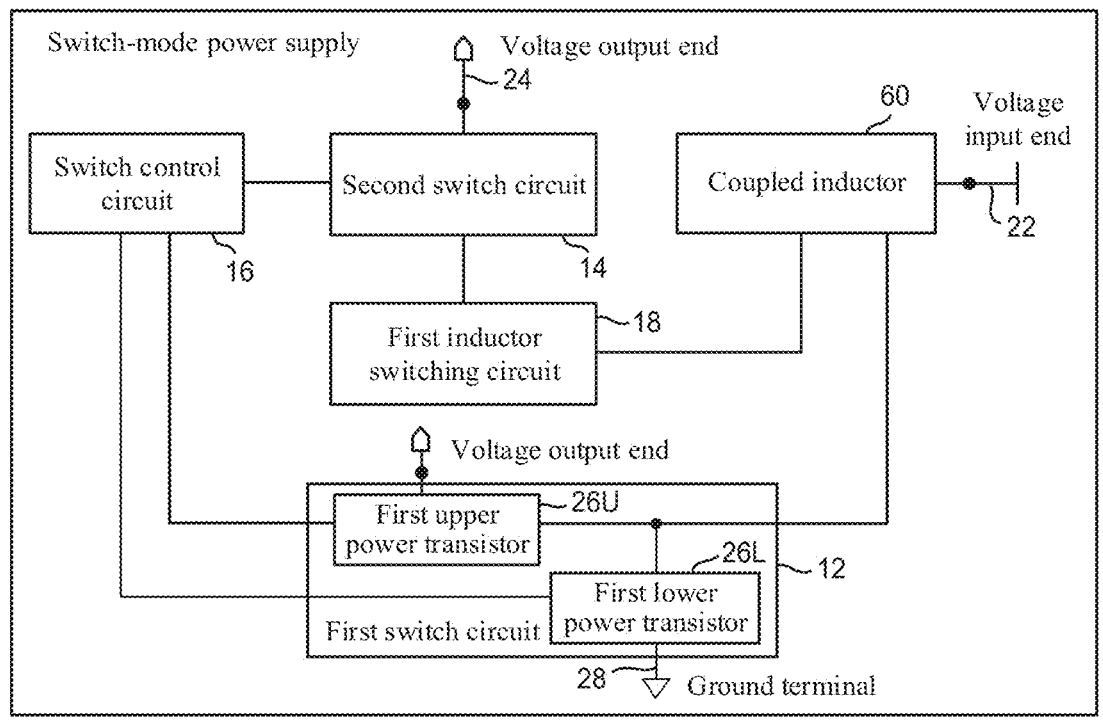
FIG. 20 is a schematic diagram of a structure of another switch-mode power supply according to an embodiment of this application.

In some embodiments of this application, as shown in FIG. 20, the first switch circuit includes a first upper power transistor and a first lower power transistor. The first upper power transistor is separately connected to the voltage output end, the switch control circuit, and the coupled inductor. The first lower power transistor is separately connected to the coupled inductor, the switch control circuit, and a ground terminal.

The first switch circuit may include two power transistors. Each power transistor may include a gate, a source, and a drain. According to different positions of the two power transistors in the circuit, the two power transistors are respectively referred to as the first upper power transistor and the first lower power transistor. The first upper power transistor is separately connected to the voltage output end, the switch control circuit, and the coupled inductor. For example, a gate of the first upper power transistor is connected to the switch control circuit, a drain of the first upper power transistor is connected to the coupled inductor, and a source of the first upper power transistor is connected to the voltage output end. The first lower power transistor is separately connected to the coupled inductor, the switch control circuit, and the ground terminal. For example, a gate of the first lower power transistor is connected to the switch control circuit, a source of the first lower power transistor is connected to the ground terminal, and a drain of the first lower power transistor is connected to the coupled inductor. The coupled inductor may inject the first current to the voltage output end by using the first upper power transistor and the first lower power transistor in the first switch circuit.

Functions of the first switch circuit shown in FIG. 20 are similar to that of the third switch circuit shown in FIG. 14. For details, refer to the description of the third switch circuit shown in FIG. 14.

Figure 21:
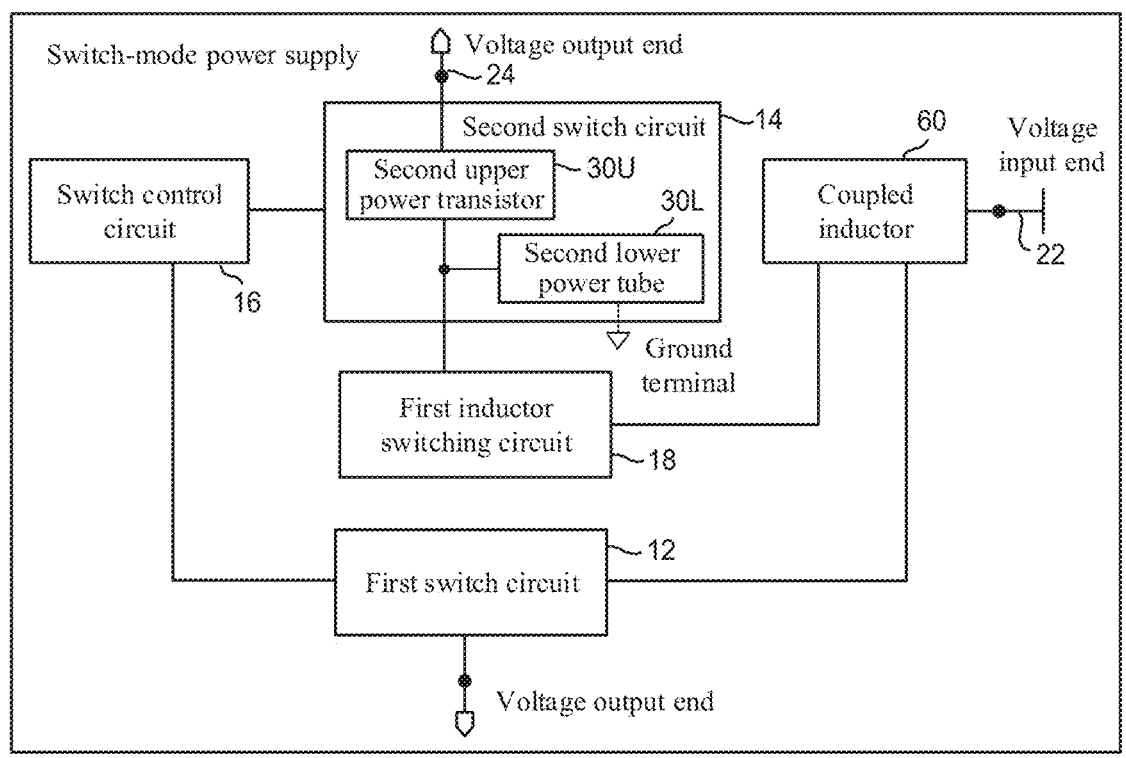
FIG. 21 is a schematic diagram of a structure of another switch-mode power supply according to an embodiment of this application.

In some embodiments of this application, as shown in FIG. 21, each second switch circuit includes a second upper power transistor and a second lower power transistor. The second upper power transistor is separately connected to the voltage output end, the switch control circuit, and the coupled inductor. The second lower power transistor is separately connected to the coupled inductor, the switch control circuit, and the ground terminal.

The second switch circuit may include two power transistors. Each power transistor may include a gate, a source, and a drain. According to the different positions of the two power transistors in the circuit, the two power transistors are respectively referred to as the second upper power transistor and the second lower power transistor. The second upper power transistor is separately connected to the voltage output end, the switch control circuit, and the coupled inductor. For example, a gate of the second upper power transistor is connected to the switch control circuit, a drain of the second upper power transistor is connected to the coupled inductor, and a source of the second upper power transistor is connected to the voltage output end. The second lower power transistor is separately connected to the coupled inductor, the switch control circuit, and the ground terminal. For example, a gate of the second lower power transistor is connected to the switch control circuit, a source of the second lower power transistor is connected to the ground terminal, and a drain of the second lower power transistor is connected to the coupled inductor. The coupled inductor may inject the second current to the voltage output end by using the second upper power transistor and the second lower power transistor in the second switch circuit.

Functions of the second switch circuit shown in FIG. 21 are similar to that of the fourth switch circuit shown in FIG. 15. For details, refer to the description of the fourth switch circuit shown in FIG. 15.

For example, the switch-mode power supply may include a BOOST circuit. The first upper power transistor shown in FIG. 20 and the second upper power transistor shown in FIG. 21 may be specifically upper power transistors in the BOOST circuit. In the BOOST circuit, the coupled inductor may be charged by using the upper power transistor. To be specific, a current may be injected to the coupled inductor by using the first upper power transistor and the second upper power transistor, to implement a charging function of the coupled inductor. In the BOOST circuit, a function of cutting off a charging path may be disabled by using lower power transistors. To be specific, the current flowing to the coupled inductor may be cut off by using the first lower power transistor and the second lower power transistor, to enable a function of preventing the current from flowing to the coupled inductor. It may be understood that functions of the lower power transistor in the BOOST circuit are different from that of the lower power transistor in a BUCK circuit. In the BUCK circuit, the lower power transistor obtains the current from the coupled inductor. In the BOOST circuit, the lower power transistor enables the function of cutting off the charging path. The lower power transistor in the BOOST circuit cannot implement a discharging function. Compared with the lower power transistor in the BUCK circuit, the lower power transistor in the BOOST circuit is closer to the voltage input end, and the lower power transistor of the BOOST circuit cannot directly discharge the current to the coupled inductor.

Figure 22:
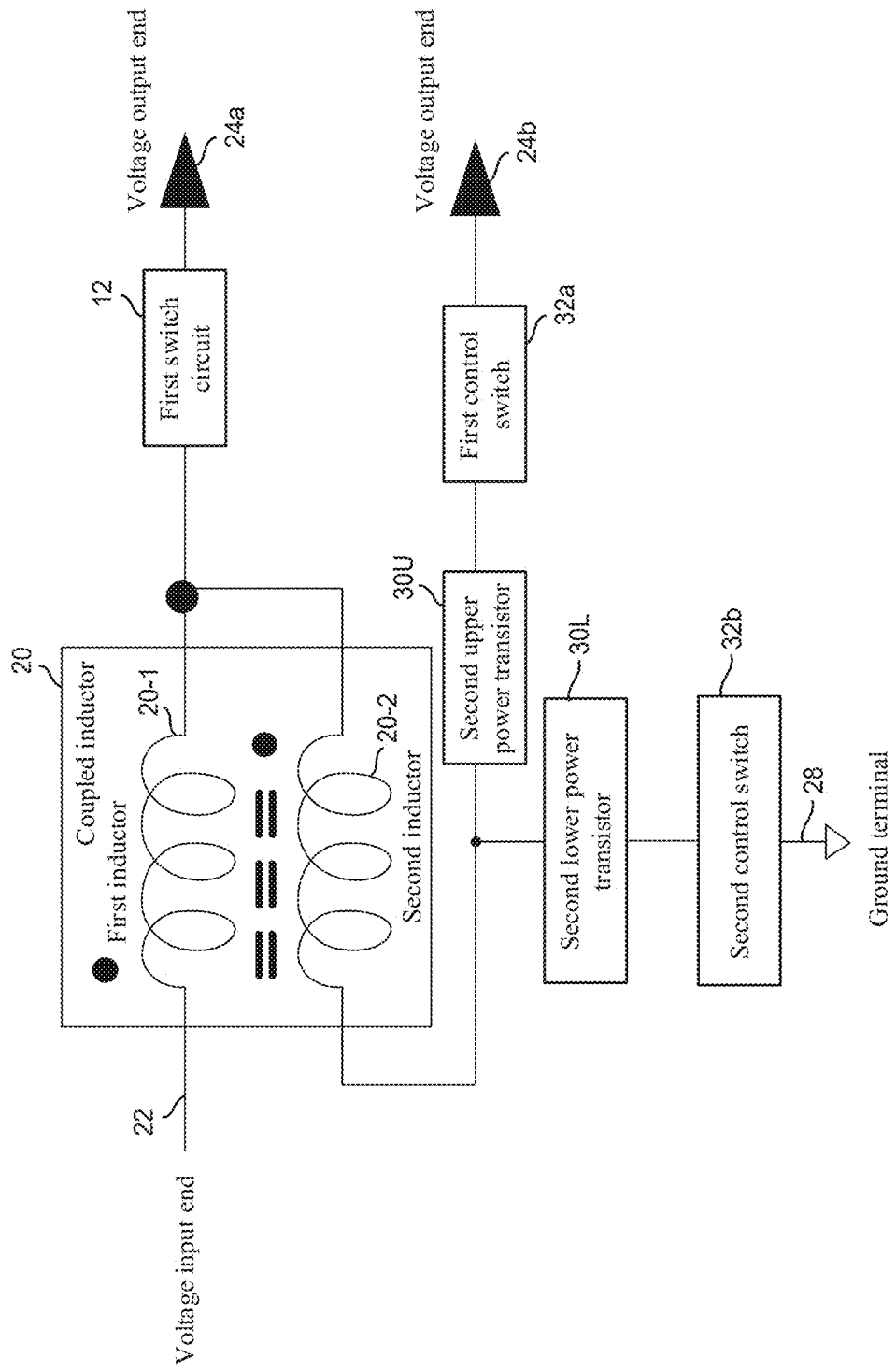
FIG. 22 is a schematic diagram of a structure of another switch-mode power supply according to an embodiment of this application.

In some embodiments of this application, as shown in FIG. 22, the first inductor switching circuit includes at least one first control switch. One first control switch in the at least one first control switch corresponds to one second switch circuit in the at least one second switch circuit, is connected between the voltage output end and the second upper power transistor of the one second switch circuit in the at least one second switch circuit, and is configured to maintain, based on the first switching control signal, signal transmission between the second upper power transistor and the coupled inductor, or disconnect the signal transmission between the second upper power transistor and the coupled inductor.

The first inductor switching circuit may include a control switch, and may be turned off or on based on the different first switching control signals. When the first inductor switching circuit is closed, the signal transmission between each second switch circuit and the coupled inductor is maintained. When the first inductor switching circuit is open, the signal transmission between each second switch circuit and the coupled inductor is disconnected. The one first control switch in the at least one first control switch corresponds to the one second switch circuit in the at least one second switch circuit. To be specific, each second switch circuit may be connected to the one first control switch, the first control switch may be connected between the voltage output end and the second upper power transistor of the one second switch circuit in the at least one second switch circuit, and the first control switch may be configured to maintain, based on the first switching control signal, the signal transmission between the second upper power transistor and the coupled inductor, or disconnect the signal transmission between the second upper power transistor and the coupled inductor. Therefore, the signal transmission between the second upper power transistor and the coupled inductor may be implemented by using the first control switch. Therefore, according to the different control manners of the first inductor switching circuit, the coupled inductor may form the different inductance parameters based on the different connected switch circuits, and the currents injected by the coupled inductor to the voltage output end are also different. Therefore, the different inductance performance may be separately configured based on the different load requirements, to implement the high conversion efficiency within the wide range of loads.

In some embodiments of this application, as shown in FIG. 22, the first inductor switching circuit includes at least one second control switch. The one second control switch in the at least one second control switch corresponds to the one second switch circuit in the at least one second switch circuit, is connected between the second lower power transistor of the one second switch circuit in the at least one second switch circuit and the ground terminal, and is configured to maintain, based on the second switching control signal, signal transmission between the second lower power transistor and the coupled inductor, or disconnect the signal transmission between the second lower power transistor and the coupled inductor.

The first inductor switching circuit may include the control switch, and may be turned off or on based on the different first switching control signals. When the first inductor switching circuit is closed, the signal transmission between each second switch circuit and the coupled inductor is maintained. When the first inductor switching circuit is open, the signal transmission between each second switch circuit and the coupled inductor is disconnected. The one second control switch in the at least one second control switch corresponds to the one second switch circuit in the at least one second switch circuit. To be specific, each second switch circuit may be connected to the one second control switch, the second control switch may be connected between the second lower power transistor of the one second switch circuit in the at least one second switch circuit and the ground terminal, and the second control switch may be configured to maintain, based on the first switching control signal, the signal transmission between the second lower power transistor and the coupled inductor, or disconnect the signal transmission between the second lower power transistor and the coupled inductor. Therefore, the signal transmission between the second lower power transistor and the coupled inductor may be implemented by using the second control switch. Therefore, according to the different control manners of the first inductor switching circuit, the coupled inductor may form the different inductance parameters based on the different connected switch circuits, and the currents injected by the coupled inductor to the voltage output end are also different. Therefore, the different inductance performance may be separately configured based on the different load requirements, to implement the high conversion efficiency within the wide range of loads.

In some embodiments of this application, the coupled inductor includes at least two inductors having a coupling relationship. Any two adjacent inductors of the at least two inductors are connected in series. An input terminal of a first inductor in the at least two inductors is connected between the voltage input end and the first switch circuit. A second inductor in the at least two inductors is connected between the first switch circuit and the one second switch circuit in the at least one second switch circuit, or connected between two second switch circuits in the at least one second switch circuit. For example, the coupled inductor in FIG. 22 includes two inductors: the first inductor and the second inductor. The input terminal of the first inductor and the input terminal of the second inductor are dotted terminals, and an output terminal of the first inductor is connected to the input terminal of the second inductor, so that a serial connection between the first inductor and the second inductor is implemented. The input terminal of the second inductor is configured to connect to the first switch circuit, and an output terminal of the second inductor is connected to the second switch circuit. The second switch circuit may include the second upper power transistor and the second lower power transistor. In this embodiment of this application, the high conversion efficiency of the switch-mode power supply within the wide range of loads may be implemented by using the plurality of serially-connected inductors. In this embodiment of this application, the at least two inductors having a coupling relationship may be used to implement the high conversion efficiency of the switch-mode power supply within the wide range of loads, and occupied board space of the at least two inductors having a coupling relationship is much less than that of two or more inductors (parallelly-connected multiphase), so that the at least two inductors having a coupling relationship may be applied to various types of switch-mode power supply topologies, to implement a miniaturization design of the switch-mode power supply.

Figure 23:
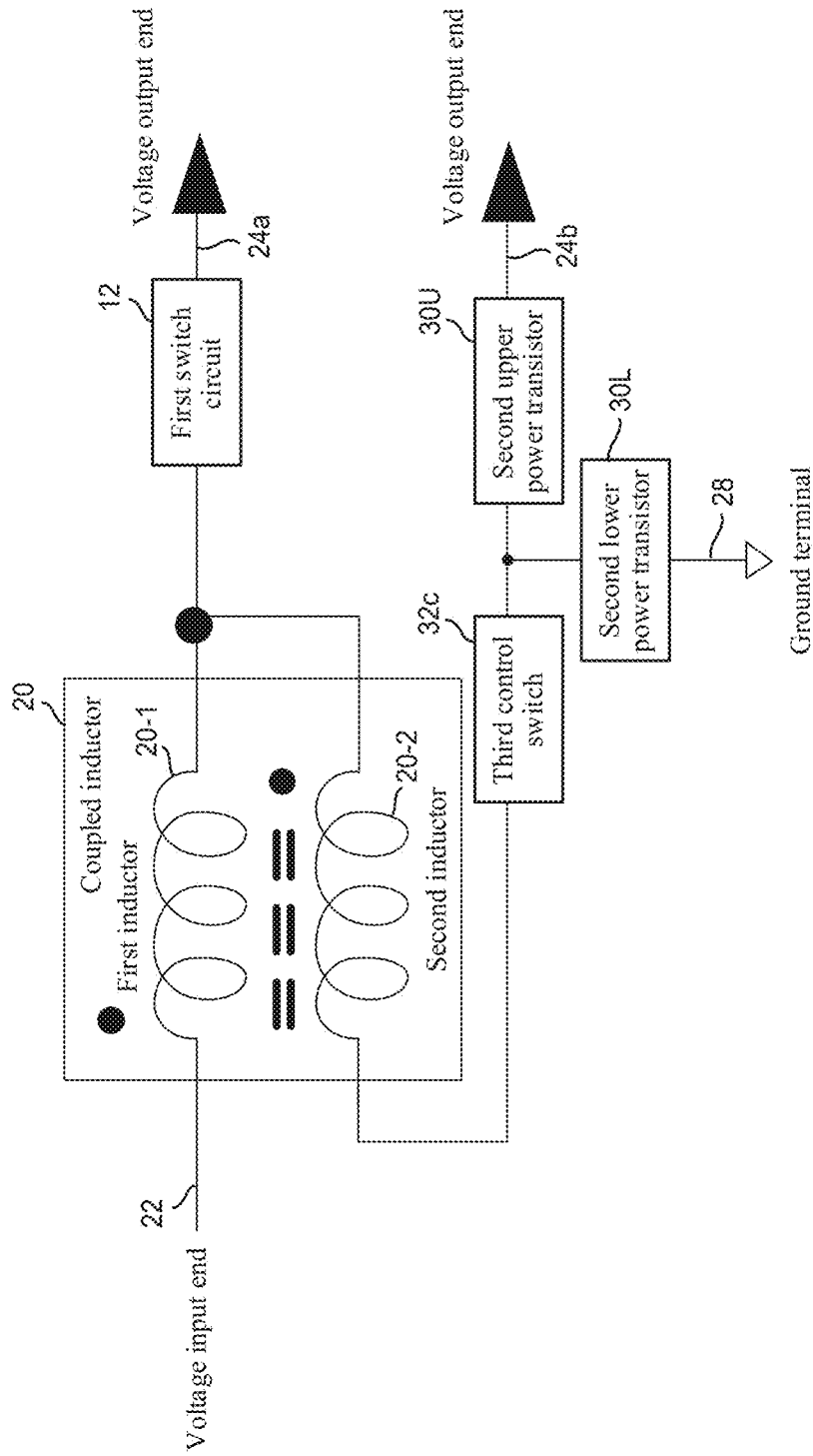
FIG. 23 is a schematic diagram of a structure of another switch-mode power supply according to an embodiment of this application.

In some embodiments of this application, as shown in FIG. 23, the first inductor switching circuit includes at least one third control switch. One third control switch in the at least one third control switch corresponds to the one second switch circuit in the at least one second switch circuit, is connected between the one second switch circuit in the at least one second switch circuit and the coupled inductor, and is configured to maintain, based on the first switching control signal, the signal transmission between the second lower power transistor and the coupled inductor, or disconnect the signal transmission between the second lower power transistor and the coupled inductor.

The first inductor switching circuit may include the control switch, and may be turned off or on based on the different first switching control signals. When the first inductor switching circuit is closed, the signal transmission between each second switch circuit and the coupled inductor is maintained. When the first inductor switching circuit is open, the signal transmission between each second switch circuit and the coupled inductor is disconnected. The one third control switch in the at least one third control switch corresponds to the one second switch circuit in the at least one second switch circuit. To be specific, each second switch circuit may be connected to the one third control switch, the third control switch may be connected between the second upper power transistor of the one second switch circuit in the at least one second switch circuit and the coupled inductor, and the third control switch may be configured to maintain, based on the first switching control signal, the signal transmission between the second upper power transistor and the coupled inductor, or disconnect the signal transmission between the second upper power transistor and the coupled inductor. Therefore, the signal transmission between the second upper power transistor and the coupled inductor may be implemented by using the third control switch. Therefore, according to the different control manners of the first inductor switching circuit, the coupled inductor may form the different inductance parameters based on the different connected switch circuits, and the currents injected by the coupled inductor to the voltage output end are also different. Therefore, the different inductance performance may be separately configured based on the different load requirements, to implement the high conversion efficiency within the wide range of loads.

In some embodiments of this application, the coupled inductor includes the at least two inductors having a coupling relationship. The any two adjacent inductors of the at least two inductors are connected in series. The first inductor in the at least two inductors is connected between the voltage input end and the first switch circuit. The second inductor in the at least two inductors is connected between the first switch circuit and the one second switch circuit in the at least one second switch circuit, or connected between the two second switch circuits in the at least one second switch circuit. For example, as shown in FIG. 23, the coupled inductor includes two inductors: the first inductor and the second inductor. The input terminal of the first inductor and the input terminal of the second inductor are dotted terminals, the output terminal of the first inductor is connected to the input terminal of the second inductor, so that the serial connection between the first inductor and the second inductor is implemented. The input terminal of the second inductor is configured to connect to the first switch circuit. The output terminal of the second inductor is connected to the third control switch circuit, and the third control switch is connected to the second switch circuit. The second switch circuit may include the second upper power transistor and the second lower power transistor. In this embodiment of this application, the high conversion efficiency of the switch-mode power supply within the wide range of loads may be implemented by using the plurality of serially-connected inductors. In this embodiment of this application, the at least two inductors having a coupling relationship may be used to implement the high conversion efficiency of the switch-mode power supply within the wide range of loads, and the occupied board space of the at least two inductors having a coupling relationship is much less than that of the two or more inductors (parallelly-connected multiphase), so that the at least two inductors having a coupling relationship may be applied to the various types of switch-mode power supply topologies, to implement the miniaturization design of the switch-mode power supply.

Figure 24:
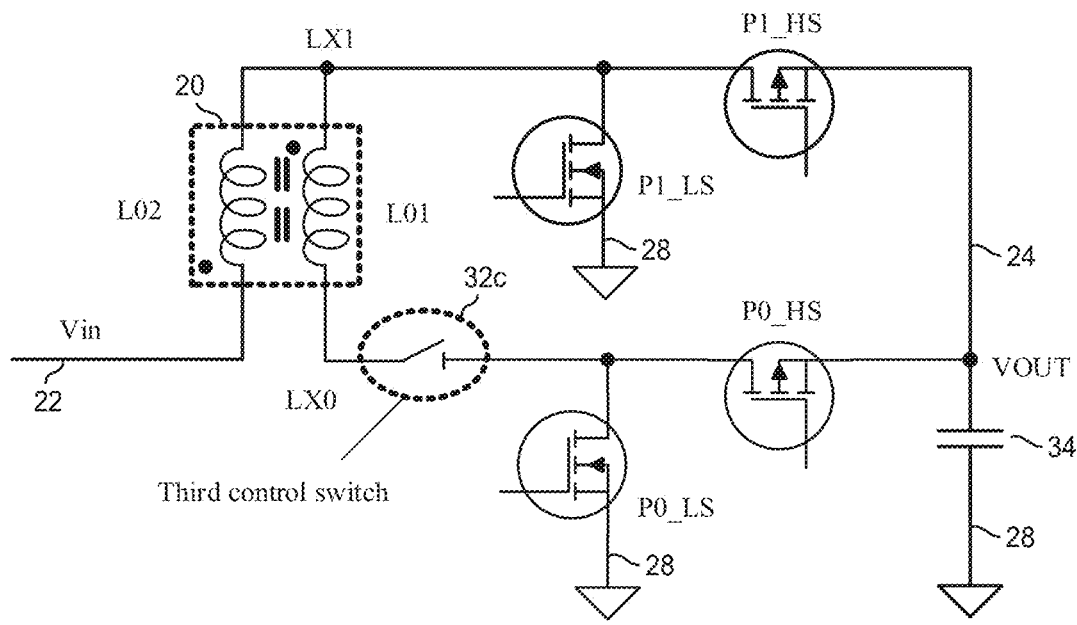
FIG. 24 is a schematic diagram of a structure of a BUCK-BOOST circuit according to an embodiment of this application.

For example, FIG. 24 shows an architecture of the switch-mode power supply based on the BOOST circuit. The voltage input end is Vin, and a direct current power supply (PVDD) provides an input voltage to the voltage input end. The LX0 branch is configured to connect to the voltage output end, and the LX1 branch is connected to the voltage output end. The coupled inductor includes the inductor L01 and the inductor L02. The voltage output end is Vout. The inductor L01 and the inductor L02 are connected in series, an output terminal of the inductor L01 is connected to the LX1 branch, and an output terminal of the inductor L02 is connected to the LX0 branch. An input terminal of the inductor L01 is connected to Vin. It should be noted that FIG. 24 shows a structure of the switch-mode power supply applied to the BOOST circuit according to an embodiment of this application. Based on a principle of symmetry between BUCK and BOOST, the architecture of the BOOST circuit shown in FIG. 24 may be obtained by reserving the BUCK circuit described in FIG. 10. In this embodiment of this application, a coupling relationship between two inductors connected in series may also be applicable to the architecture of the BOOST circuit. The following describes a connection relationship between the coupled inductor and another component in the BOOST circuit. The BOOST circuit may include: the upper power transistor (may also be referred to as an upper power transistor) P0_HS and the lower power transistor (may also be referred to as a lower power transistor) P0_LS, the upper power transistor P1_HS, the lower power transistor P1_LS, the inductor L01, and the inductor L02.

A conduction control function of the first inductor switching circuit may be implemented in a plurality of manners. For example, the first inductor switching circuit may be a third control switch, and the third control switch is disposed between the inductor L01 and the voltage output end. The third control switch has two states: open and closed. When the third control switch is turned off, the inductor L01 is disconnected from the voltage output end. When the third control switch is turned on, the inductor L01 is connected to the voltage input end. Therefore, the conduction control function of the first inductor switching circuit may be implemented by opening and closing the third control switch. It is not limited that, in this embodiment of this application, except the first inductor switching circuit may be connected and disconnected by using the switch, the conduction control function may be further implemented by using another electronic component. For example, the conduction control function of the first inductor switching circuit may be further implemented by using the power transistor. For details, refer to the description in the foregoing embodiment.

Figure 25:
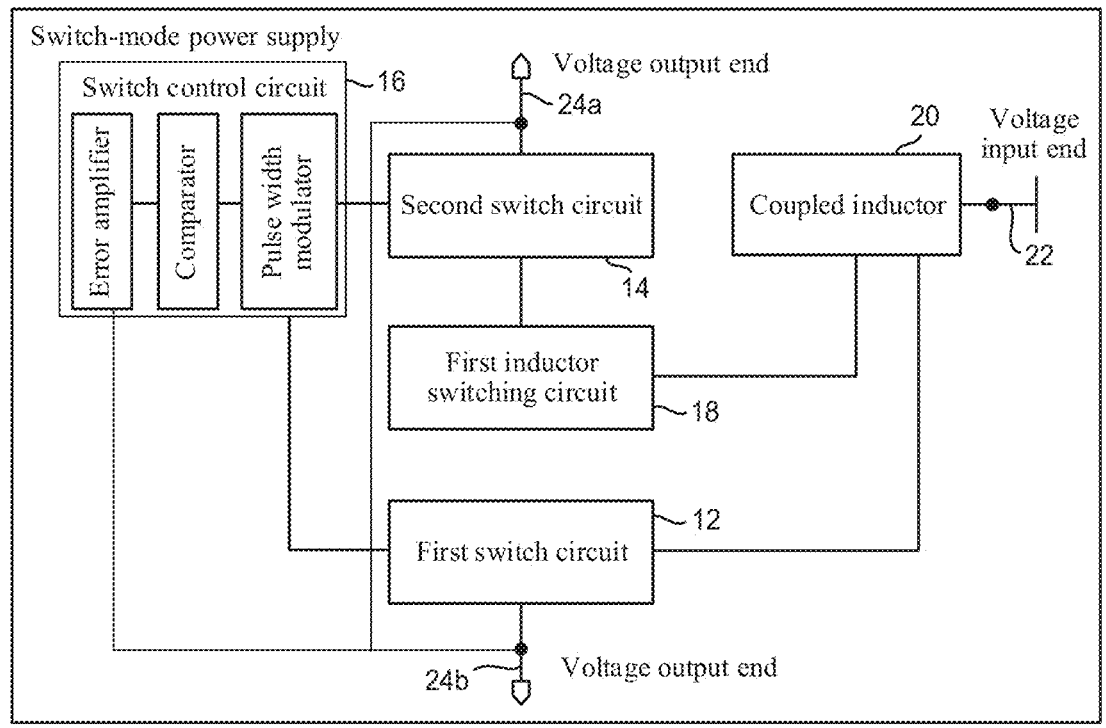
FIG. 25 is a schematic diagram of a structure of another switch-mode power supply according to an embodiment of this application.

In some embodiments of this application, as shown in FIG. 25, the switch control circuit includes: an error amplifier, connected to the voltage output end, and configured to collect the feedback signal and generate an amplification result based on the feedback signal; a comparator, connected to the error amplifier, and configured to compare the amplification result with a reference signal, to generate a comparison result; and a pulse width modulator, connected to the comparator, the first switch circuit, and each second switch circuit, and configured to output, based on the comparison result, the first switch control signal to the first switch circuit and the second switch control signal to each second switch circuit.

The error amplifier may obtain the feedback signal from the voltage output end, and the error amplifier may generate the amplification result and output the amplification result to the comparator. The comparator may obtain the amplification result of the feedback signal from the error amplifier, the comparator may further obtain a preset reference signal, and the comparator may generate and send the comparison result to the pulse width modulator. The pulse width modulator may receive the comparison result from the comparator and generate the switch control signal based on the received comparison result. For example, the pulse width modulator is connected to the first switch circuit and each second switch circuit, and the pulse width modulator outputs, based on the comparison result, the first switch control signal to the first switch circuit and the second switch control signal to each second switch circuit. In this embodiment of this application, the output voltage at the voltage output end may be precisely controlled by using a switch control circuit using the structure.

It should be noted that, for brief description, the foregoing apparatus embodiments are each represented as a combination of a series of units. However, a person skilled in the art should appreciate that this application is not limited to the described units, because according to this application, some steps may be performed in another unit or module. A person skilled in the art should further know that embodiments described in this specification are all example embodiments, and the related modules are not necessarily required by this application.

In addition, it should be noted that the described apparatus embodiment is merely an example. The units described as separate parts may or may not be physically separate, and parts displayed as units may or may not be physical units, may be located in one position, or may be distributed on a plurality of units. Some or all the modules may be selected based on an actual requirement to achieve the objectives of the solutions of the embodiments. In addition, in the accompanying drawings of the apparatus embodiments provided by this application, connection relationships between modules indicate that the modules have connections with each other.

The invention claimed is:

1. A switch-mode power supply, comprising:
a first switch circuit,
at least one second switch circuit,
a switch control circuit,
a first inductor switching circuit,
a coupled inductor,
a voltage input end, and
a voltage output end,
wherein
the first switch circuit is connected to the voltage input end, the switch control circuit, and the coupled inductor, and configured to receive a power voltage input from the voltage input end and a first switch control signal input by the switch control circuit, and inject a first current to the coupled inductor under control of the first switch control signal input;
each second switch circuit in the at least one second switch circuit is connected to the voltage input end, the switch control circuit, and the coupled inductor, and configured to receive the power voltage input and a second switch control signal input by the switch control circuit, and inject a second current to the coupled inductor under control of the second switch control signal input;

the first inductor switching circuit is connected to the each second switch circuit, and configured to receive a first switching control signal, and in response to the first switching control signal, maintain signal transmission between the each second switch circuit and the coupled inductor, or disconnect the signal transmission between the each second switch circuit and the coupled inductor;

the switch control circuit is connected to the first switch circuit, the each second switch circuit, and the voltage output end, and configured to collect a feedback signal, and output, based on the feedback signal, the first switch control signal to the first switch circuit and the second switch control signal input to the each second switch circuit, wherein the feedback signal indicates an output voltage at the voltage output end; and the coupled inductor is connected to the first switch circuit, the each second switch circuit, and the voltage output end, and configured to concurrently inject the first current and the second current to the voltage output end, the coupled inductor being configurable to a first state that injects the first current to the voltage output end, and to a second state that concurrently injects both the first current and the second current to the voltage output end; the first inductor switching circuit maintaining signal transmission between each second switch circuit and the coupled inductor configuring the coupled inductor to concurrently inject both the first current and the second current to the voltage output end; the first inductor switching circuit disconnecting signal transmission between each second switch circuit and the coupled inductor configuring the coupled inductor to inject the first current but not the second current to the voltage output end.

2. The switch-mode power supply according to claim 1, wherein the first switch circuit comprises a first upper power transistor and a first lower power transistor;

the first upper power transistor is separately connected to the voltage input end, the switch control circuit, and the coupled inductor; and the first lower power transistor is separately connected to the coupled inductor, the switch control circuit, and a ground terminal.

3. The switch-mode power supply according to claim 2, wherein the each second switch circuit comprises a second upper power transistor and a second lower power transistor;

the second upper power transistor is separately connected to the voltage input end, the switch control circuit, and the coupled inductor; and the second lower power transistor is separately connected to the coupled inductor, the switch control circuit, and the ground terminal.

4. The switch-mode power supply according to claim 3, wherein the first inductor switching circuit comprises at least one first control switch; one first control switch in the at least one first control switch corresponds to one second switch circuit in the at least one second switch circuit, is connected between the voltage input end and the second upper power transistor of the one second switch circuit in the at least one second switch circuit, and is configured to maintain, based on the first switching control signal, signal transmission between the second upper power transistor and the coupled inductor, or disconnect the signal transmission between the second upper power transistor and the coupled inductor.

5. The switch-mode power supply according to claim 4, wherein the coupled inductor comprises at least two inductors having a coupling relationship;

any two adjacent inductors of the at least two inductors are connected in series;

an input terminal of a first inductor in the at least two inductors is connected between the first switch circuit and the voltage output end; and a second inductor in the at least two inductors is connected between the first switch circuit and the one second switch circuit in the at least one second switch circuit, or connected between two second switch circuits in the at least one second switch circuit.

6. The switch-mode power supply according to claim 1, wherein the first inductor switching circuit comprises at least one third control switch; one third control switch in the at least one third control switch corresponds to the one second switch circuit in the at least one second switch circuit, is connected between the one second switch circuit in the at least one second switch circuit and the coupled inductor, and is configured to maintain, based on the first switching control signal, the signal transmission between the each second switch circuit and the coupled inductor, or disconnect the signal transmission between the each second switch circuit and the coupled inductor.

7. The switch-mode power supply according to claim 6, wherein the coupled inductor comprises at least two inductors having a coupling relationship;

any two adjacent inductors of the at least two inductors are connected in series;

an input terminal of a first inductor in the at least two inductors is connected between the first switch circuit and the voltage output end; and a second inductor in the at least two inductors is connected between the first switch circuit and the one third control switch in the at least one third control switch, or connected between two third control switches in the at least one third control switch.

8. The switch-mode power supply according to claim 3, wherein the first inductor switching circuit comprises at least one second control switch; one second control switch in the at least one second control switch corresponds to the one second switch circuit in the at least one second switch circuit, is connected between the second lower power transistor of the one second switch circuit in the at least one second switch circuit and the ground terminal, and is configured to maintain, based on the first switching control signal, signal transmission between the second lower power transistor and the coupled inductor, or disconnect the signal transmission between the second lower power transistor and the coupled inductor.

9. The switch-mode power supply according to claim 1, wherein the switch control circuit comprises:

an error amplifier, connected to the voltage output end, and configured to collect the feedback signal and generate an amplification result based on the feedback signal;

a comparator, connected to the error amplifier, and configured to compare the amplification result with a reference signal, to generate a comparison result; and a pulse width modulator, connected to the comparator, the first switch circuit, and the each second switch circuit, and configured to output, based on the comparison result, the first switch control signal to the first switch circuit and the second switch control signal input to the each second switch circuit.

10. The switch-mode power supply according to claim 1, further comprises a third switch circuit, at least one fourth switch circuit, and a second inductor switching circuit, wherein
- the third switch circuit is connected to the voltage output end, the switch control circuit, and the coupled inductor, and configured to receive a third switch control signal input by the switch control circuit, and inject a third current from the coupled inductor to the voltage output end under control of the third switch control signal input;
- each fourth switch circuit in the at least one fourth switch circuit is connected to the voltage output end, the switch control circuit, and the coupled inductor, and configured to receive a fourth switch control signal input by the switch control circuit, and inject a fourth current from the coupled inductor to the voltage output end under control of the fourth switch control signal input;
- the second inductor switching circuit is connected to the each fourth switch circuit, and configured to receive a second switching control signal, and in response to the second switching control signal, maintain signal transmission between the each fourth switch circuit and the coupled inductor, or disconnect the signal transmission between the each fourth switch circuit and the coupled inductor;
- the switch control circuit is connected to the third switch circuit, the each fourth switch circuit, and the voltage output end, and further configured to output, based on the feedback signal, the third switch control signal input to the third switch circuit and the fourth switch control signal to the each fourth switch circuit; and
- the coupled inductor is further connected to the third switch circuit, the each fourth switch circuit, and the voltage output end, and configured to inject the third current and the fourth current to the voltage output end.

11. The switch-mode power supply according to claim 10, wherein the third switch circuit comprises a third upper power transistor and a third lower power transistor;
- the third upper power transistor is separately connected to the voltage output end, the switch control circuit, and the coupled inductor; and the third lower power transistor is separately connected to the coupled inductor, the switch control circuit, and a ground terminal.

12. The switch-mode power supply according to claim 10, wherein the each fourth switch circuit comprises a fourth upper power transistor and a fourth lower power transistor;
- the fourth upper power transistor is separately connected to the voltage output end, the switch control circuit, and the coupled inductor; and the fourth lower power transistor is separately connected to the coupled inductor, the switch control circuit, and a ground terminal.

13. The switch-mode power supply according to claim 12, wherein the second inductor switching circuit comprises at least one fourth control switch; one fourth control switch in the at least one fourth control switch corresponds to one fourth switch circuit in the at least one fourth switch circuit, is connected between the voltage output end and the fourth upper power transistor of the one fourth switch circuit in the at least one fourth switch circuit, and is configured to maintain, based on the second switching control signal, signal transmission between the fourth upper power transistor and the coupled inductor, or disconnect the signal transmission between the fourth upper power transistor and the coupled inductor.

14. The switch-mode power supply according to claim 12, wherein the second inductor switching circuit comprises at least one fifth control switch; one fifth control switch in the at least one fifth control switch corresponds to the one fourth switch circuit in the at least one fourth switch circuit, is connected between the fourth lower power transistor of the one fourth switch circuit in the at least one fourth switch circuit and the ground terminal, and is configured to maintain, based on the second switching control signal, signal transmission between the fourth lower power transistor and the coupled inductor, or disconnect the signal transmission between the fourth lower power transistor and the coupled inductor.

15. The switch-mode power supply according to claim 10, wherein the first inductor switching circuit comprises at least one sixth control switch; one sixth control switch in the at least one sixth control switch corresponds to the one fourth switch circuit in the at least one fourth switch circuit, is connected between the one fourth switch circuit in the at least one fourth switch circuit and the coupled inductor, and is configured to maintain, based on the second switching control signal, the signal transmission between the each fourth switch circuit and the coupled inductor, or disconnect the signal transmission between the each fourth switch circuit and the coupled inductor.

16. A switch-mode power supply, comprising a first switch circuit, at least one second switch circuit, a switch control circuit, a first inductor switching circuit, a coupled inductor, a voltage input end, and a voltage output end, wherein
- the first switch circuit is connected to the voltage output end, the switch control circuit, and the coupled inductor, and configured to receive a first switch control signal input by the switch control circuit, and inject a first current from the coupled inductor to the voltage output end under control of the first switch control signal input;
- each second switch circuit in the at least one second switch circuit is connected to the voltage output end, the switch control circuit, and the coupled inductor, and configured to receive a second switch control signal input by the switch control circuit, and inject a second current from the coupled inductor to the voltage output end under control of the second switch control signal input;
- the first inductor switching circuit is connected to the each second switch circuit, and configured to receive a first switching control signal, and in response to the first switching control signal, maintain signal transmission between the each second switch circuit and the coupled inductor, or disconnect the signal transmission between the each second switch circuit and the coupled inductor;
- the switch control circuit is connected to the first switch circuit, the each second switch circuit, and the voltage output end, and configured to collect a feedback signal, and output, based on the feedback signal, the first switch control signal to the first switch circuit and the second switch control signal input to the each second switch circuit, wherein the feedback signal indicates an output voltage at the voltage output end; and
- the coupled inductor is connected to the first switch circuit, the each second switch circuit, and the voltage input end, and configured to concurrently inject the first current and the second current to the voltage output end, the coupled inductor being configurable to a first state that injects the first current to the voltage output end, and to a second state that concurrently injects both the first current and the second current to the voltage output end; the first inductor switching circuit maintaining signal transmission between each second switch circuit and the coupled inductor configuring the coupled inductor to concurrently inject both the first current and the second current to the voltage output end; the first inductor switching circuit disconnecting signal transmission between each second switch circuit and the coupled inductor configuring the coupled inductor to inject the first current but not the second current to the voltage output end.

17. The switch-mode power supply according to claim 16, wherein the first switch circuit comprises a first upper power transistor and a first lower power transistor;

the first upper power transistor is separately connected to the voltage output end, the switch control circuit, and the coupled inductor; and the first lower power transistor is separately connected to the coupled inductor, the switch control circuit, and a ground terminal.

18. The switch-mode power supply according to claim 17, wherein the each second switch circuit comprises a second upper power transistor and a second lower power transistor;

the second upper power transistor is separately connected to the voltage output end, the switch control circuit, and the coupled inductor; and the second lower power transistor is separately connected to the coupled inductor, the switch control circuit, and the ground terminal.

19. The switch-mode power supply according to claim 18, wherein the first inductor switching circuit comprises at least one first control switch; one first control switch in the at least one first control switch corresponds to one second switch circuit in the at least one second switch circuit, is connected between the voltage output end and the second upper power transistor of the one second switch circuit in the at least one second switch circuit, and is configured to maintain, based on the first switching control signal, signal transmission between the second upper power transistor and the coupled inductor, or disconnect the signal transmission between the second upper power transistor and the coupled inductor.

20. The switch-mode power supply according to claim 18, wherein the first inductor switching circuit comprises at least one second control switch; one second control switch in the at least one second control switch corresponds to the one second switch circuit in the at least one second switch circuit, is connected between the second lower power transistor of the one second switch circuit in the at least one second switch circuit and the ground terminal, and is configured to maintain, based on a second switching control signal, signal transmission between the second lower power transistor and the coupled inductor, or disconnect the signal transmission between the second lower power transistor and the coupled inductor.

* * * * *